(12) United States Patent
Imamura et al.

(10) Patent No.: US 7,561,510 B2
(45) Date of Patent: Jul. 14, 2009

(54) WIRELESS LAN SYSTEM

(75) Inventors: Kimihiko Imamura, Ichihara (JP);
Daiichiro Nakashima, Chiba (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 346 days.

(21) Appl. No.: 11/116,282

(22) Filed: Apr. 28, 2005

(65) Prior Publication Data

US 2005/0243843 A1 Nov. 3, 2005

(30) Foreign Application Priority Data

Apr. 30, 2004 (JP) .............................. P2004-136102

(51) Int. Cl.
*H04J 9/00* (2006.01)
(52) U.S. Cl. ...................... 370/205; 370/338
(58) Field of Classification Search ................ 370/338; 455/434, 422.1; 709/245
See application file for complete search history.

(56) References Cited

U.S. PATENT DOCUMENTS

| 7,010,298 B2 * | 3/2006 | Seedman et al. ............. 455/434 |
| 2002/0181426 A1 * | 12/2002 | Sherman ...................... 370/338 |
| 2007/0086326 A1 * | 4/2007 | Langley et al. .............. 370/205 |

FOREIGN PATENT DOCUMENTS

| EP | 1207654 A2 | 5/2002 |
| JP | 2004-247985 A | 9/2004 |
| WO | WO-03/061196 A2 | 7/2003 |

OTHER PUBLICATIONS

Hori, Satoru et al., "System Capacity Comparison with Various High Data Rate Wireless LAN Systems," The 2002 IEICE (Institute of Electronics, Information and Communication Engineers) General Conference, B-5-250, p. 701 (with partial translation).
Matsue, Hideaki et al., 802.11 High-speed wireless LAN Textbook, 2003, IDG, Japan, pp. 168-171 (with partial translation).
IEEE Std 802.11g-2003, p. 11.
IEEE 802.11-1999 7.1.3.1.2 Table-13 Valid Type/Subtype Combincations, ANSI/IEEE Stg 802.11, 1999 Edition, pp. 35-36.

* cited by examiner

*Primary Examiner*—Lester Kincaid
*Assistant Examiner*—Phuoc Doan
(74) *Attorney, Agent, or Firm*—Birch, Stewart, Kolasch & Birch, LLP

(57) ABSTRACT

A high-speed wireless LAN system capable of avoiding a collision of packets and maintaining the original transmission speed is provided. A transmitter is applied to an HT terminal using a second frequency band wider than a first frequency band used by a legacy terminal, in which an HT sequence is started after a legacy beacon as an occupation signal and a legacy CTS are transmitted using every frequency in the second frequency band. Due to this, an NAV is set at the legacy terminal and packets are no longer transmitted from the legacy terminal. As a result, a collision of packets is avoided and it becomes possible to perform communication between HT terminals at the original transmission speed.

27 Claims, 47 Drawing Sheets

WIRELESS LAN SYSTEM

BACKGROUND OF THE INVENTION

1. Field of the Invention

The present invention relates to a wireless LAN system for transmitting a signal for occupying a radio medium.

2. Related Background of the Invention

Conventionally, a wireless LAN system in compliance with the IEEE 802.11a (hereinafter, referred to simply as "11a") standard having a maximum transmission speed of 54 Mbit/s is proposed, in addition to a wireless LAN system in compliance with the IEEE 802.11b (hereinafter, referred to simply as "11b") standard having a transmission speed of 11 Mbit/s. Moreover, the IEEE 802.11g (hereinafter, referred to simply as "11g") standard having both features of the IEEE 802.11b and IEEE 802.11a is proposed. Hereinafter, an access point and a station in a wireless LAN system in compliance with these standards are referred to as a "legacy terminal", a legacy access point as a "legacy AP", and a legacy station as a "legacy STA."

In recent years, a transmission speed as high as 100 Mbit/s is required in a wireless LAN system. A method is proposed as one of methods for fulfilling the need, in which the transmission speed is increased by using a frequency band n times (n is a natural number) that of a legacy terminal. Hereinafter, an access point and a station in a wireless LAN system in which such a high-speed transmission is performed are referred to as an "HT (High Throughput) terminal", an HT access point as an "HTAP", and an HT station as an "HTSTA". In FIG. 40, the HT terminal includes a frequency band fl used by the legacy terminal and uses, for example, a frequency band fh having a band width three times that of the legacy terminal. At present, communication by an HT terminal and a legacy terminal using the same frequency band, that is, the coexistence of different wireless LAN systems is under examination.

Conventionally, examples of coexistence of different wireless LAN systems using the same frequency band include the coexistence of the 11b system and the 11g system. This wireless LAN system employs such a configuration as shown in FIG. 41. In the configuration, an access point 100 of 11g controls both of a station 101 of 11g and a station 102 of 11b.

In the case of this configuration, it becomes possible for the station 101 of 11g to perform a high-speed transmission by transmitting a data frame in the OFDM (Orthogonal Frequency Division Multiplexing) modulation scheme, but the station 102 of 11b recognizes the OFDM signals as interfering signals from other systems because the OFDM signals are not the signals of 11b. Then, depending on a signal level, there may be a case where the station 102 of 11b transmits a data frame in the CCK (Complementary Code Keying) modulation scheme. In such a case, a collision of packets occurs and the throughput is deteriorated.

In order to avoid this, as shown in FIG. 43, before transmitting an OFDM signal, the station 101 of 11g transmits a CTS (Clear To Send: a signal to notify the completion of reception) in the DSSS (Direct Sequence Spread Spectrum) modulation scheme, which can be demodulated by the station 102 of 11b and a station, which is not shown, in compliance with the IEEE802.11 (hereinafter, referred to simply as "11"). Due to this, an NAV (Network Allocation Vector: suppression of transmission by a virtual carrier sense) is set to the station 102 of 11b and the station of 11, which is not shown, thereby a collision is avoided.

Here, the frame format of CTS employs a configuration shown in FIG. 44. That is, the frame format consists of a frame control section 103, a duration section 104, and a receiver address 105 as an MAC (Media Access Control) header, and an FCS (Frame Check Sequence) section 106. Other terminals that have received such a CTS refrain from performing transmission by setting an NAV in the interval described in the duration section 104. Due to this, a collision is avoided.

Also in the case where the station 102 of 11b has already performed transmission, it is possible for the station 101 of 11g to demodulate or recognize the signal transmitted from the station 102 of 11b, therefore, a collision can be avoided. In other words, as shown in FIG. 45, the station 101 of 11g demodulates (or recognizes) the data frame (CCK) transmitted from the station 102 of 11b and sets a backoff to avoid a collision, then transmits an OFDM signal.

[Non-patent document 1] "System Capacity Comparison with various High Data Rate Wireless LAN Systems", Satoru Hori et al., The 2002 IEICE (Institute of Electronics, Information and Communication Engineers) General Conference, B-5-250

[Non-patent document 2] "802.11 High-speed Wireless LAN Textbook", Hideaki Matsue et al., 2003, IDG Japan

[Non-patent document 3] IEEE Std 802.11g-2003

SUMMARY OF THE INVENTION

When an HTAP performs communication with an HTSTA, as shown in FIG. 46, it can be expected that communication is performed using an HT transmission for all of the beacon (HT beacon) as a notification signal transmitted at fixed intervals, the control frame (HT control frame), and the data frame (HT data frame), that is, using a frequency band wider than that of a legacy terminal, due to this, a high speed transmission is realized. Hereinafter, a series of procedure shown in FIG. 46 is referred to as an "HT sequence". The downward arrow in the diagram shows the transmission and reception of a signal from HTAP to HTSTA and the upward arrow shows the transmission and reception of a signal from HTSTA to HTAP. "HT ACK" shows a signal for confirming the completion of reception to the "HT control frame" or "HT DATA frame".

However, as shown in FIG. 47, when HT terminals 110 to 112 and legacy terminals 113 and 114 perform communication in the same frequency band, it is not possible to mutually recognize signals transmitted from each other. Because of this, the HT terminals 110 to 112 and the legacy terminals 113 and 114 recognize the transmitted signals from other terminals as interfering signals from other systems and therefore a collision of packets occurs frequently. As a result, the throughput is deteriorated. In other words, there arises a problem of considerable deterioration in communication speed between legacy terminals and between HT terminals.

The above-mentioned circumstances being taken into account, the present invention has been developed and an object thereof is to provide a high-speed wireless LAN system capable of avoiding a collision of packets and maintaining the original transmission speed.

(1) In order to attain the above-mentioned object, the following means are provided in the present invention. That is, a transmitter according to the present invention is characterized by: being a transmitter applied to a second radio communication system using a second frequency band wider than a first frequency band used in a first communication system; and comprising: an occupation signal generation section for generating an occupation signal compatible with the first radio communication system and notifying the first radio communication system that the second radio communication system occupies a radio medium; and a transmission section for performing communication in the second radio communication system after transmitting the occupation signal using every frequency in the second frequency band.

As described above, since the occupation signal has compatibility with the first radio communication system, it is possible to make the first radio communication system recognize the occupation signal and notify the first radio communication system of the occupation by the second radio communication system. Further, since communication is performed in the second radio communication system after the occupation signal is transmitted using every frequency in the second frequency band, it is possible to perform communication in the second radio communication system while making the first radio communication system suppress transmission and occupying the radio medium. Due to this, a collision of packets can be avoided and the deterioration of throughput can be prevented. As a result, it becomes possible to perform communication at the original transmission speed in the second radio communication system.

(2) The transmitter according to the present invention is characterized in that the occupation signal generation section adds information for specifying the period during which the second radio communication system occupies the radio medium perfectly to the occupation signal and the transmission section performs communication in the second radio communication system by occupying the radio medium during the period.

As described above, since the period during which the second radio communication system occupies the radio medium perfectly is specified, it is possible to prevent the first radio communication system from transmitting information during the period. Due to this, a collision of packets can be avoided and the deterioration of throughput can be prevented. As a result, it becomes possible to perform communication at the original transmission speed in the second radio communication system.

(3) The transmitter according to the present invention is characterized in that the occupation signal generation section adds information that the second radio communication system occupies a part of the period of the radio medium to the occupation signal and the transmission section performs communication in the second radio communication system by occupying the radio medium during the part of the period based on the information.

As described above, the occupation of the radio medium during the part of the period makes it possible to reserve another part of the period during which the first radio communication system performs communication. Therefore, in the period during which the second radio communication system occupies the radio medium, transmission is suppressed in the first radio communication system and a collision of packets can be avoided and the deterioration of throughput in the second radio communication system can be prevented. On the other hand, in the period during which the second radio communication system does not occupy the radio medium, the first radio communication system can perform communication, therefore, it becomes possible for the first and second radio communication systems to coexist.

(4) The transmitter according to the present invention is characterized in that the second frequency band has a band width n times (n is a natural number) that of the first frequency band.

As described above, the band width of the frequency used in the second radio communication system is n times (n is a natural number) that of the first frequency band, therefore, it becomes possible to increase the transmission speed compared to that in the first radio communication system.

(5) The transmitter according to the present invention is characterized in that the occupation signal generation section comprises a symbol repeating section for repeatedly outputting transmission data corresponding to an occupation signal n times (n is a natural number) in predetermined symbol units.

As described above, since the transmission data corresponding to the occupation signal is repeatedly outputted n times (n is a natural number) in the predetermined symbol units, it becomes possible to transmit a signal composed of the occupation signals stacked along the frequency axis by converting the output signals from a frequency signal to a time signal. In other words, since the frequency band having the band width n times that of the frequency band used in the first radio communication system is used in the second radio communication system, it is possible to transmit the occupation signal at every frequency in the frequency band used in the second radio communication system by repeating the occupation signal having compatibility with the first radio communication system n times. Due to this, it becomes possible to make the first radio communication system recognize without fail that the radio medium is occupied and suppress transmission without fail. As a result, a collision of packets can be avoided and the deterioration of throughput can be prevented, and it becomes possible to perform communication at the original transmission speed in the second radio communication system.

(6) The transmitter according to the present invention is characterized in that the occupation signal generation section transmits the occupation signal intermittently.

As described above, since the occupation signal is transmitted intermittently, when the occupation signal is transmitted, the radio medium is occupied in the second radio communication system, the transmission is suppressed in the first radio communication system, therefore, a collision of packets can be avoided and the deterioration of the throughput in the second radio communication system can be prevented. On the other hand, when the occupation signal is not transmitted, since the radio medium is not occupied in the second radio communication system, communication is made possible in the first radio communication system. Due to this, it becomes possible for the first and second radio communication systems to coexist. By the way, the wording "to transmit intermittently" used here means to or not to transmit the occupation signal at predetermined intervals. For example, it is assumed that a notification signal is transmitted three times during a predetermined time period. In this case, the first and second notification signals are transmitted together with the occupation signal and the last notification signal is transmitted without the occupation signal. It may also be possible not to transmit the occupation signal for the first notification signal and transmit the occupation signal twice for the last two notification signals.

(7) The transmitter according to the present invention is characterized in that the transmission section transmits at least, out of a start signal for notifying that the period during which communication is performed in the second radio communication system starts and an end signal for notifying that the period during which communication is performed in the second radio communication system ends, the start signal.

As described above, since at least the start signal is transmitted, it is possible for a receiver in the second radio communication system to clearly grasp the fact that the period during which communication is performed starts. Moreover, by transmitting the end signal, it becomes possible for the receiver in the second radio communication system to clearly grasp the fact that the period during which communication is performed ends without measuring the elapsed time from the start of the period. Since the receiving side clearly grasps the start and end of the above-mentioned period, it becomes possible to easily configure a system in which the occupation period during which the second radio communication system occupies a part of the period of the radio medium is changed, and as a result it becomes possible for the first and second radio communication systems to coexist.

(8) The transmitter according to the present invention is characterized in that the occupation signal generation section adds identification information that the second radio communication system recognizes the occupation signal to the occupation signal.

As described above, since identificationinformation is added to the occupation signal in order that the second radio communication system can recognize the occupation signal, it is possible for the receiver in the second radio communication system to recognize that the occupation signal is transmitted to the first radio communication system in order to notify that the radio medium is occupied. Due to this, it is possible for the receiver in the second radio communication system to judge whether the data transmitted after the occupation signal is transmitted to the second radio communication system. When the result of judgment is that the data transmitted after the occupation signal is transmitted to the second radio communication system, the data it demodulated, and when the data transmitted after the occupation signal is not transmitted to the second radio communication system, the receiving operation is stopped. Due to this, unnecessary operations are not performed and saving power consumption is made possible.

(9) The transmitter according to the present invention is characterized in that the occupation signal generation section comprises at least one frequency conversion section for converting the center frequency of an input signal into a predetermined frequency and outputting a frequency-converted signal and an addition section for adding up the input signal and the signal outputted from the frequency conversion section.

As described above, since the center frequency of an input signal is converted into a predetermined frequency and added to the input signal, it is possible to generate radio signals arranged in plural when viewed in the direction of the frequency. Due to this, it becomes possible to respectively notify that the second radio communication system occupies each frequency band used by the first radio communication system.

(10) The receiver according to the present invention is characterized by: being a receiver applied to the second radio communication system using the second frequency band wider than the first frequency band used in the first radio communication system; and comprising a thinning circuit for cutting out and outputting one n-th of the occupation signal received from the transmitter according to claim 3 and a demodulation section for demodulating the signal inputted from the thinning circuit and outputting the received data.

As described above, since one n-th of the received occupation signal is cut out and outputted, it is possible to obtain one occupation signal from the occupation signal repeated n times by the symbol repeating circuit in the transmitter. Due to this, it is possible to demodulate an occupation signal required at least.

(11) The receiver according to the present invention is characterized by: being a receiver applied to the second radio communication system using the second frequency band wider than the first frequency band used in the first radio communication system; and comprising a start judgment section for judging the start of the period during which the second radio communication system occupies the radio medium based on the start signal received from the transmitter according to claim 7, a measurement section for measuring the elapsed time from the start of the period, an end judgment section for judging the end of the period based on the elapsed time from the start of the period and the start signal, and a control section for outputting a signal for notifying the result of the judgment of the start and end of the period.

As described above, since the start of the period during which the second radio communication system occupies the radio medium is recognized based on the start signal, the elapsed time from the start of the period is measured, and the end of the period is recognized based on the elapsed time from the start of the period and the notification signal transmitted at predetermined intervals in the second radio communication system, it becomes possible for the receiving side to grasp without fail the period during which the second radio communication system occupies the radio medium. Since the receiving side clearly grasps the start and end of the above-mentioned period, it becomes possible to easily configure a system in which the occupation period during which the second radio communication system occupies a part of the period of the radio medium is changed, and as a result, it becomes possible for the first and second radio communication systems to coexist.

(12) The receiver according to the present invention is characterized by: being a receiver applied to the second radio communication system using the second frequency band wider than the first frequency band used in the first radio communication system; and comprising a start judgment section for judging the start of the period during which the second radio communication system occupies the radio medium based on the start signal received from the transmitter according to claim 7, an end judgment section for judging the end of the period based on the end signal received from the transmitter according to claim 7, and a control section for outputting a signal for notifying the result of judgment of the start and end of the period.

As described above, it becomes possible for the receiving side to grasp without fail the start and end of the period during which the second radio communication system occupies the radio medium based on the start signal and the end signal. Since the receiving side clearly grasps the start and end of the above-mentioned period, it becomes possible to easily configure a system in which the occupation period during which the second radio communication system occupies a part of the period of the radio medium is changed, and as a result, it becomes possible for the first and second radio communication systems to coexist.

(13) The receiver according to the present invention is characterized by: being a receiver applied to the second radio communication system using the second frequency band wider than the first frequency band used in the first radio communication system; and comprising a recognition section for recognizing the identification information based on the occupation signal received from the transmitter according to claim 8 and a reception section for demodulating the received signal and outputting the received data when the identification information is recognized or stopping the receiving operation when the identification information is not recognized.

As described above, since the identification information is recognized, it is possible to judge whether the data transmitted after the occupation signal is transmitted to the second radio communication system. In other words, when the identification information is recognized, it is possible to judge that the signal transmitted after the occupation signal is transmitted to the second radio communication system, therefore, the signal is demodulated. On the other hand, when the identification information is not recognized, it is possible to judge that the signal data transmitted after the occupation signal is transmitted not to the second radio communication system, therefore, the receiving operation is stopped. Due to this, unnecessary operations are not performed and saving power consumption is made possible.

(14) The access point according to the present invention is characterized by comprising any one of the transmitters described above.

Due to this, a collision of packets can be avoided and the deterioration of throughput can be prevented.

(15) The station according to the present invention is characterized by comprising at least one of the receivers described above.

Due to this, since the receiving side clearly grasps the start and end of the above-mentioned period, it becomes possible to easily configure a system in which the occupation period during which the second radio communication system occupies a part of the period of the radio medium is changed, and as a result, it becomes possible for the first and second radio communication systems to coexist.

(16) The wireless LAN system according to the present invention is characterized by comprising the above-mentioned access point and the above-mentioned station.

Due to this, a collision of packets can be avoided and the deterioration of throughput can be prevented. Moreover, it becomes possible for the first and second radio communication systems to coexist.

According to the present invention, since the occupation signal has the compatibility with the first radio communication system, it is possible to make the first radio communication system recognize the occupation signal and notify the occupation by the second radio communication system. Moreover, since communication is performed in the second radio communication system after the occupation signal is transmitted using every frequency in the second frequency band, it is possible to perform communication in the second radio communication system while making the first radio communication system suppress transmission and occupying the radio medium. Due to this, a collision of packets can be avoided and the deterioration of throughput can be prevented. As a result, it becomes possible to perform communication at the original transmission speed in the second radio communication system.

DESCRIPTION OF THE PREFERRED EMBODIMENTS

Figure 40:
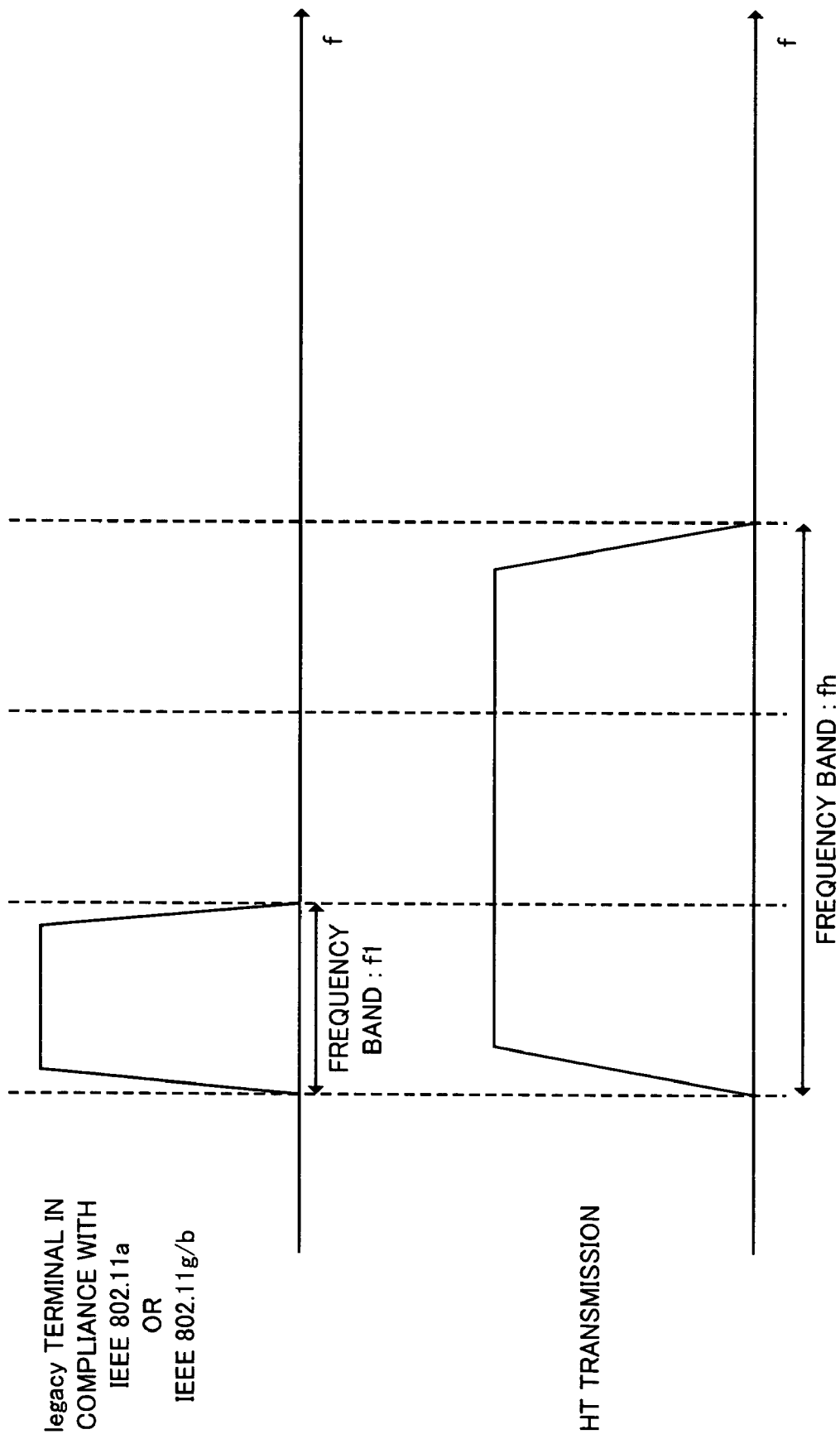
FIG. 40 is a diagram showing a frequency band used by an HT terminal and a legacy terminal.
Figure 41:
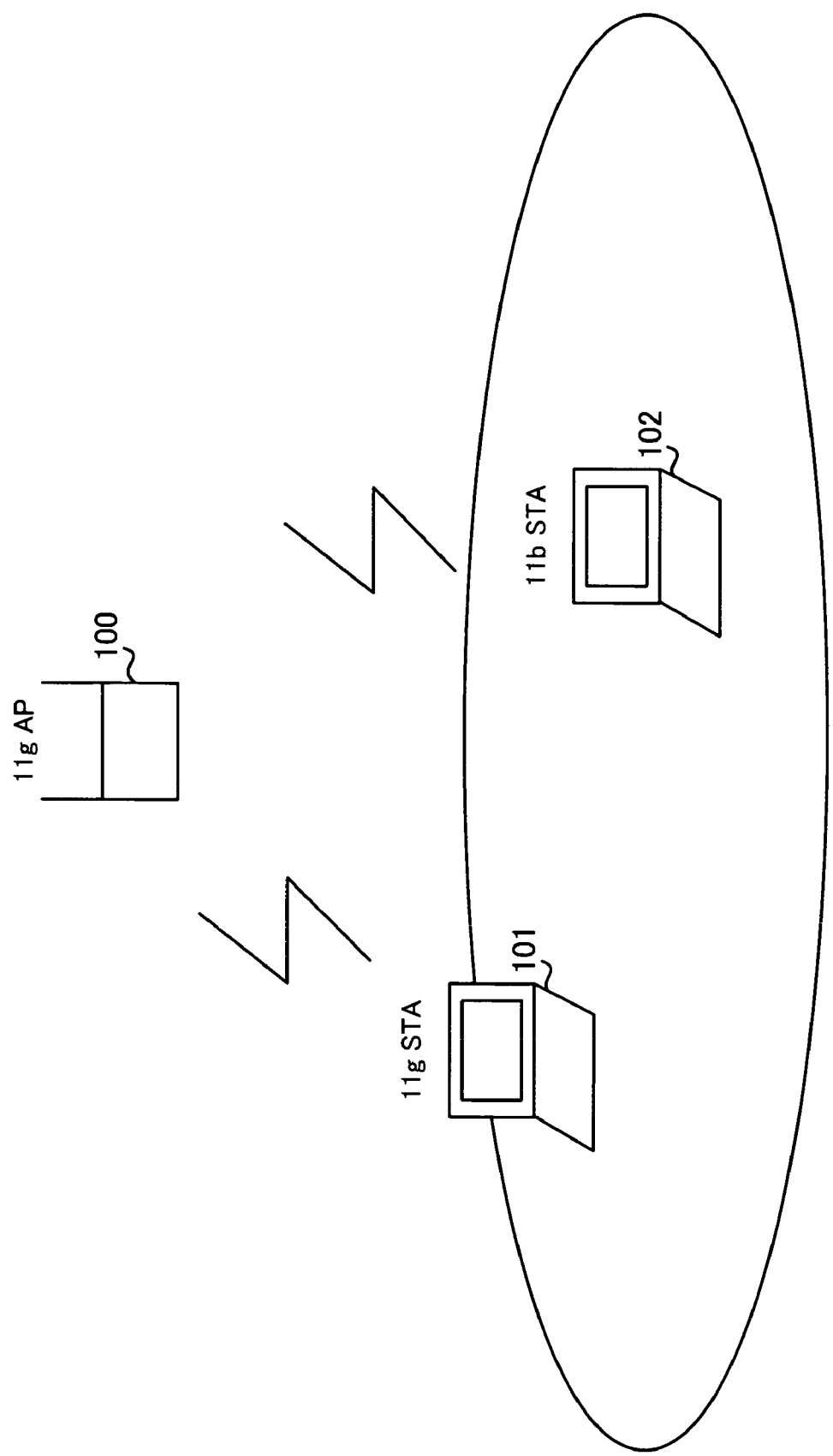
FIG. 41 is a diagram showing a general configuration in a conventional wireless LAN system.
Figure 42:
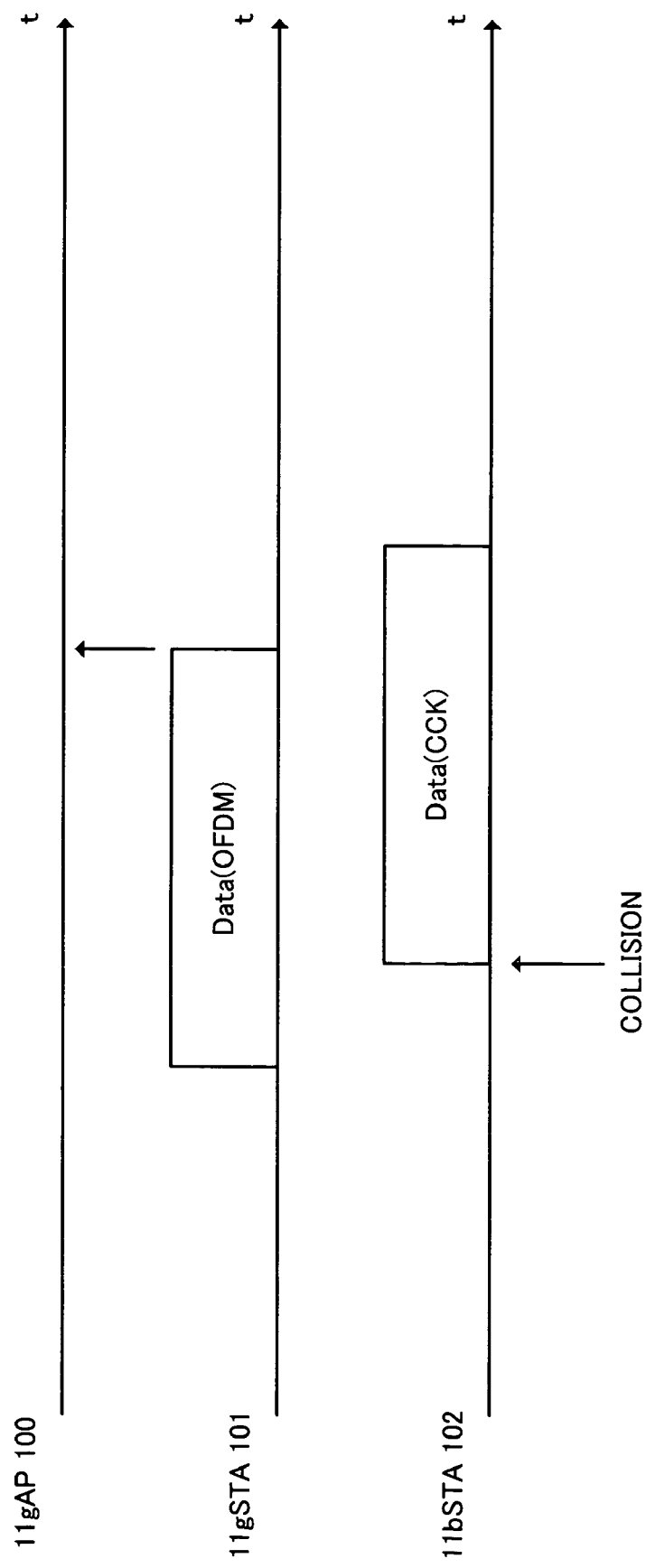
FIG. 42 is a diagram showing an interval of data transmitted in the conventional wireless LAN system.
Figure 43:
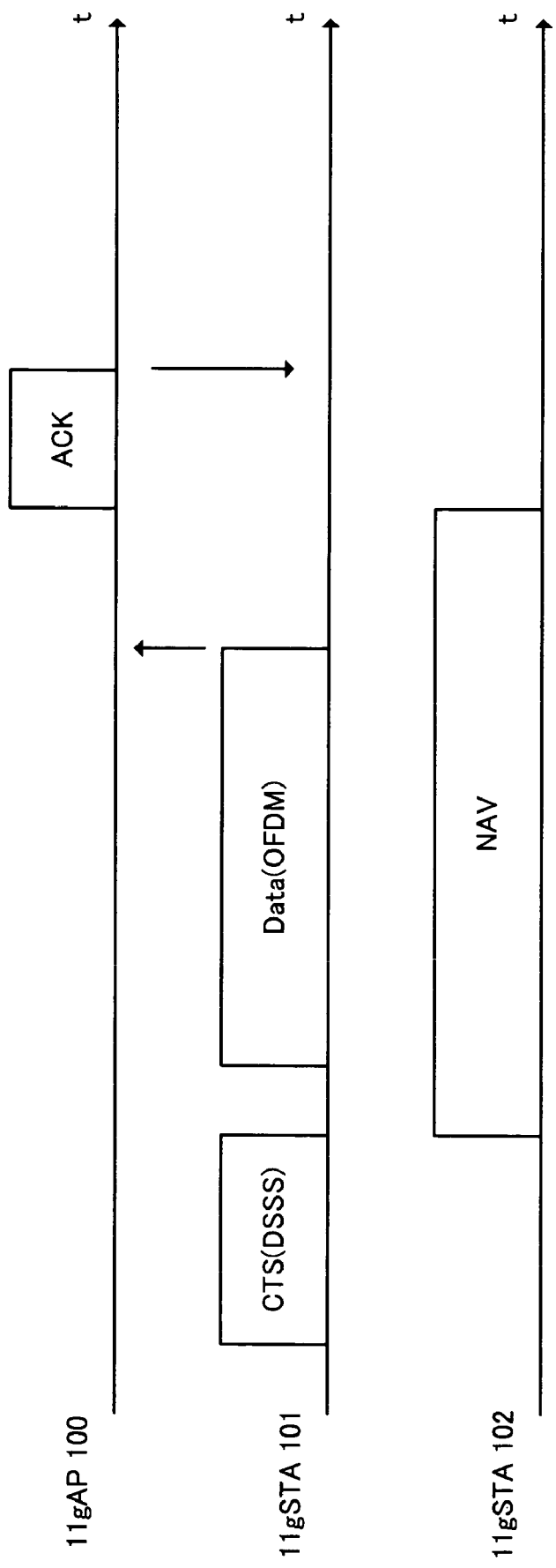
FIG. 43 is a diagram showing an interval of data transmitted in the conventional wireless LAN system.
Figure 44:
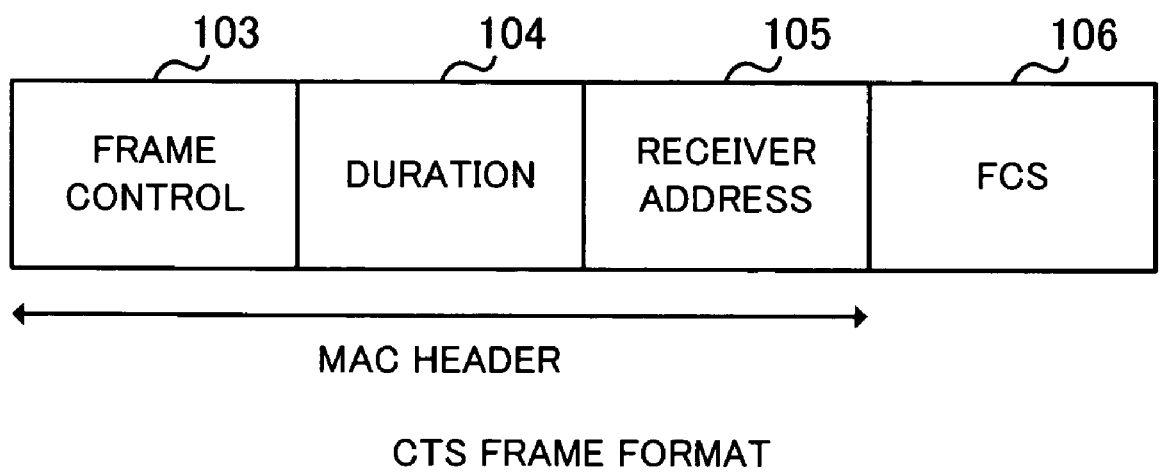
FIG. 44 is a diagram showing a CTS frame format.
Figure 45:
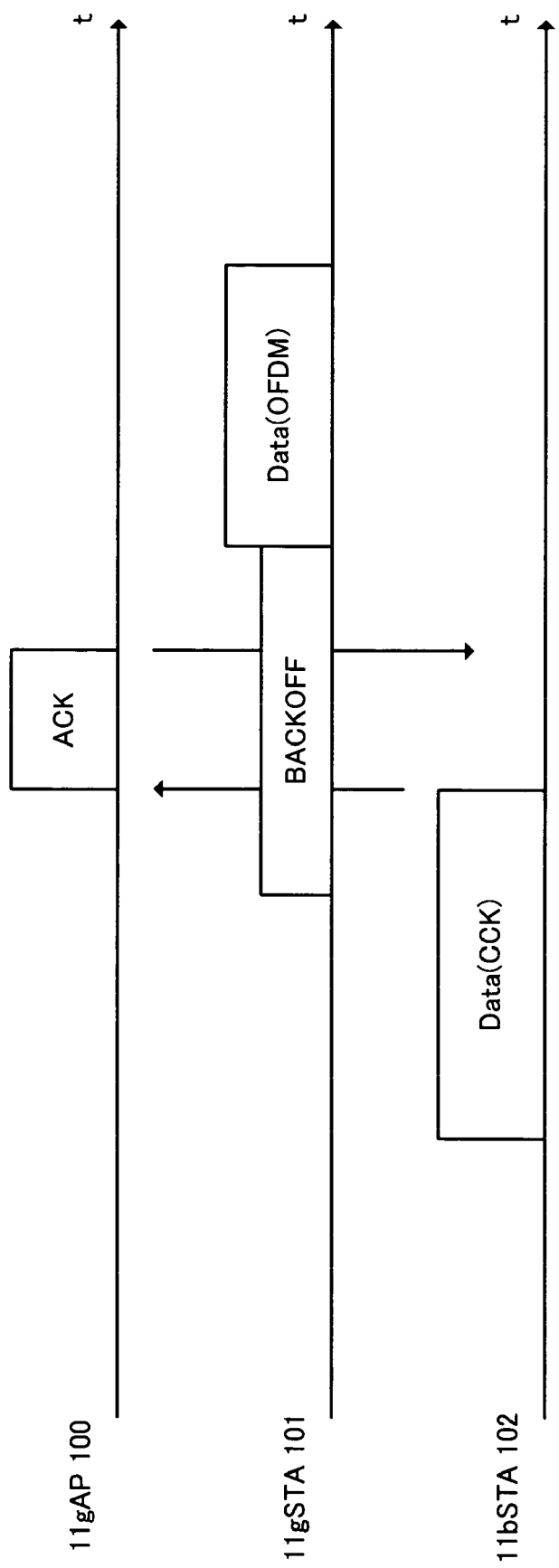
FIG. 45 is a diagram showing an interval of data transmitted in the conventional wireless LAN system.
Figure 46:
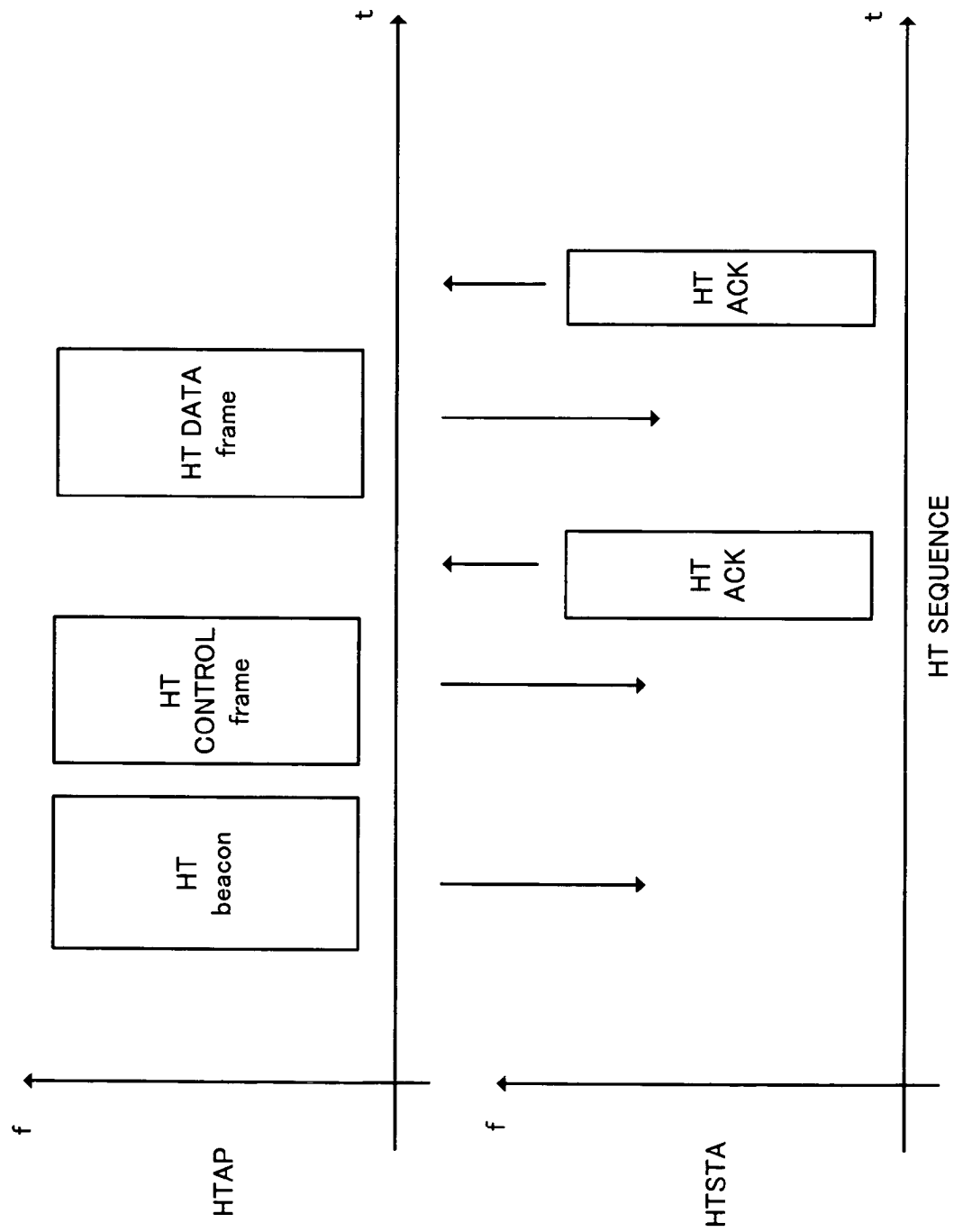
FIG. 46 is a diagram showing an HT sequence.
Figure 47:
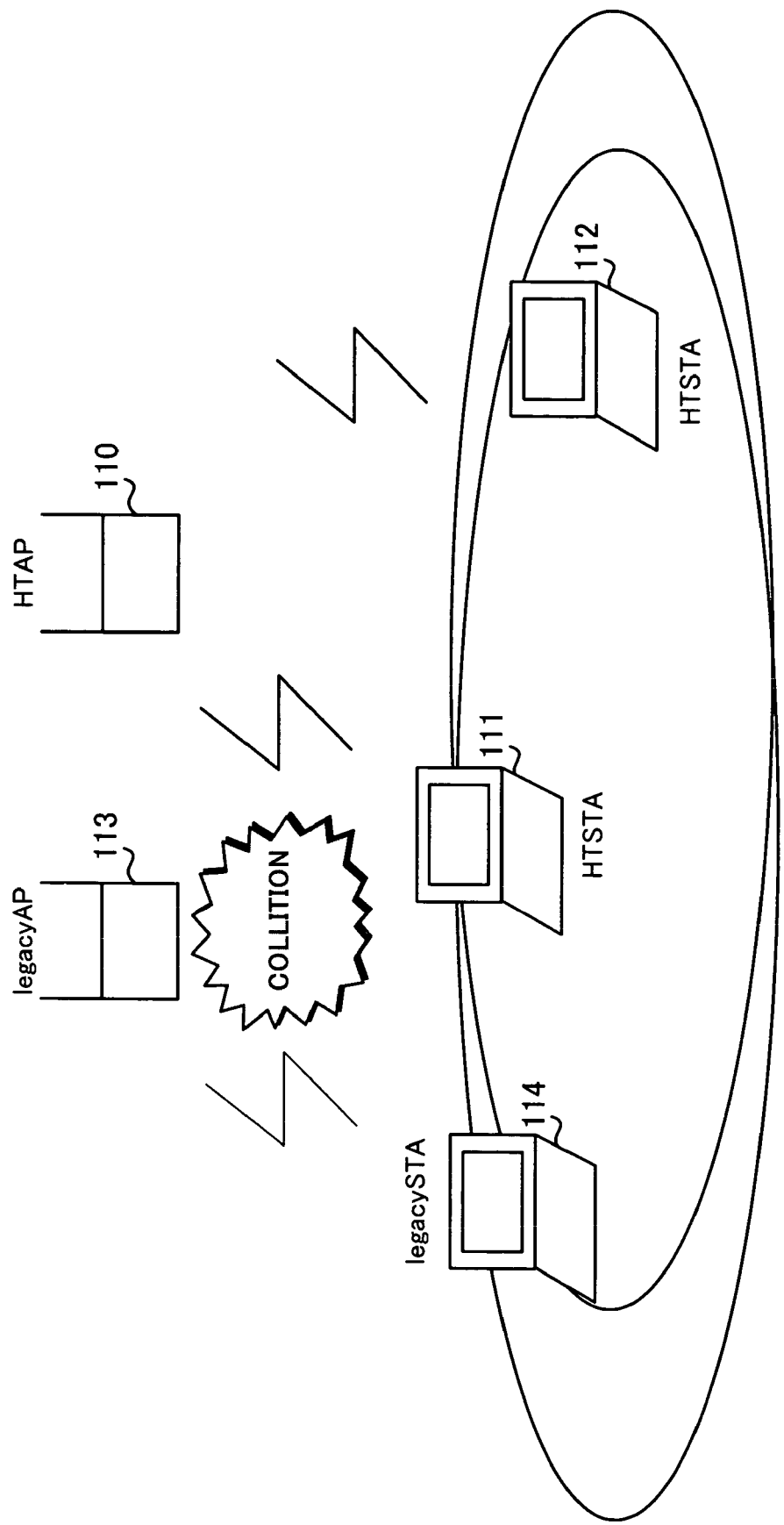
FIG. 47 is a diagram showing how packets collide with each other when an HT terminal and a legacy terminal coexist.

In the wireless LAN system according to the present invention, an HT terminal uses a frequency band n times (n is a natural number) that of a legacy terminal. In an example shown in FIG. 40, the HT terminal uses a frequency band the band width of which is three times that of the legacy terminal. Due to this, a high-speed transmission can be realized between HT terminals.

An HTAP has the compatibility with a legacy terminal at every frequency (the entire band) at which communication is performed with an HTSTA and transmits an occupation signal for notifying the occupation of the radio medium in a form (for example, CTS) that the legacy terminal can demodulate. Due to this, the HTAP logically occupies the time for performing an HT sequence with respect to the legacy terminal. By the way, the notification signal means a beacon and the occupation signal means a CTS. Moreover, as will be described later, it is also possible to use a CF-poll or an MAC frame as an occupation signal instead of the CTS.

First Embodiment

Figure 1:
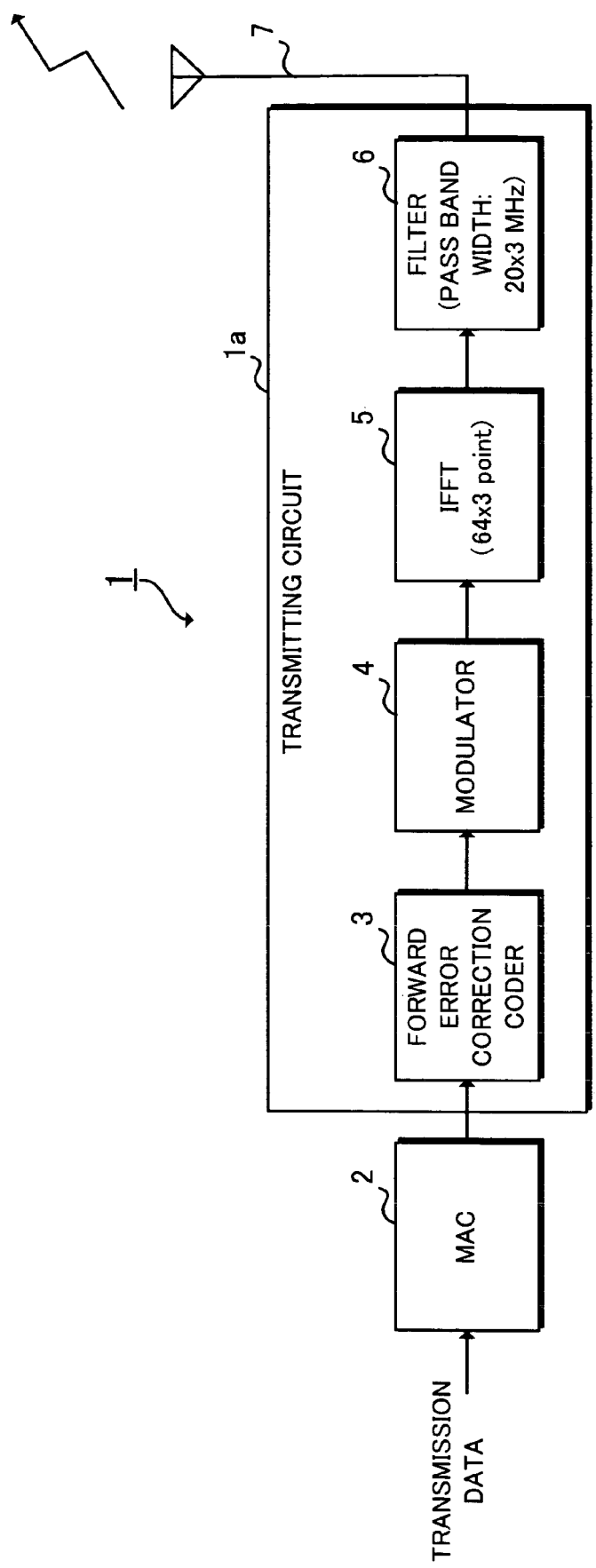
FIG. 1 is a block diagram of a transmitter of an HTSTA.
Figure 2:
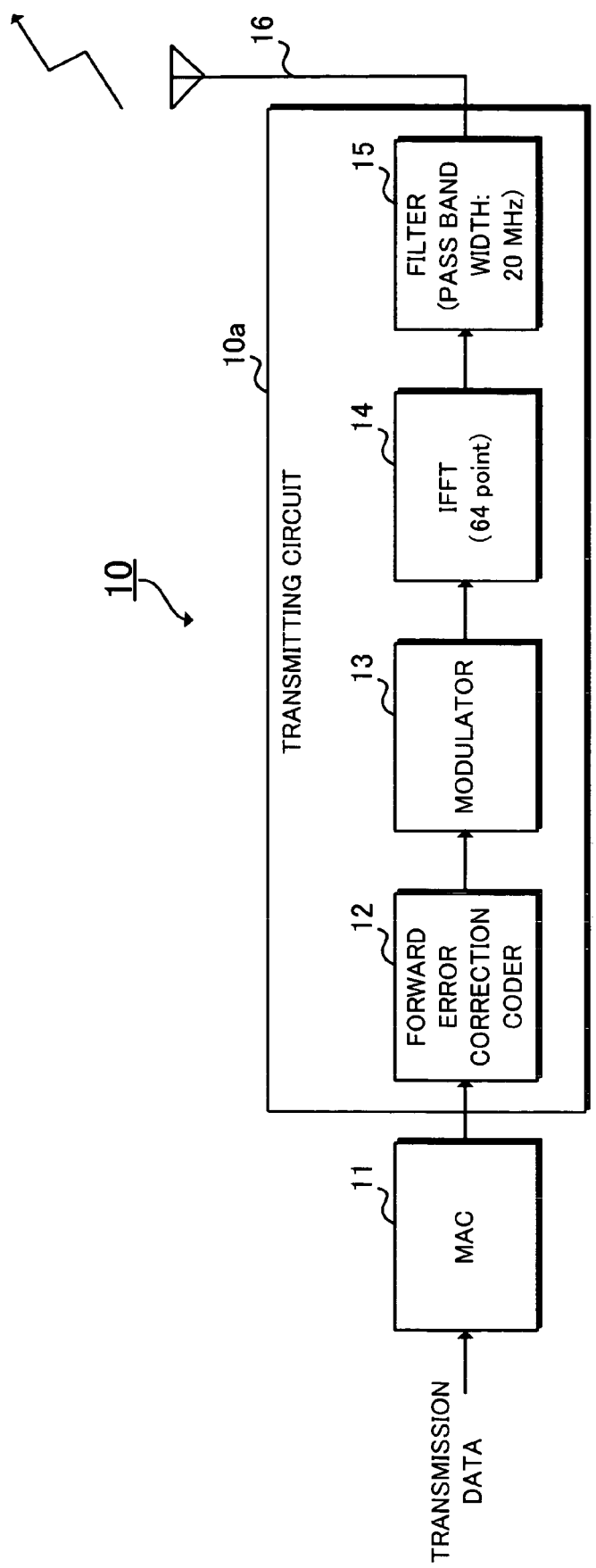
FIG. 2 is a block diagram of a transmitter of a legacy STA.

FIG. 1 a block diagram showing a configuration of a transmitter of an HTSTA applied to a wireless LAN system according to a first embodiment and FIG. 2 is a block diagram showing a configuration of a transmitter of a legacy STA applied to a legacy wireless LAN system. In FIG. 1, in a transmitter 1 of the HTSTA, transmission data are inputted in an MAC circuit 2 and a transmitting/receiving method of a frame, which is a transmission/reception unit of data, a frame format, etc., are defined. An Forward Error Correction Coder 3 performs error correction coding for a signal inputted from the MAC circuit 2. A modulator 4 performs modulation such as BPSK (Binary PSK) or QPSK (Quadrature PSK) for a signal inputted from the Forward Error Correction Coder 3. An IFFT circuit 5 converts a signal inputted from the modulator 4 from a frequency signal into a time signal. A filter circuit 6 allows only the signals in a desired band among signals inputted from the IFFT circuit 5 to pass for output and the output signals are transmitted through an antenna 7. The Forward Error Correction Coder 3, the modulator 4, the IFFT circuit 5, and the filter circuit 6 compose a transmitting circuit 1a.

As shown in FIG. 2, also in transmitter 10 of the legacy STA, an MAC circuit 11, an Forward Error Correction Coder 12, a modulator 13, an IFFT circuit 14, a filter circuit 15, and an antenna 16 function substantially in the same manner as those in the transmitter 1 of the HTSTA. The Forward Error Correction Coder 12, the modulator 13, the IFFT circuit 14, and the filter circuit 15 compose a transmitting circuit 10a.

However, the IFFT circuit 5 in the transmitter 1 of the HTSTA uses an IFFT circuit the number of points of which is n times (here, a case where n=3 is shown, for example) that of the IFFT circuit 14 in the transmitter 10 of the legacy STA. Moreover, the filter circuit 6 in the transmitter 1 of the HTSTA uses a filter circuit the pass band width of which is n times (here, a case where n=3 is shown, for example) that of the filter circuit 15 in the transmitter 10 of the legacy STA. Due to this, in the HTSTA, a high-speed transmission using a band width n times that of the legacy STA is made possible.

Figure 3:
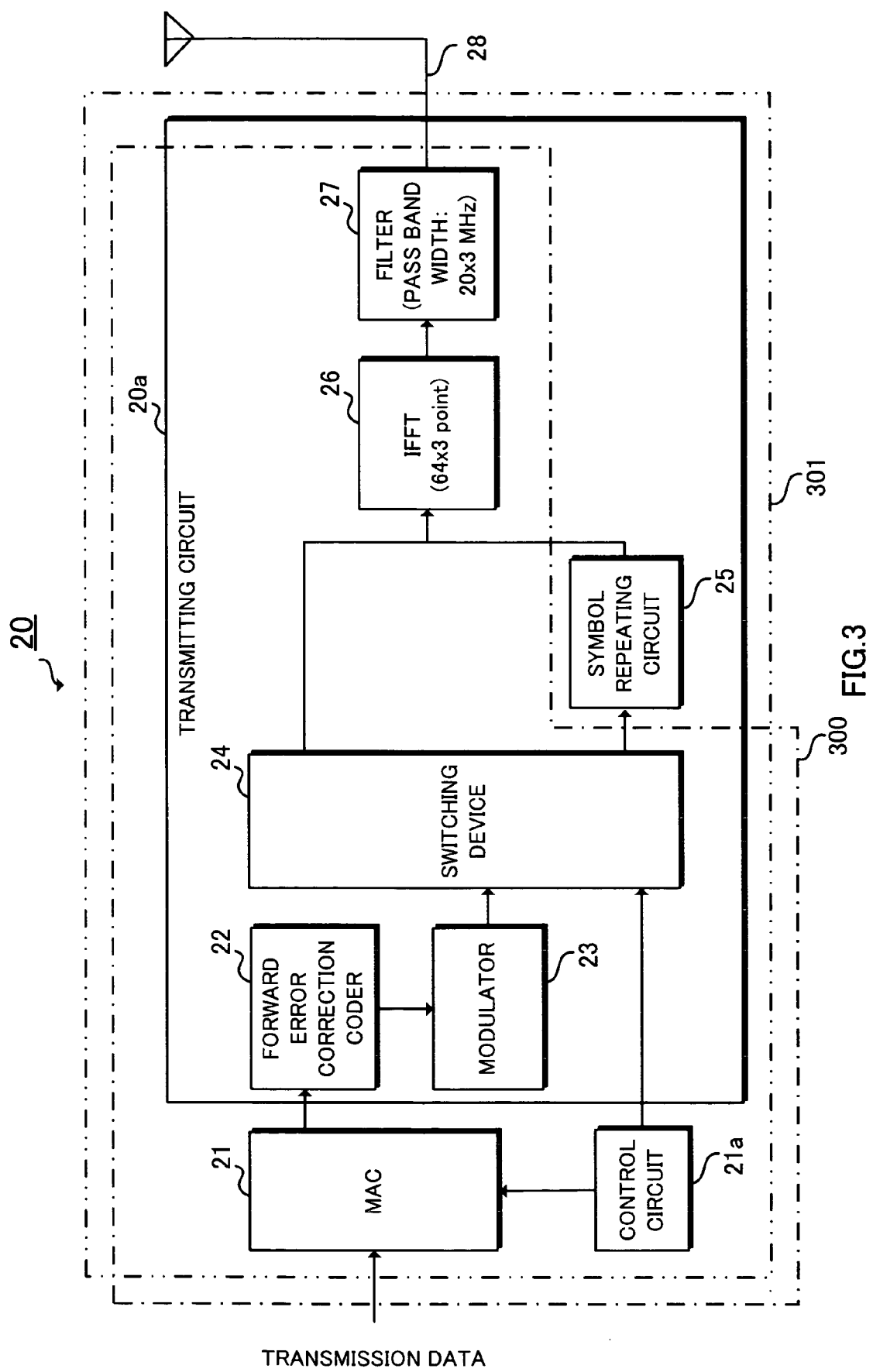
FIG. 3 is a block diagram of a transmitter of an HTAP.
Figure 4:
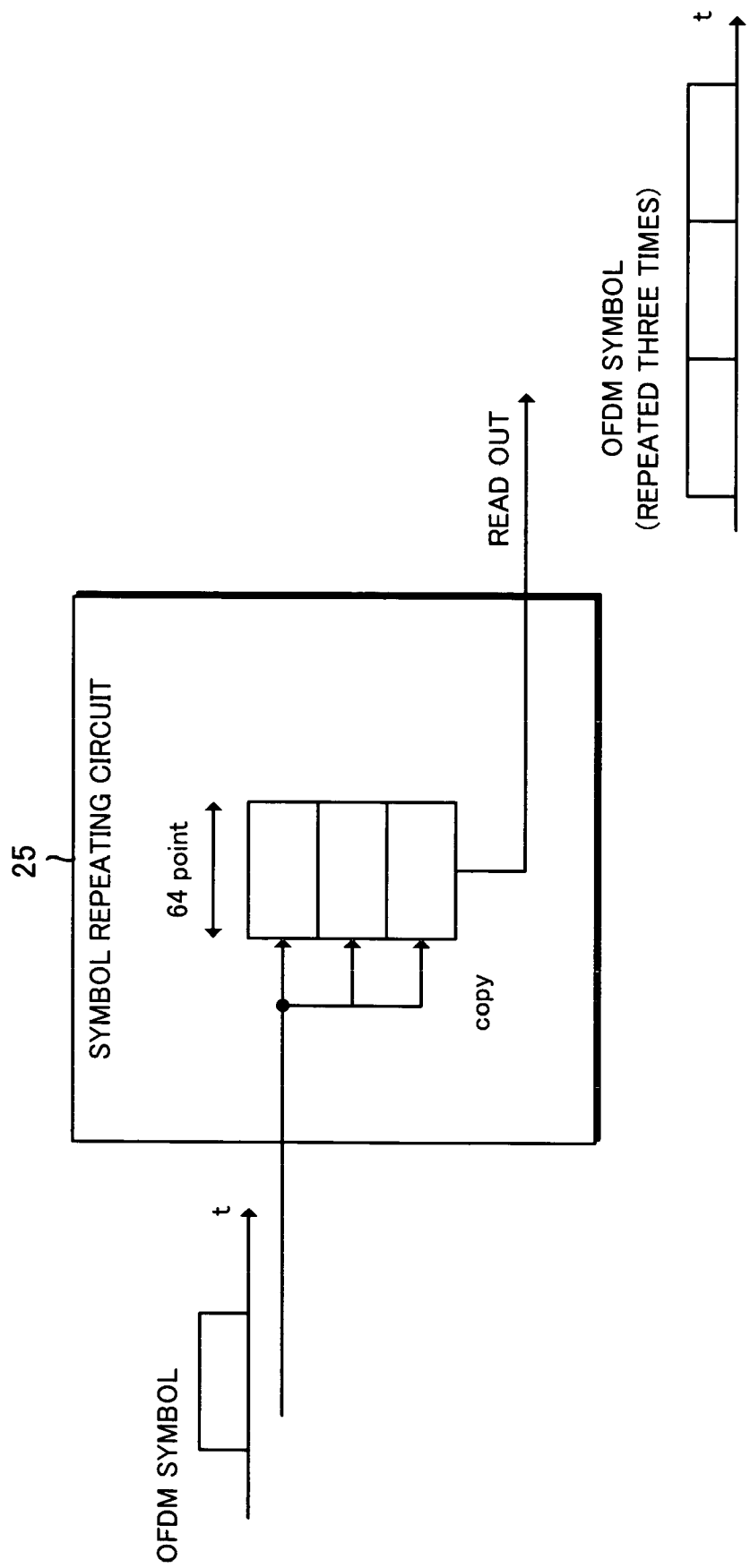
FIG. 4 is a block diagram of a symbol repeating circuit of the transmitter of the HTAP.

FIG. 3 is a block diagram showing a configuration of a transmitter of an HTAP applied to the wireless LAN system according to the first embodiment. In a transmitter 20 of the HTAP, an MAC circuit 21 is controlled by a control circuit 21a to define a transmitting/receiving method of a frame, a frame format, etc., for transmission data. An Forward Error Correction Coder 22 performs error correction coding for a signal inputted from the MAC circuit 21. A modulator 23 performs modulation such as BPSK (Binary PSK) or QPSK (Quadrature PSK) for a signal inputted from the Forward Error Correction Coder 22. A switching device 24 is controlled by the control circuit 21a to switch a signal inputted from the modulator 23 to a symbol repeating circuit 25 or an IFFT circuit 26 for output.

The symbol repeating circuit 25 repeatedly outputs transmission signal data corresponding to an occupation signal generated in the MAC circuit 21, to which error correction coding and modulation processing have been performed, n times (n is a natural number) in predetermined symbol units. Specifically, the symbol is repeated n times for the signal inputted from the switching device 24 and the signal is outputted to the IFFT circuit 26. The symbol repeating circuit 25 repeats an input signal n times in OFDM symbol units (here, a case where n=3 is shown, for example).

The IFFT circuit 26 converts a signal inputted from the switching device 24 or the symbol repeating circuit 25 from a frequency signal into a time signal. A filter circuit 27 allows only the signals in a desired band among the output signals of the IFFT circuit 26 for output and the output signals are transmitted through an antenna 28. The Forward Error Correction Coder 22, the modulator 23, the switching device 24, the symbol repeating circuit 25, the IFFT circuit 26, and the filter 27 compose a transmitting circuit 20a.

Figure 5:
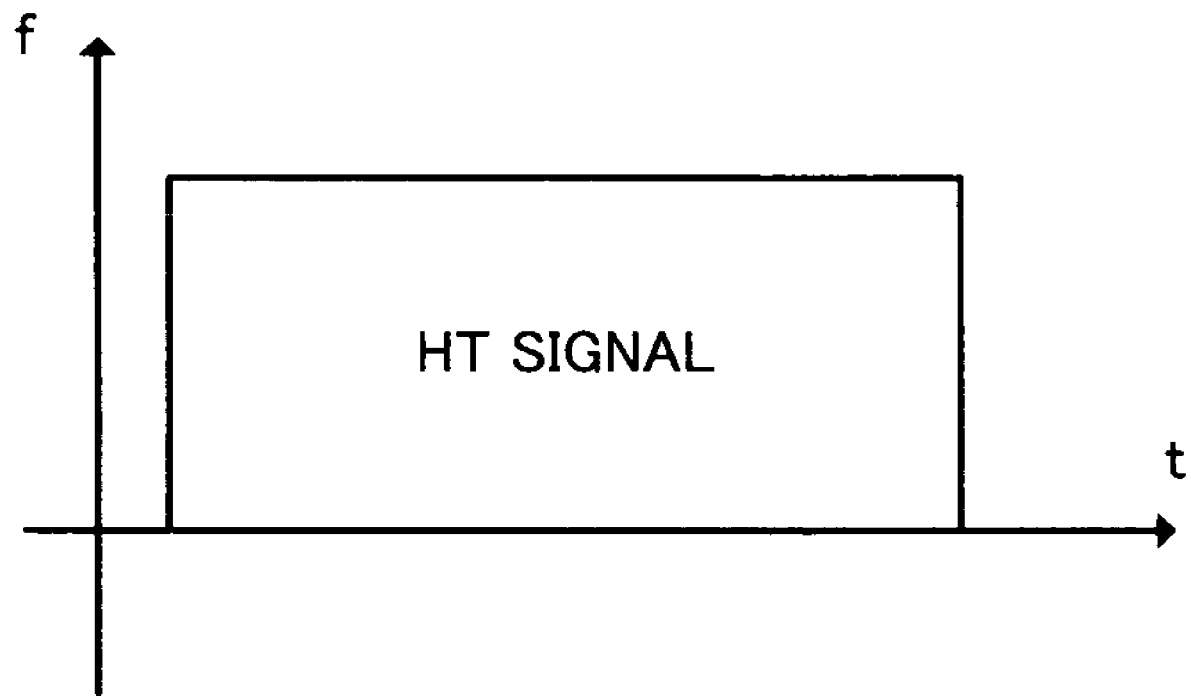
FIG. 5 is a diagram showing a signal transmitted by the transmitter of the HTAP.
Figure 6:
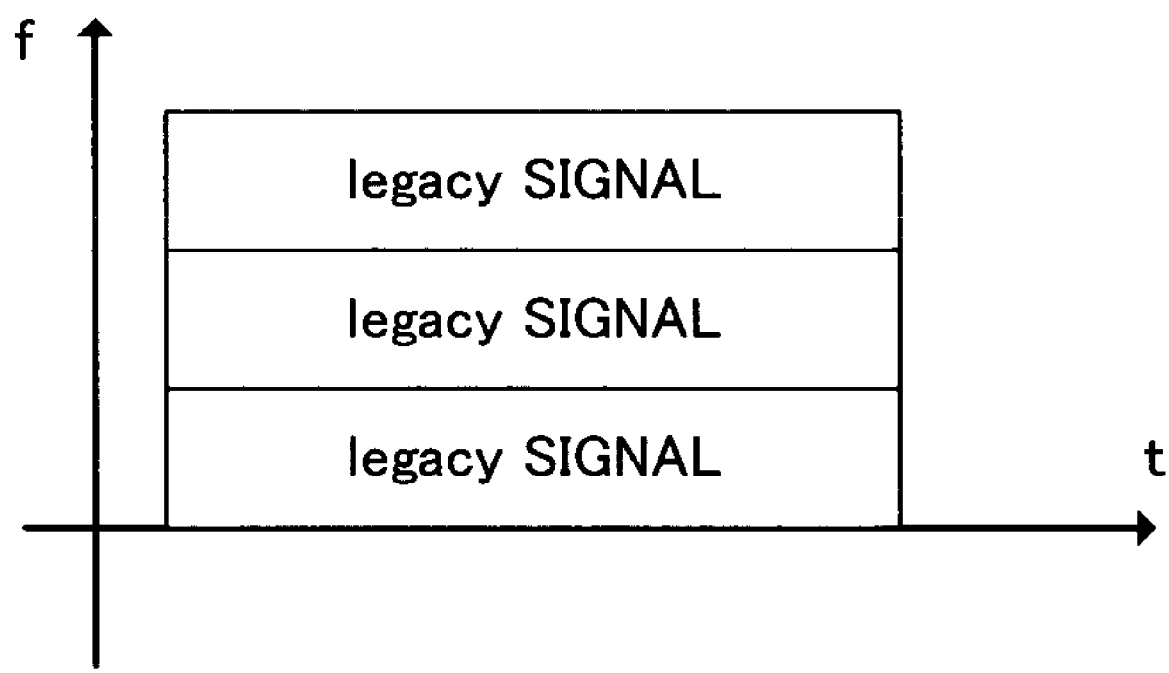
FIG. 6 is a diagram showing a signal transmitted by the transmitter of the HTAP.

When outputting the output from the modulator 23 directly to the IFFT circuit 26 by means of the switching device 24, the transmitter 20 of this HTAP can transmit an HT signal using a band width n times that of the legacy terminal as shown in FIG. 5. When outputting the output from the modulator 23 to the IFFT circuit 26 via the symbol repeating circuit 25 by means of the switching device 24, it becomes possible to transmit a signal having a shape of three identical legacy signals piled up along the frequency axis as shown in FIG. 6.

In the above description, a configuration is employed, in which the symbol repeating circuit 25 is provided between the modulator 23 and the IFFT circuit 26, but the configuration is not limited to this. Other configurations may be employed as long as the same functions as those in this configuration are provided.

In the description given below, a part consisting of the transmitting circuit 20a excluding the symbol repeating circuit 25, the MAC circuit 21, and the control circuit 21a is defined as a transmission section 300. A part consisting of the transmitting circuit 20a including the symbol repeating circuit 25, the MAC circuit 21, and the control circuit 21a is defined as an occupation signal generation section 301. In other words, it is assumed that a signal compatible with a legacy terminal is transmitted by directing transmission of a legacy signal from the control circuit 21a included in the occupation signal generation section 301 and outputting transmission signal data from the MAC circuit 21 to the transmitting circuit 20a, and a signal compatible with an HT terminal is transmitted by directing transmission of an HT signal from the control circuit 21a included in the transmission section 300 and outputting transmission signal data from the MAC circuit 21 to the transmitting circuit 20a.

Figure 7:
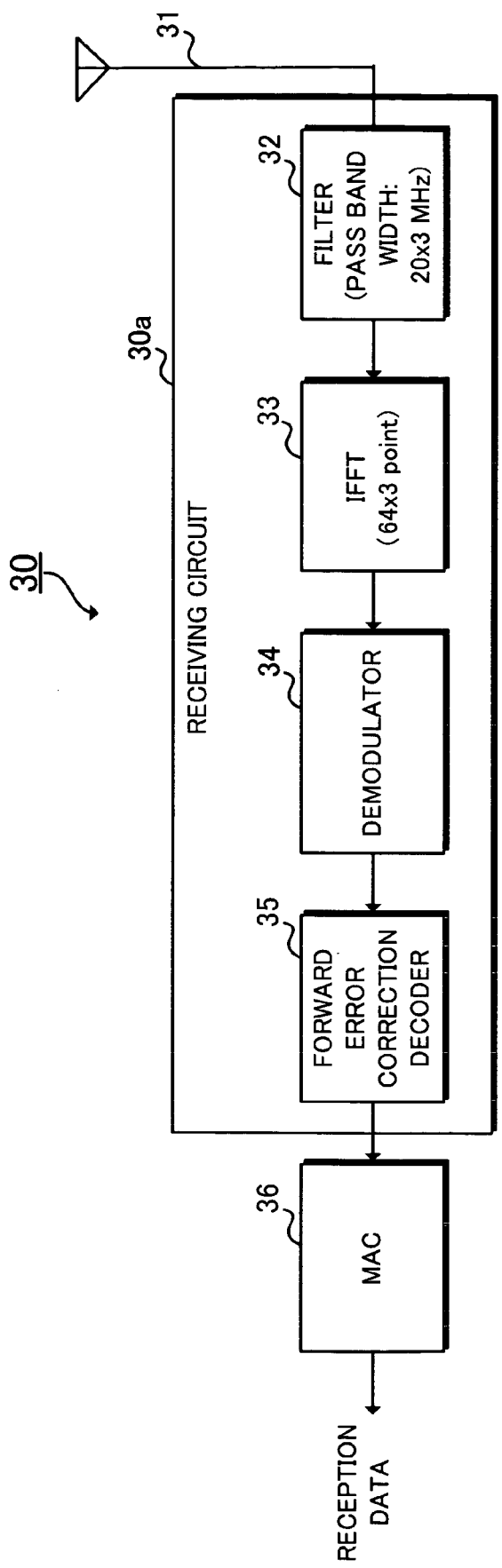
FIG. 7 is a block diagram of a receiver of the HTSTA.

FIG. 7 is a block diagram showing a configuration of a receiver of the HTSTA applied to the wireless LAN system according to the first embodiment. Here, a case where the receiver is applied to a wireless LAN system including HT beacons in an HT sequence is explained. In other words, in the case of a wireless LAN system including HT beacons in an HT sequence, only the HT signals need to be demodulated. As shown in FIG. 7, in a receiver 30 of the HTSTA, a radio signal received by an antenna 31 undergoes a process in which only the signals in a desired band are allowed to pass by a filter circuit 32. The output signal of the filter circuit 32 is converted from a time signal into a frequency signal by an FFT circuit 33. A demodulator 34 converts a signal inputted from the FFT circuit 33 into a bit string based on the signal point. An Forward Error Correction Decoder 35 performs error correction decoding for a signal inputted from the demodulator 34. An MAC circuit 36 reads out the transmitting/receiving method of a frame, the frame format, etc., and outputs the received data. The filter circuit 32, the FFT circuit 33, the demodulator 34, and the Forward Error Correction Decoder 35 compose a receiving circuit 30a.

Figure 8:
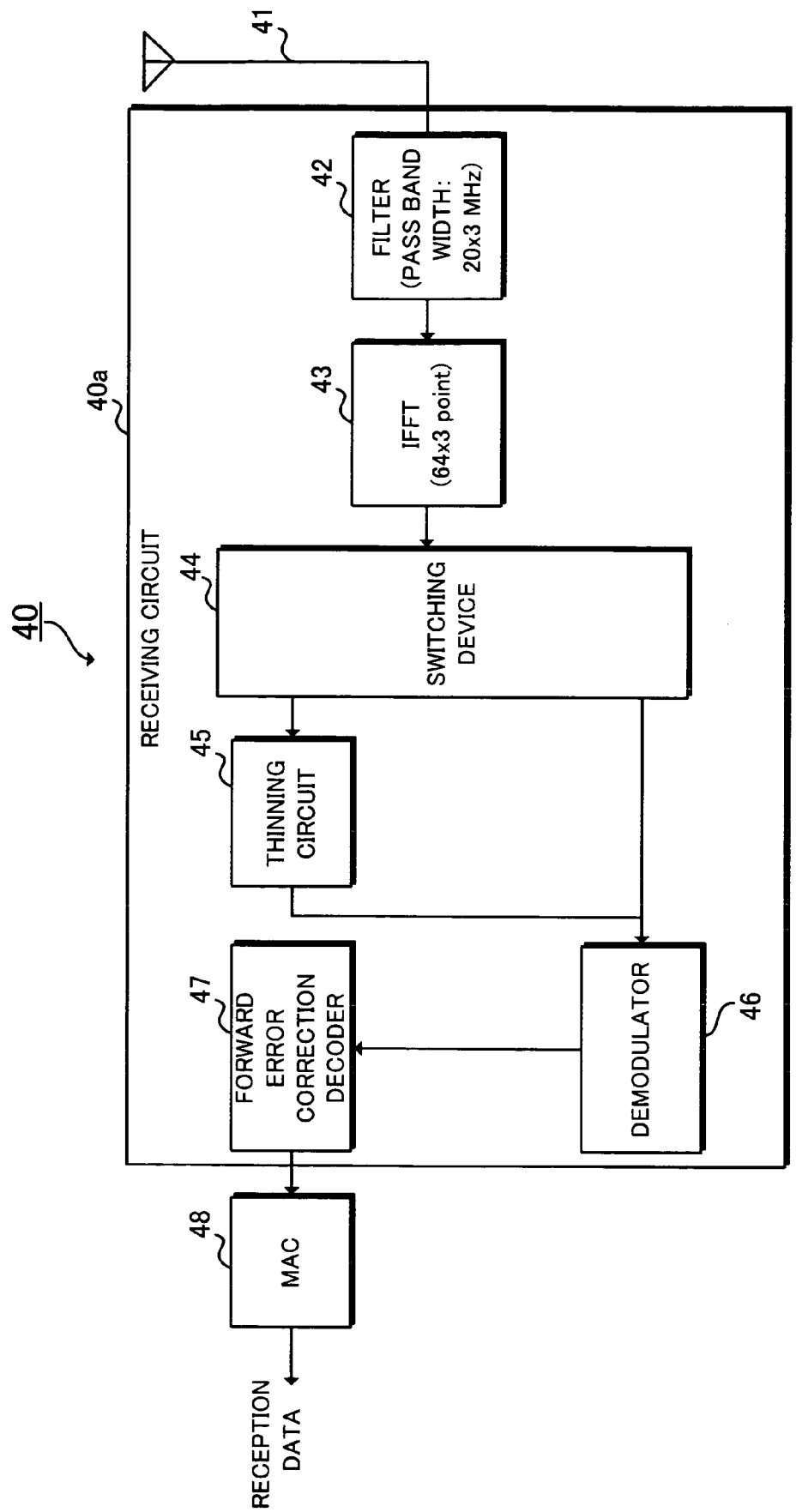
FIG. 8 is a block diagram of a receiver of the HTSTA.
Figure 9:
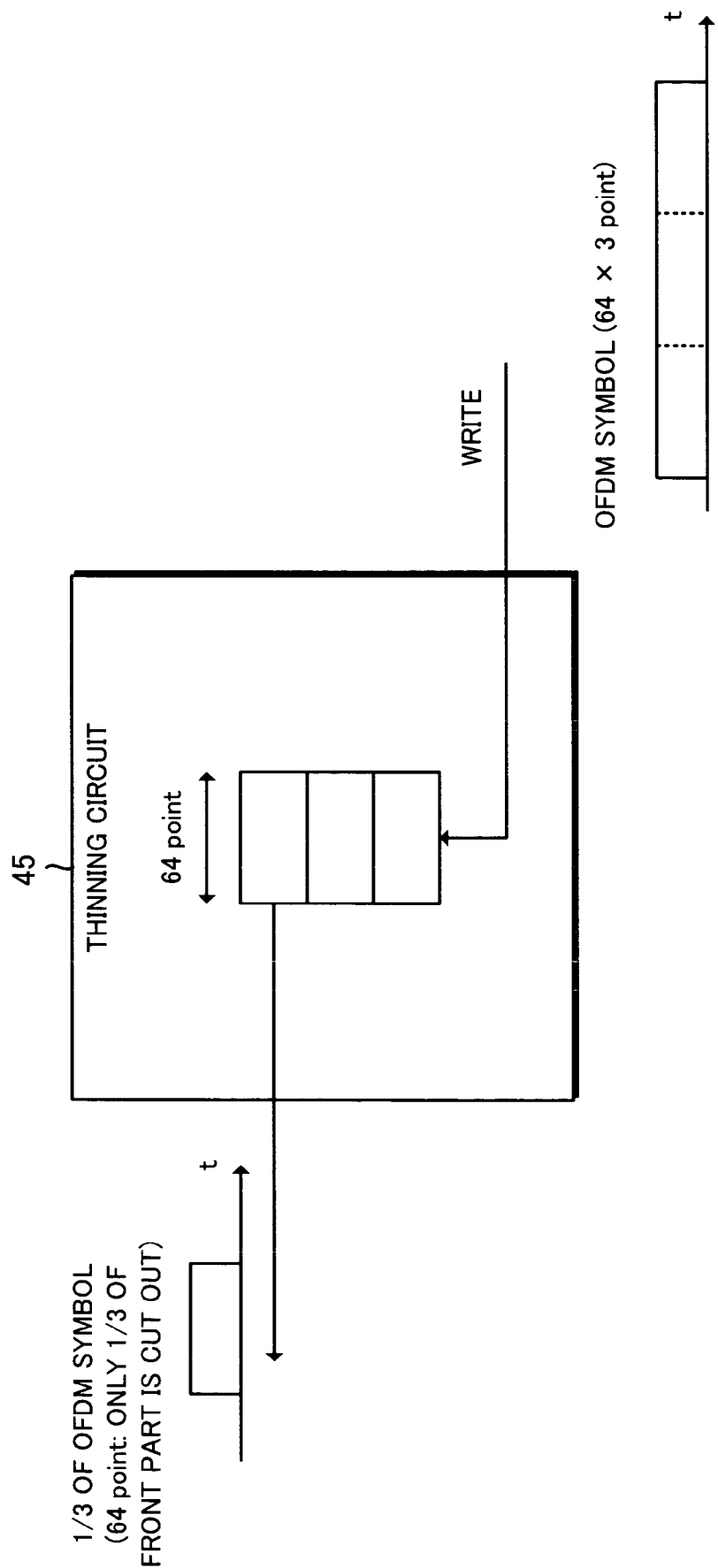
FIG. 9 is a block diagram of a thinning circuit of the receiver of the HTSTA.

On the other hand, a receiver of the HTSTA applied to the wireless LAN system, in which HT beacons are not included in the HT sequence and legacy beacons need to be demodulated, employs such a configuration as shown in FIG. 8. That is, in a receiver 40, a radio signal received by an antenna 41 undergoes a process in which only the signals in a desired band are allowed to pass by a filter circuit 42. The output signal of the filter circuit 42 is converted from a time signal into a frequency signal by an FFT circuit 43. A switching device 44 switches the output signal of the FFT circuit 43 to a thinning circuit 45 or a demodulator 46 for output. The thinning circuit 45 cuts out the first one n-th of each OFDM symbol for the signal inputted from the switching device 44, as shown in FIG. 9 (here, a case where n=3 is shown, for example). The demodulator 46 converts the signal inputted from the switching device 44 or the signal inputted from the thinning circuit 45 into a bit string based on the signal point. An Forward Error Correction Decoder 47 performs error correction decoding for the signal inputted from the demodulator 46. An MAC circuit 48 reads out the frame transmission/reception method, the frame format, etc., based on the signal inputted from the Forward Error Correction Decoder 47 and outputs the received data. The filter circuit 42, the FFT circuit 43, the switching device 44, the thinning circuit 45, the demodulator 46, and the Forward Error Correction Decoder 47 compose a receiving circuit 40a.

In the above description, a configuration in which the thinning circuit 45 is interposed between the FFT circuit 43 and the demodulator 46 is employed, but the configuration is not limited to this. Other configurations may be employed as long as the same functions as those in this configuration are provided.

Figure 10:
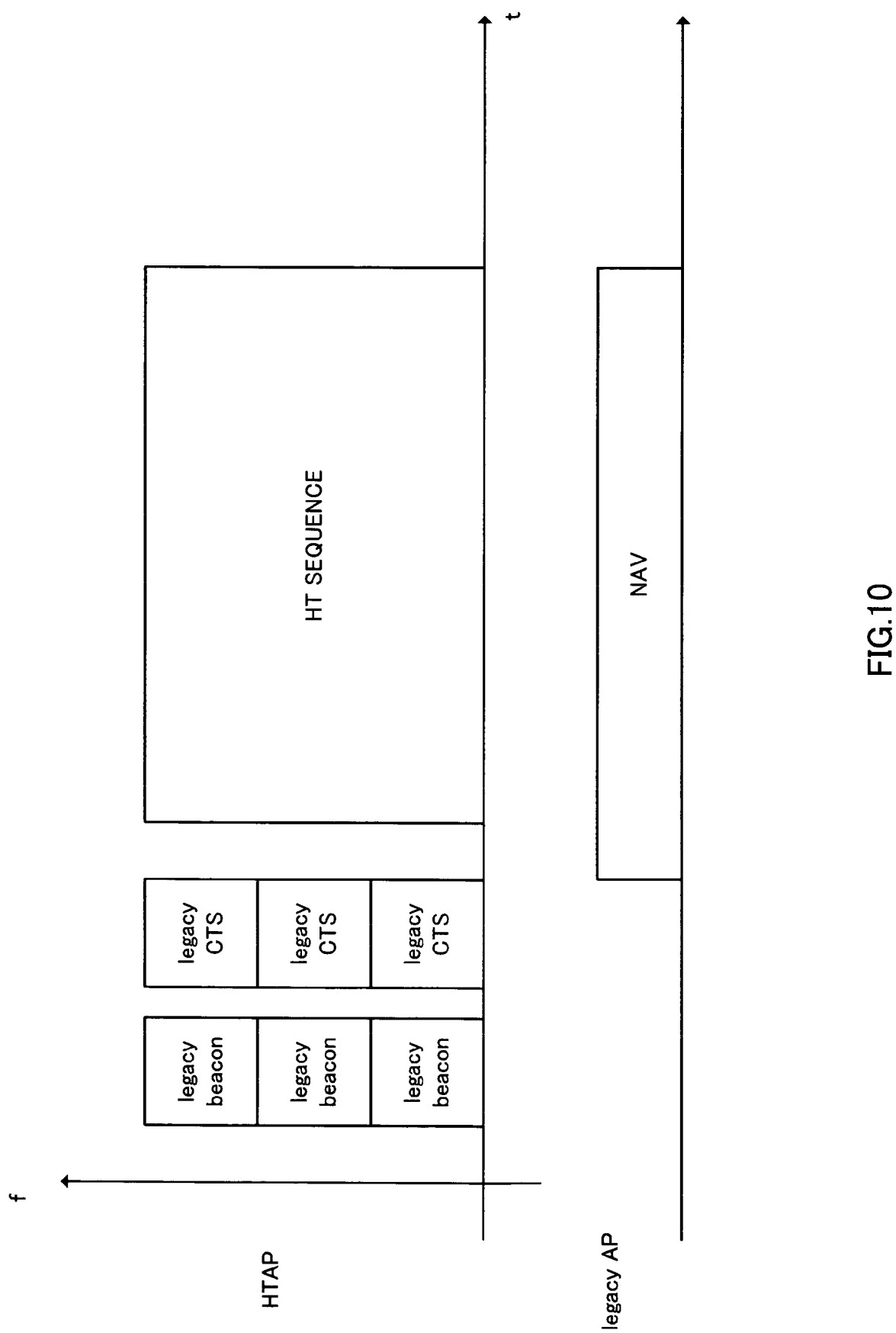
FIG. 10 is a diagram showing how an HTAP suppresses transmission for a legacy AP.

Next, the operation in the wireless LAN system according to the first embodiment is explained. FIG. 10 shows how an HTAP suppresses transmission for a legacy AP. As shown in FIG. 10, when an HTAP and a legacy AP coexist in the same frequency band, the HTAP transmits a legacy beacon, a legacy CTS, and an HT sequence (HT beacon, HT data) in this order. Due to this, it is possible to set an NAV for the legacy AP and the HT sequence can be prevented from a collision of packets. Moreover, it also becomes possible to notify the legacy AP of the presence of another AP in the frequency currently used by transmitting the legacy beacon. Here, in the case of a 5 GHz band, the legacy beacon and the legacy CTS mean a beacon of 11a format and a CTS of 11a format. In the case of a 2.4 GHz band, they mean a beacon of 11 format and a CTS of 11 format.

Figure 11:
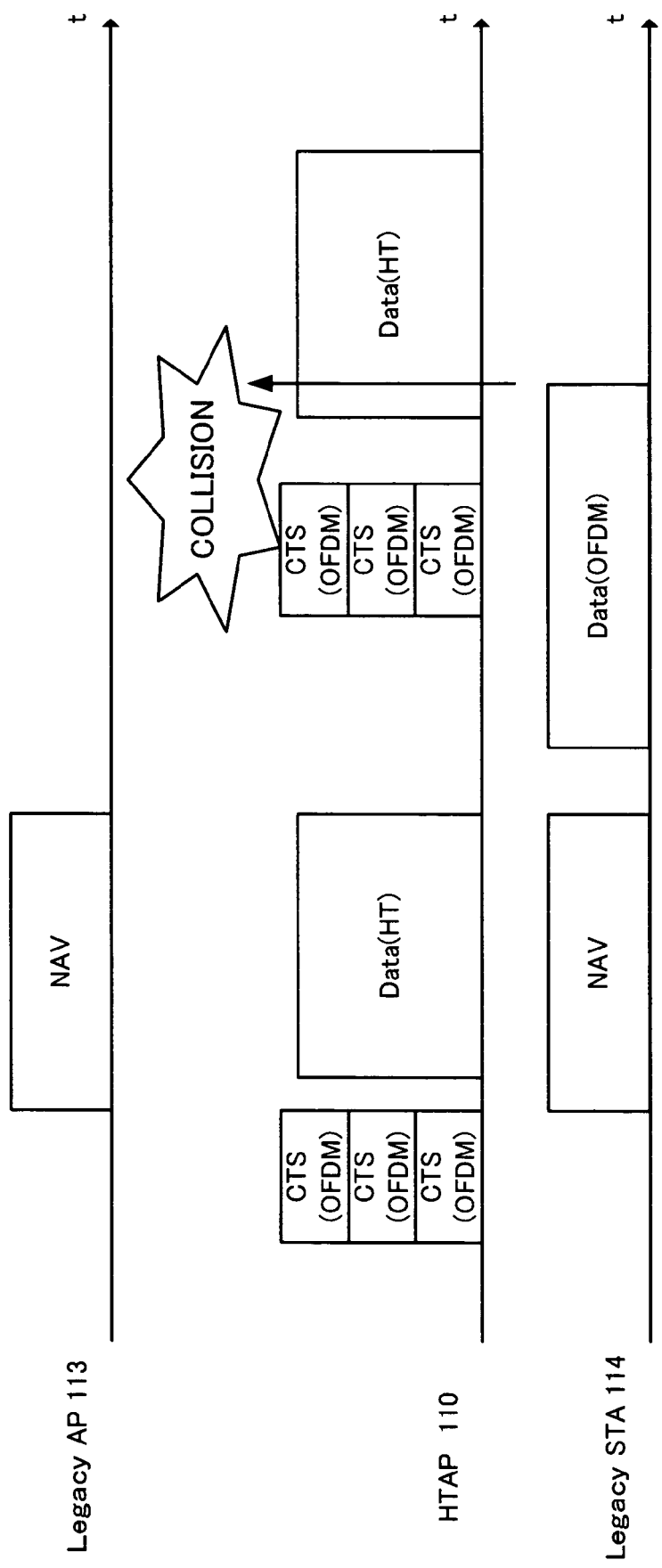
FIG. 11 is a diagram showing how packets collide with each other when an HT terminal and a legacy terminal coexist.

As shown in FIG. 11, it may also be possible to employ a method in which an HTAP 110 simply transmits a CTS immediately before transmitting HT data and occupies the interval for transmitting the HT data. However, if only this method is employed, it is expected that, for example, transmission of a signal from a legacy STA 114 is started after the transmission of the HT data is completed and the signal and a CTS transmitted by the HTAP 110 collide with each other.

Therefore, as shown in FIG. 10, it is preferable to occupy the radio medium all the time in every band. By employing this method, it is possible to avoid a collision of packets between the HT terminal and the legacy terminal. In other words, by occupying the radio medium all the time, the possibility is eliminated that the legacy terminal performs transmission during the period of transmission of packets by the HTAP and, by transmitting a signal notifying that the HTAP occupies the radio medium, it is unlikely that the signal from the legacy terminal exists before the HT sequence. In particular, it is difficult for the HT terminal to demodulate (or recognize) the signal transmitted by the legacy terminal, therefore, the fact that no transmission signal from the legacy terminal exists before the HT sequence is really essential in order to avoid a collision.

Figure 12:
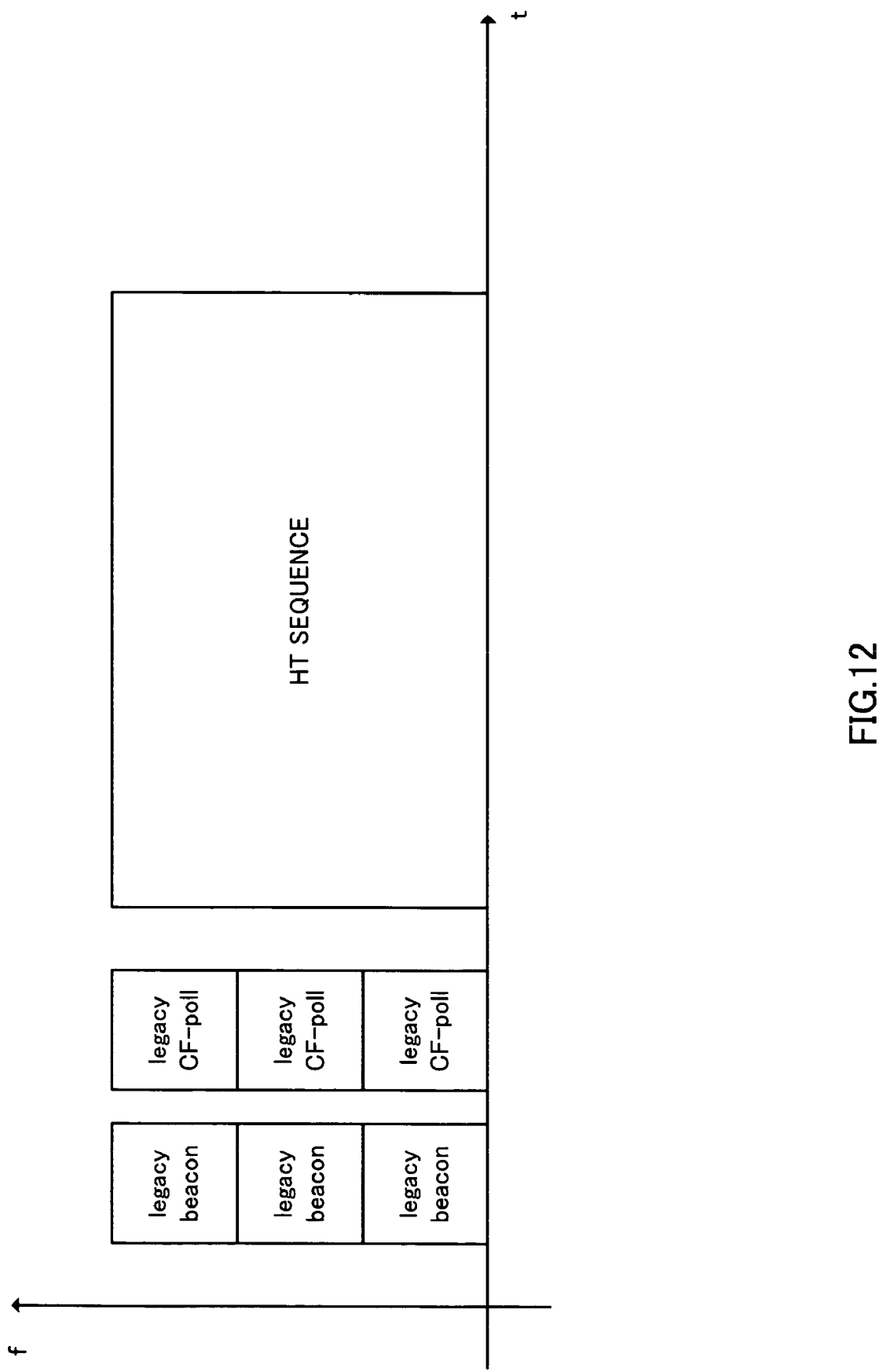
FIG. 12 is a diagram showing a configuration of data transmitted by an HTAP.

The legacy CTS transmitted by the HTAP shown in FIG. 10 may be a legacy CF-poll as shown in FIG. 12.

Figure 13:
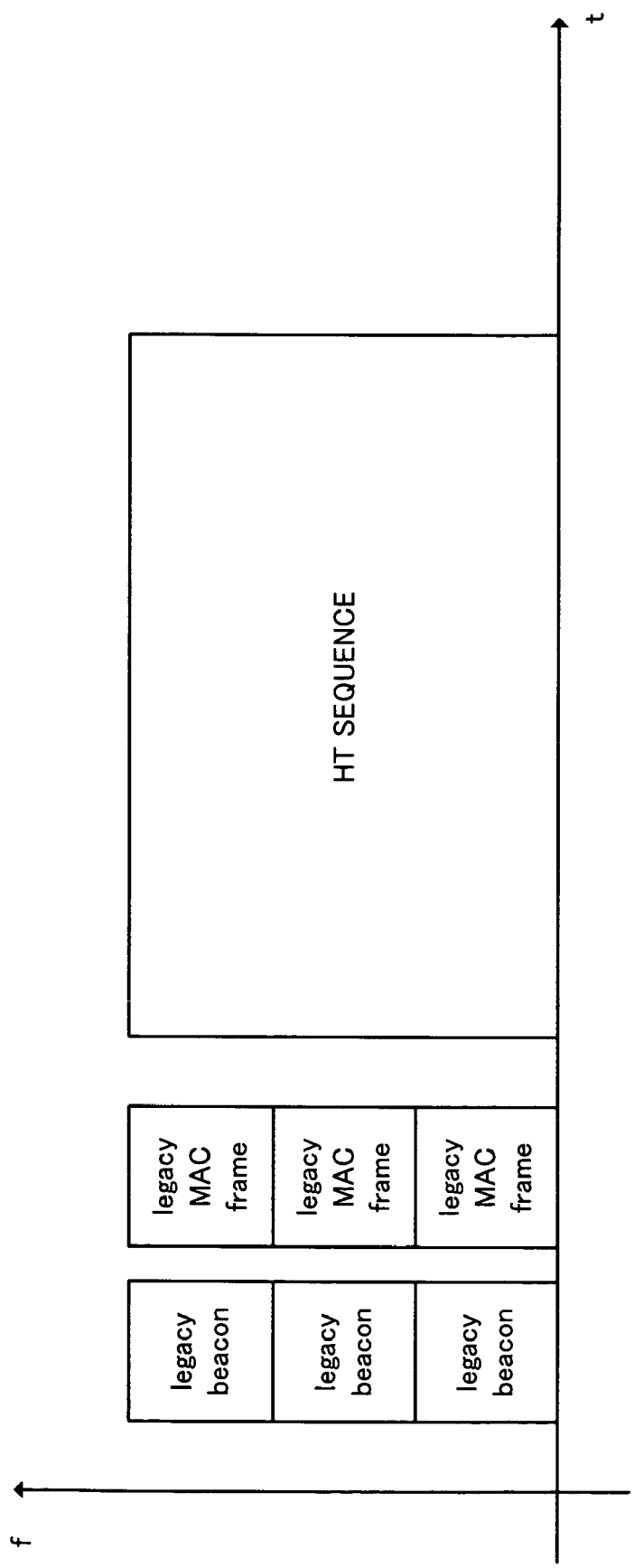
FIG. 13 is a diagram showing a configuration of data transmitted by an HTAP.
Figure 14:
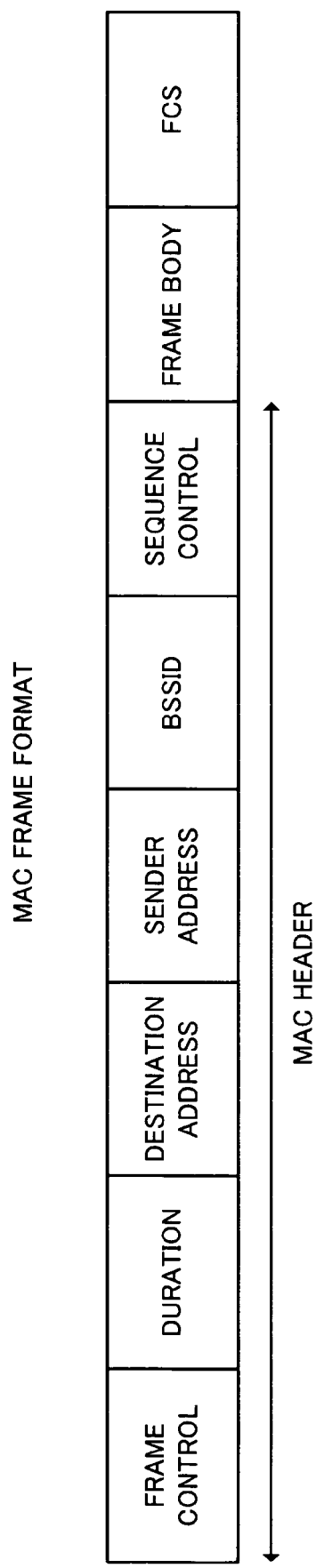
FIG. 14 is a diagram showing an MAC frame format.
Figure 15:
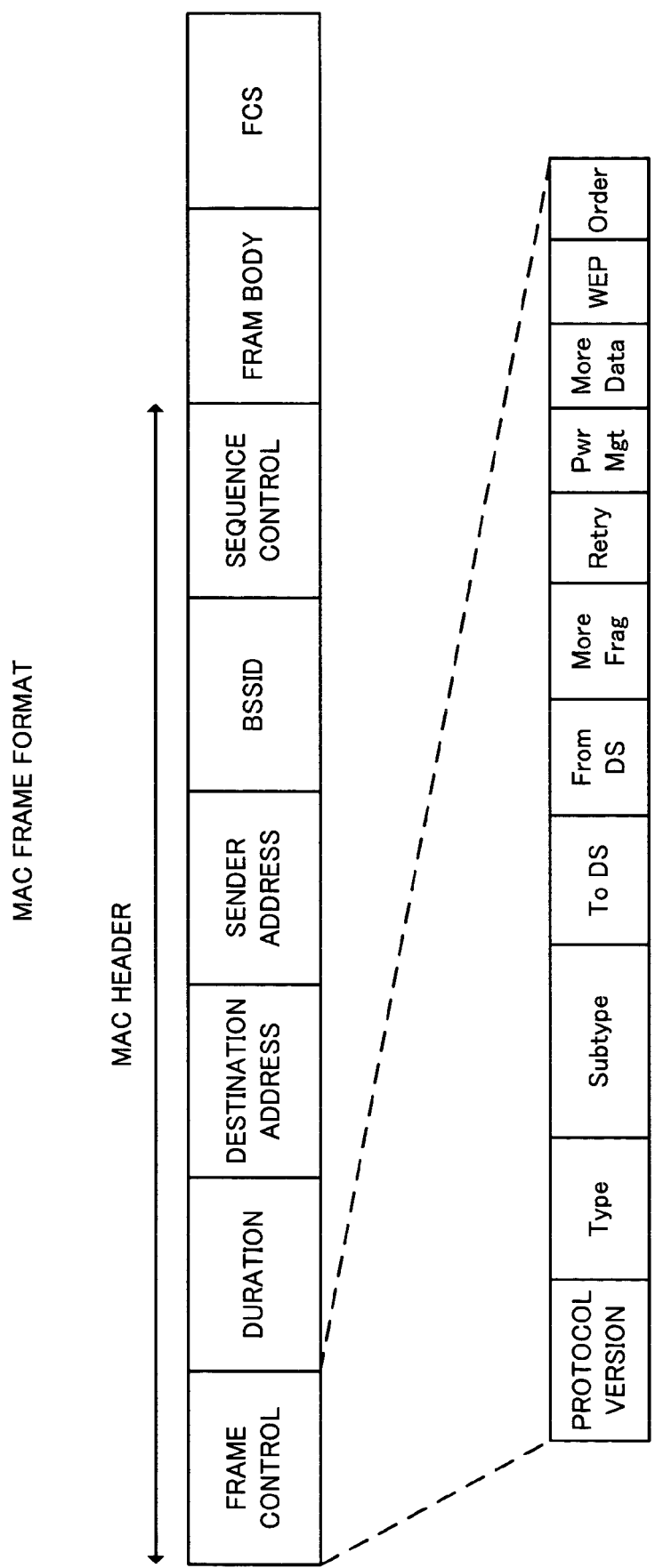
FIG. 15 is a diagram showing an MAC frame format.

Moreover, the legacy CTS transmitted by the HTAP may be a normal MAC frame that specifies the period to protect in the duration as shown in FIG. 13. An MAC frame format in this case is shown in FIG. 14. However, as shown in FIG. 15, the type and subtype included in the frame control have to be those other than the PS-Poll. This is because in the case of the PS-Poll, the duration interval indicates the AID rather than the duration (refer to IEEE 802.11—1999 7.1.3.1.2 Table—Valid type/subtype combinations).

Figure 16:
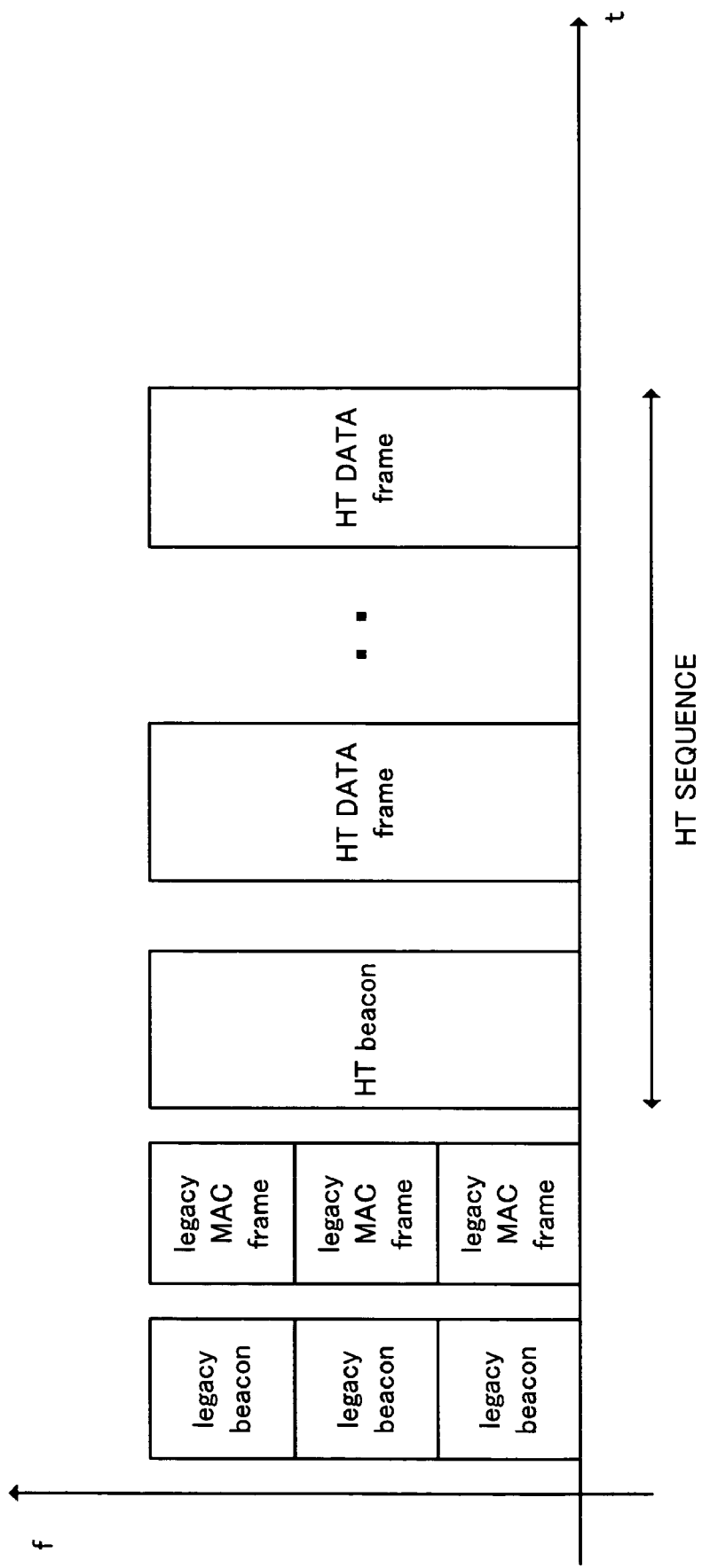
FIG. 16 is a diagram showing a configuration of data transmitted by an HTAP.

As shown in FIG. 16, HT beacons may be included in an HT sequence. As described above, when the HT beacons are included in the HT sequence, the HT terminal has an advantage of being not required to demodulate the legacy information such as the legacy beacon or the legacy CTS.

Figure 17:
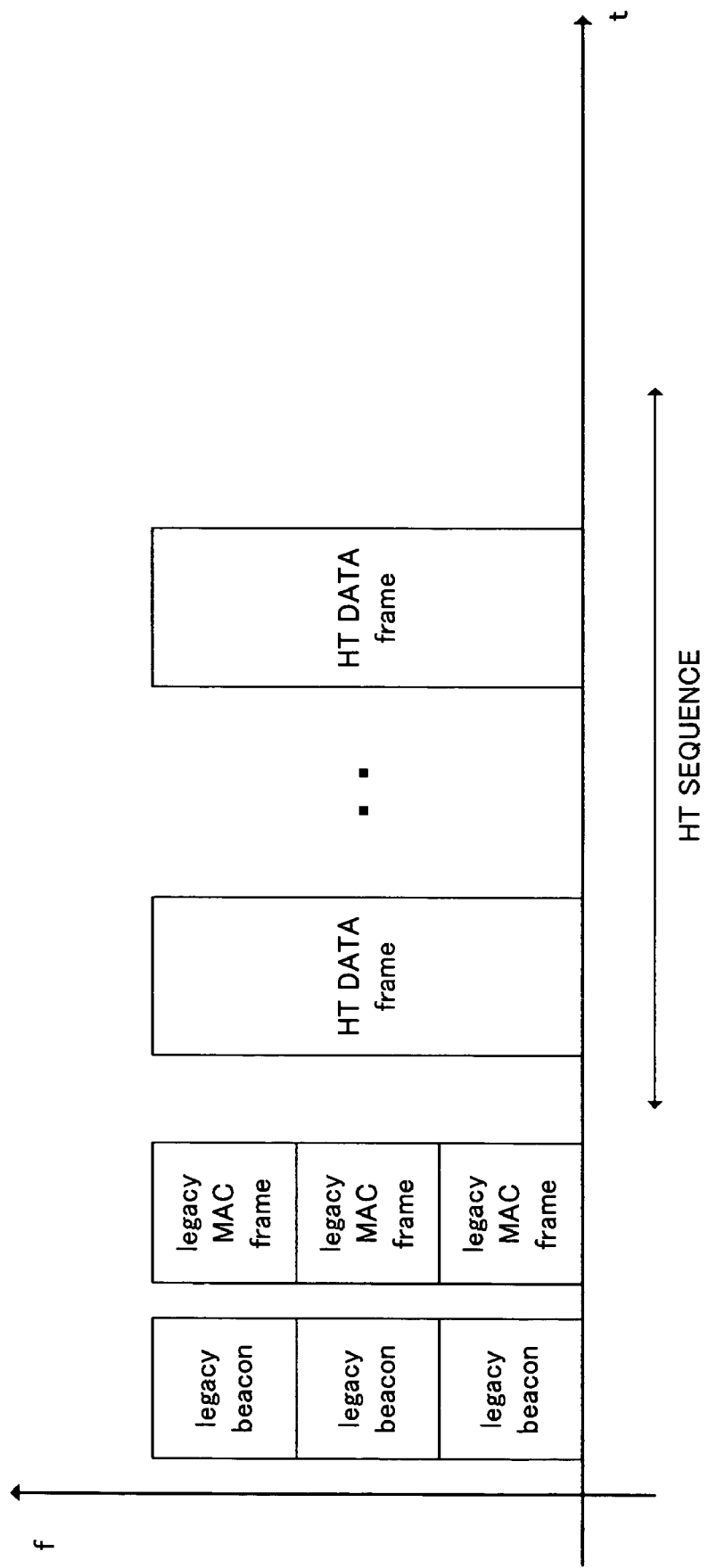
FIG. 17 is a diagram showing a configuration of data transmitted by an HTAP.

As shown in FIG. 17, HT beacons may not be included in an HT sequence. In this case, the parameter about the HT transmission (HT sequence), namely information about the band width to be used etc. is transmitted/received in the legacy beacon.

As describe above, according to the wireless LAN system in the first embodiment, since the legacy beacon and the legacy CTS are transmitted as an occupation signal before the HT sequence, it is possible to make the legacy terminal recognize these signals and notify that the HT terminal occupies the radio medium. Moreover, since transmission is performed by the HT terminal after the occupation signal is transmitted using every frequency in the frequency band n times that of the legacy terminal, it is possible to perform transmission by the HT terminal while making the legacy terminal suppress transmission and occupying the radio medium. Due to this, a collision of packets can be avoided and the deterioration of throughput can be prevented. As a result, it becomes possible to exhibit the original transmission speed between HT terminals.

Second Embodiment

Figure 18:
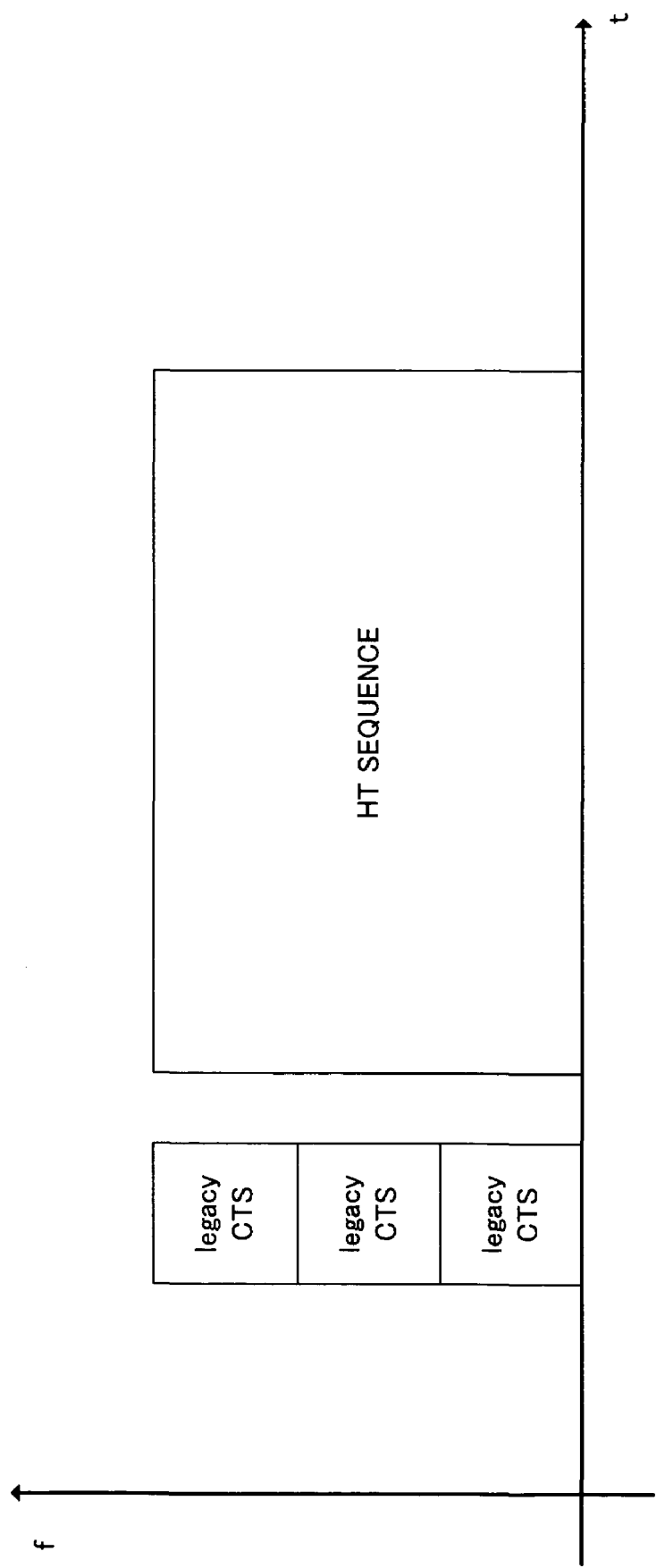
FIG. 18 is a diagram showing a configuration of data transmitted by an HTAP.
Figure 19:
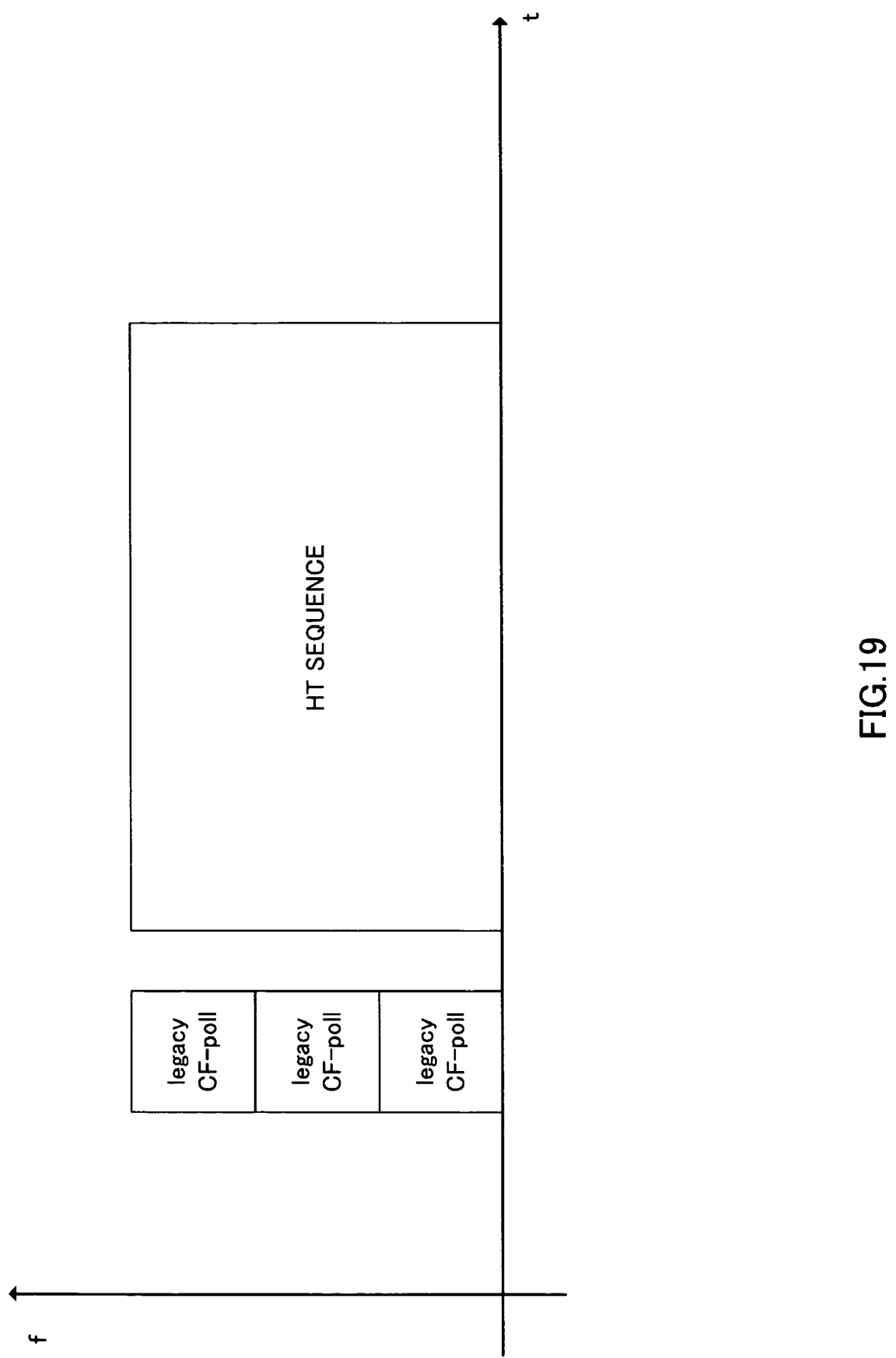
FIG. 19 is a diagram showing a configuration of data transmitted by an HTAP.

In a wireless LAN system according to a second embodiment, as in the wireless LAN system according to the first embodiment, a signal for notifying that the radio medium is occupied is transmitted and the period of time during which an HT sequence is performed is occupied logically with respect to a legacy terminal. Here, in the case where a legacy AP and an HTAP coexist in the same frequency band, as in the first embodiment, transmission of both the legacy beacon and the legacy CTS prior to the HT sequence leads to an increase in overhead. Therefore, in the second embodiment, the legacy beacon is not transmitted but the legacy CTS and the HT sequence (HT beacon, HT data) are transmitted in this order, as shown in FIG. 18. In this case also, as shown in FIG. 19, the legacy CF-poll may be used instead of the legacy CTS.

Figure 20:
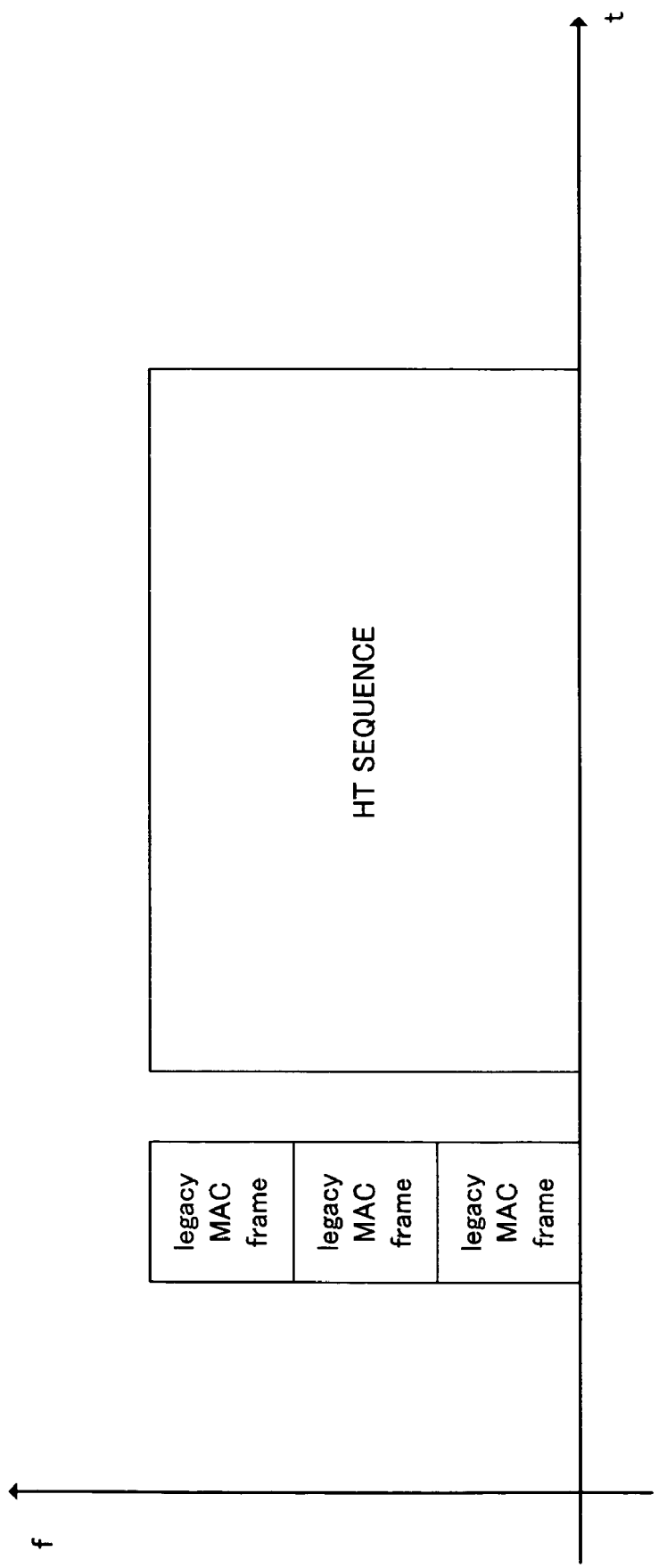
FIG. 20 is a diagram showing a configuration of data transmitted by an HTAP.
Figure 21:
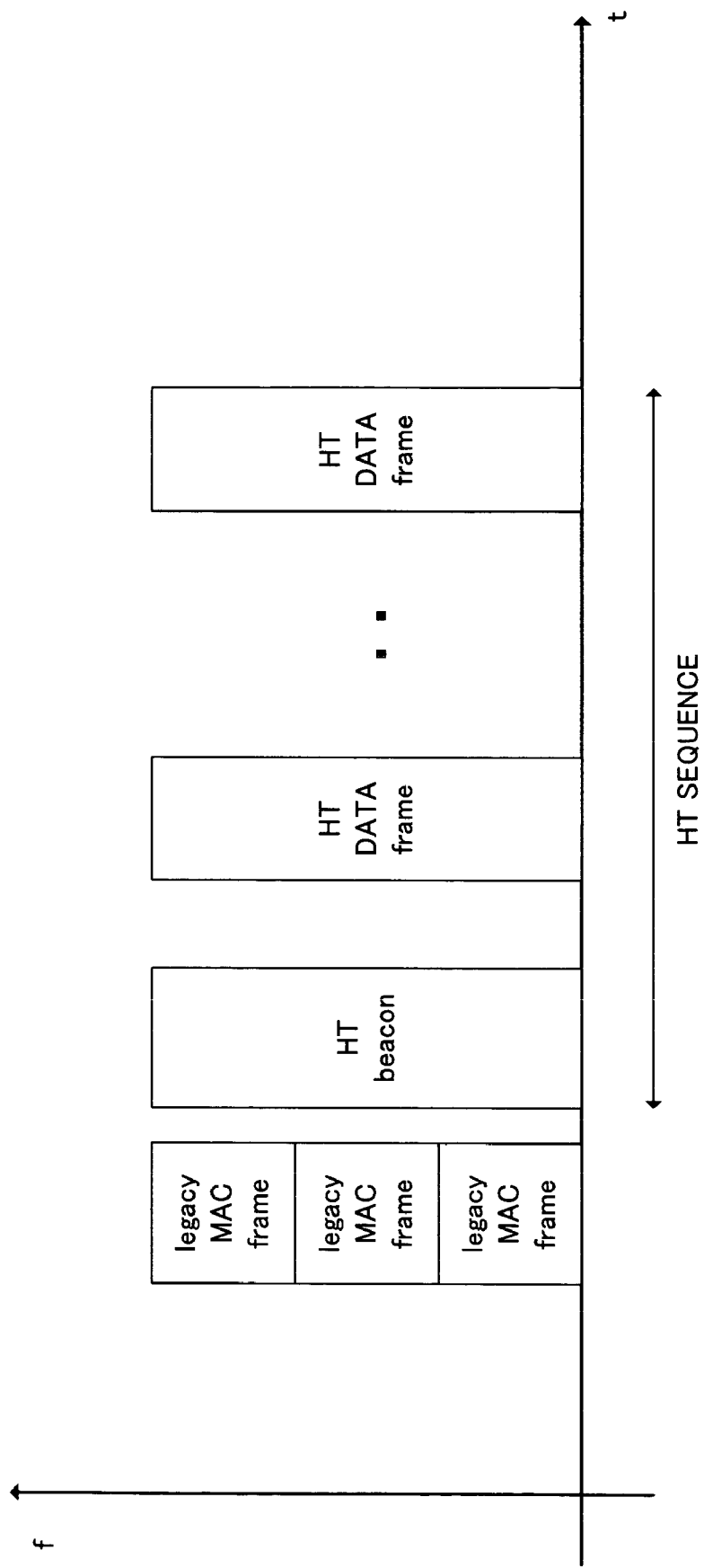
FIG. 21 is a diagram showing a configuration of data transmitted by an HTAP.

As shown in FIG. 20, the normal MAC frame that specifies the period to protect in the duration may be used. However, as explained in FIG. 14 and FIG. 15, the type and subtype included in the frame control have to be those other than the PS-Poll (refer to IEEE 802.11—1999 7.1.3.1.2 Table 1—Valid type/subtype combinations). In this case, as shown in FIG. 21, the HT beacons have to be included in the HT sequence.

As described above, according to the wireless LAN system in the second embodiment, it becomes possible to improve the throughput without increasing overhead.

Third Embodiment

In a wireless LAN system according to a third embodiment, coexistence of the HT terminal and the legacy terminal is realized. In other words, the HT terminal occupies a part of period of the radio medium but does not occupy another part, thereby the coexistence with the legacy terminal is realized.

Figure 22:
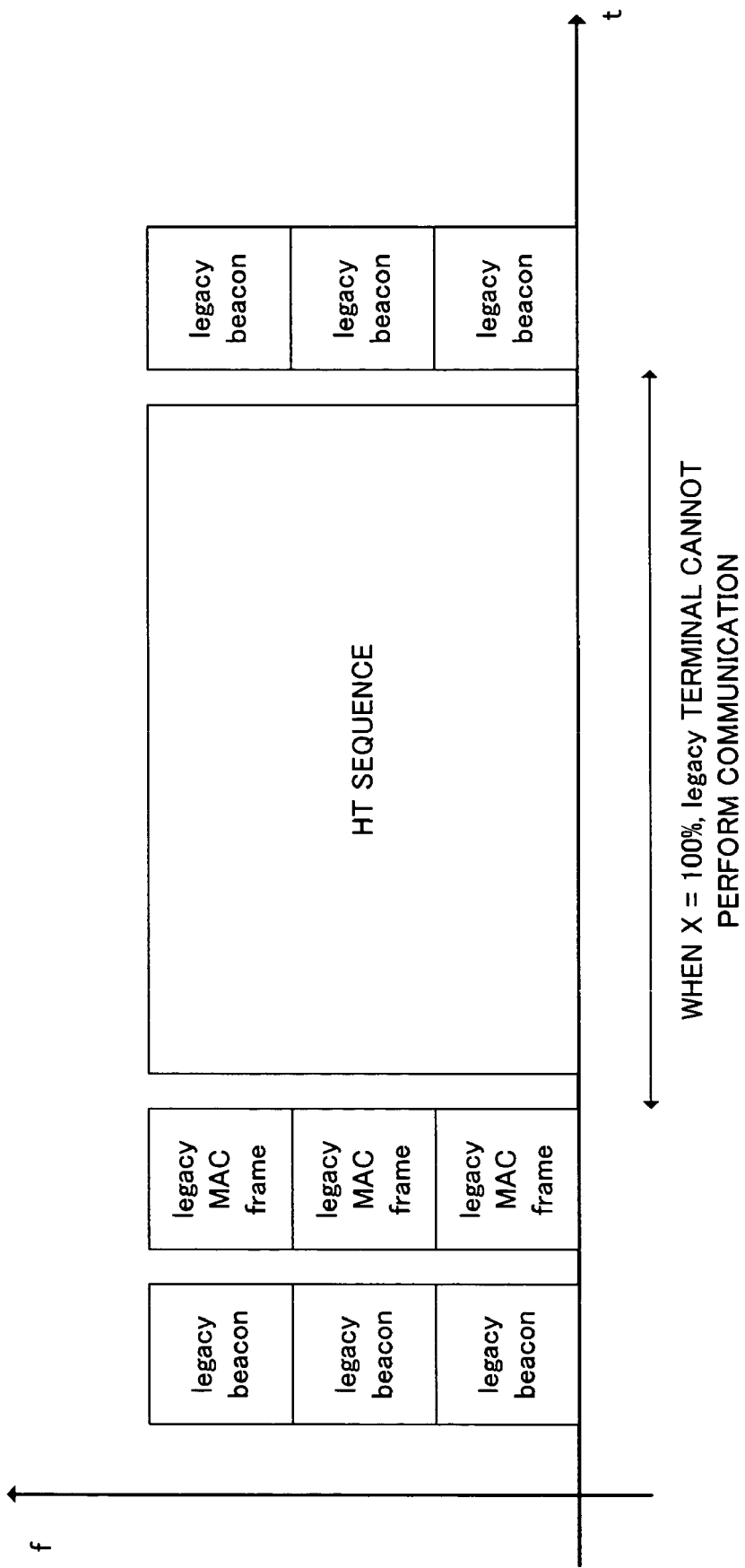
FIG. 22 is a diagram showing a configuration of data transmitted by an HTAP.
Figure 23:
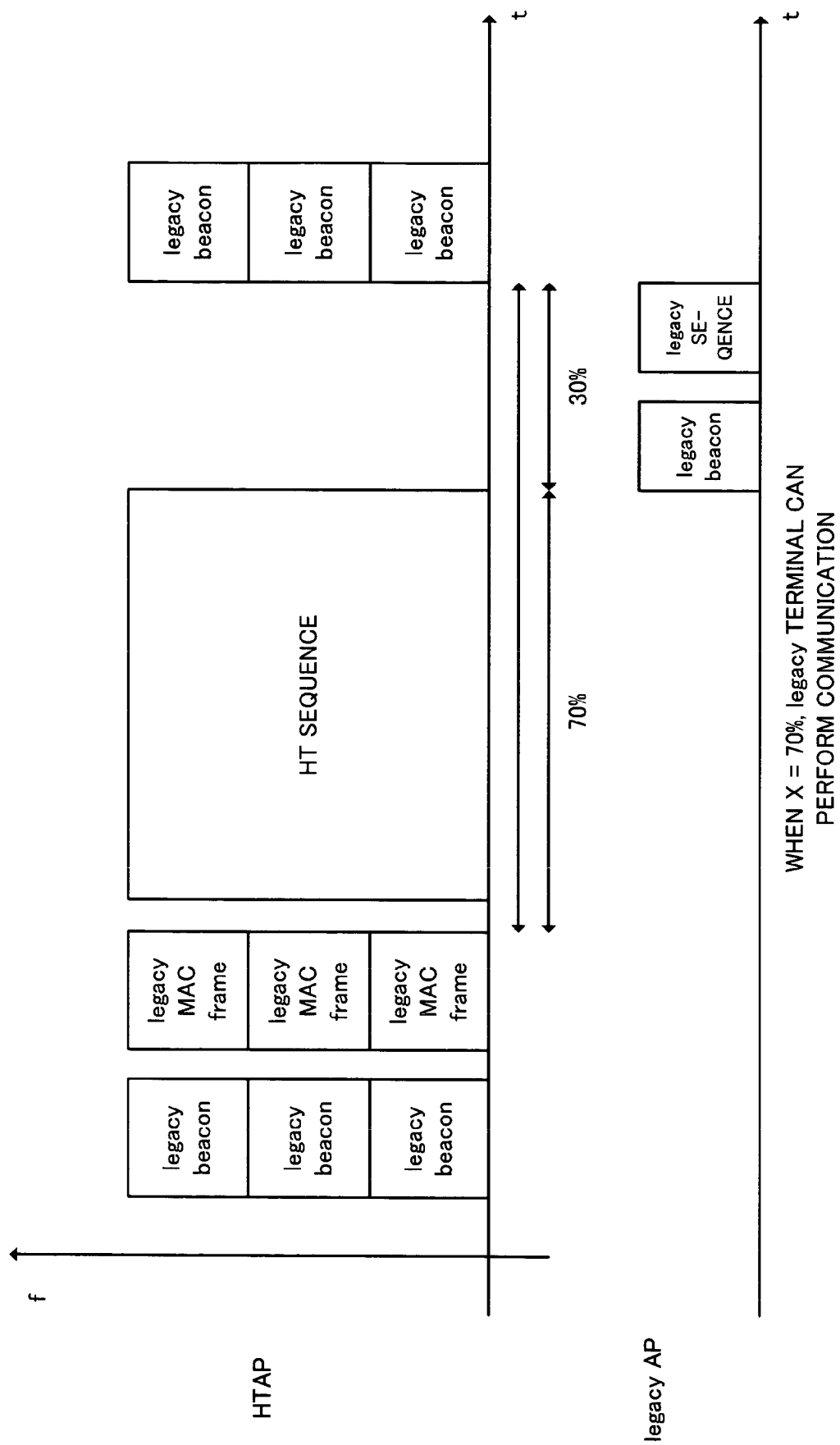
FIG. 23 is a diagram showing a configuration of data transmitted by an HTAP.

In the third embodiment, the time of duration in a legacy MAC frame transmitted by the HT terminal is set to x % (x % is equal to or less than 100%) of the interval from the end of the legacy MAC frame to the next beacon. It is possible to adjust the ratio of communication time of the HT terminal to that of the legacy terminal in accordance with this ratio (the ratio of the part of the radio medium occupied by the HT terminal to the whole). FIG. 22 shows a state in which the HT terminal occupies 100% of the interval from the end of the legacy MAC frame to the next beacon. FIG. 23 shows a state in which the HT terminal occupies, for example, 70% of the interval from the end of the legacy MAC frame to the next beacon and the legacy terminal occupies the rest, that is, 30% thereof. Due to this, the coexistence of the HT terminal and the legacy terminal is made possible. By the way, the ratio (x %) may be a fixed value or variable. Hereinafter, it is assumed that when x=100%, the radio medium is occupied perfectly and when x<100, a part of period of the radio medium is occupied.

Figure 24:
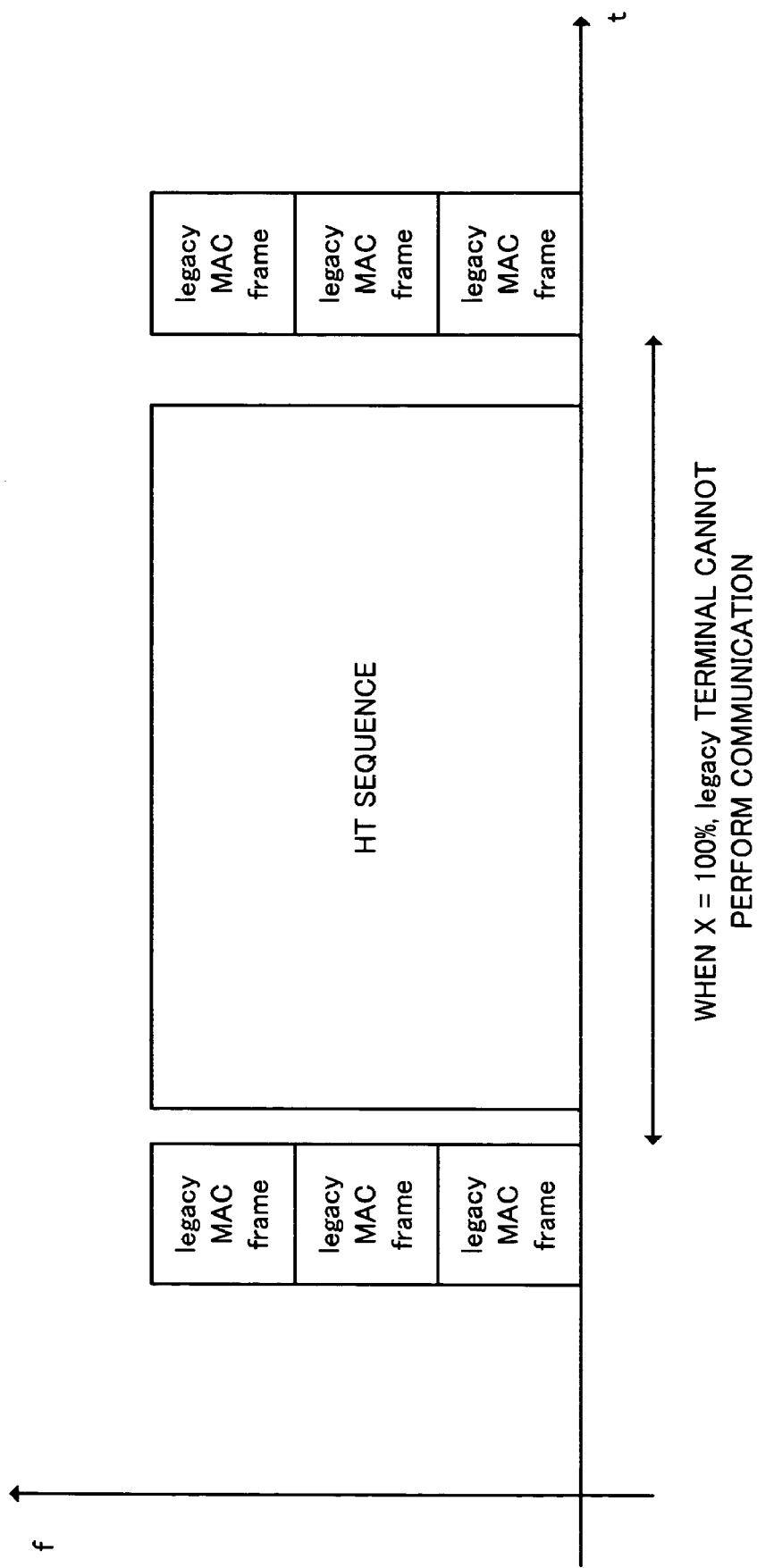
FIG. 24 is a diagram showing a configuration of data transmitted by an HTAP.
Figure 25:
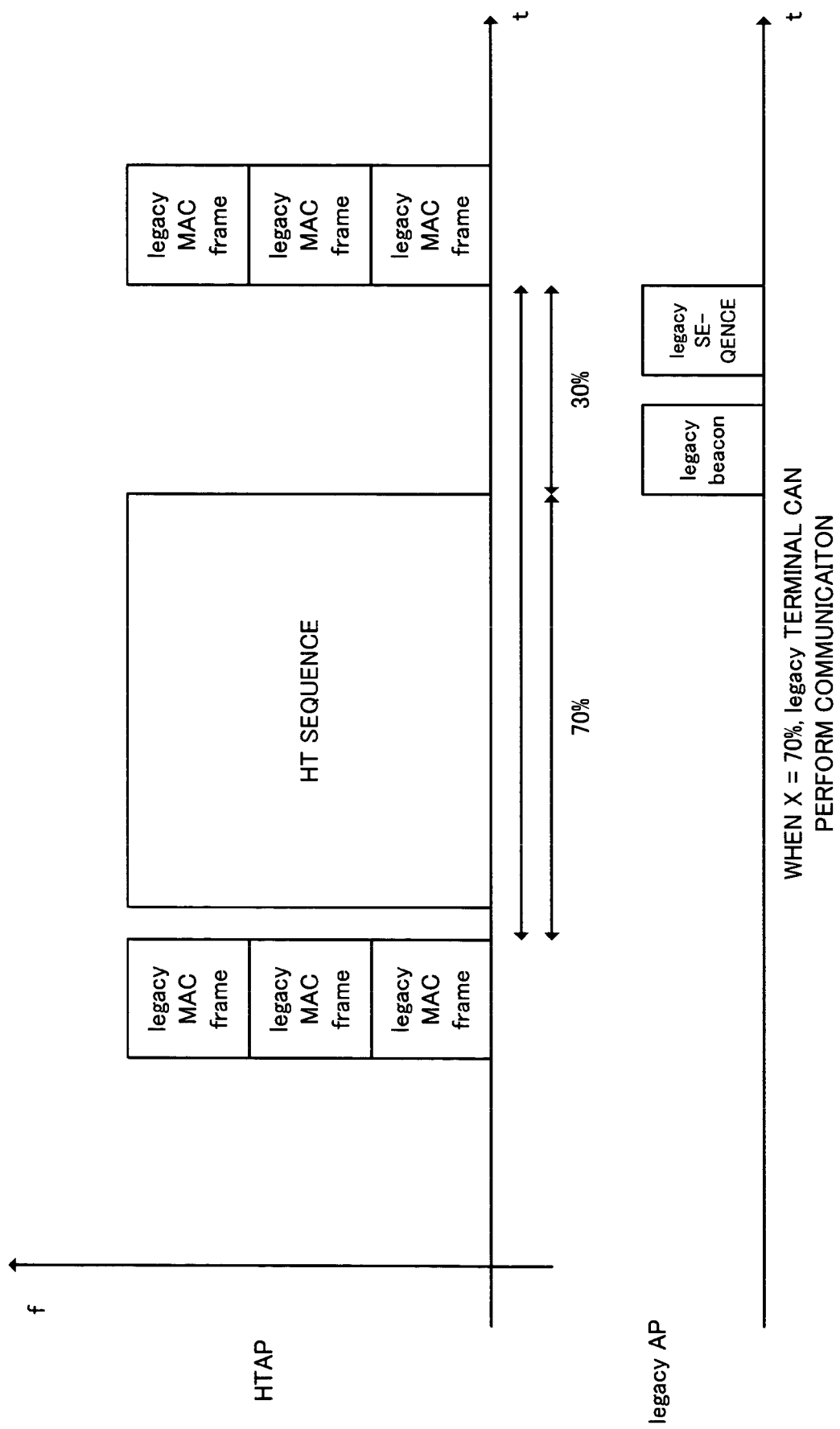
FIG. 25 is a diagram showing a configuration of data transmitted by an HTAP and a legacy AP.

As shown in FIG. 24 and FIG. 25, it may also possible to transmit the legacy MAC frame and the HT sequence (HT beacon, HT data) in this order without transmitting the legacy beacon and set the time of the duration in the legacy MAC frame to x % (x % is equal to or less than 100%) of the interval from the end of the legacy MAC frame to the next legacy MAC frame.

In the explanation described above, a case where the setting of the duration is performed in the legacy MAC frame is shown, but the CTS or the legacy CF-Poll may be used instead of the legacy MAC frame.

Figure 26:
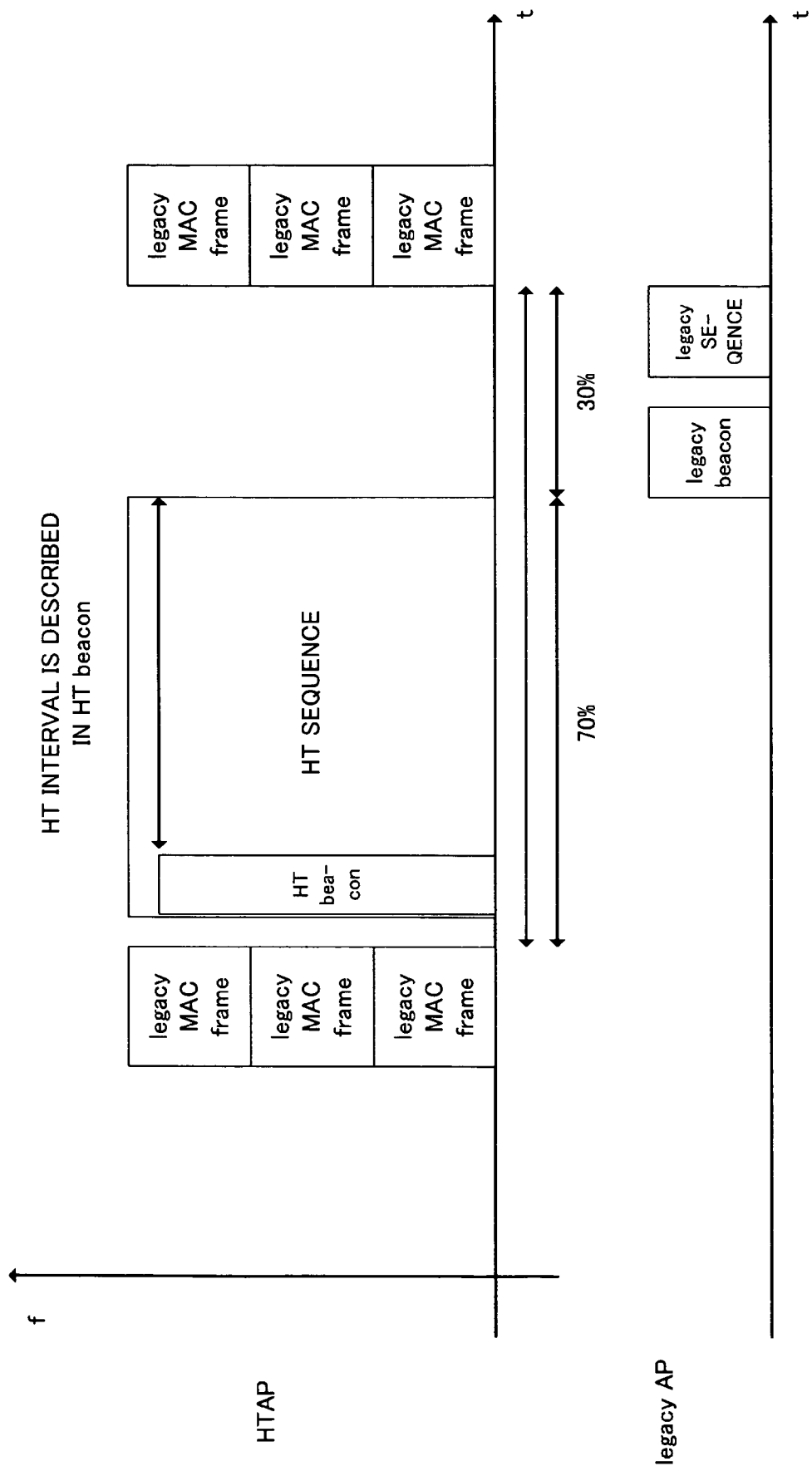
FIG. 26 is a diagram showing a configuration of data transmitted by an HTAP and a legacy AP.
Figure 27:
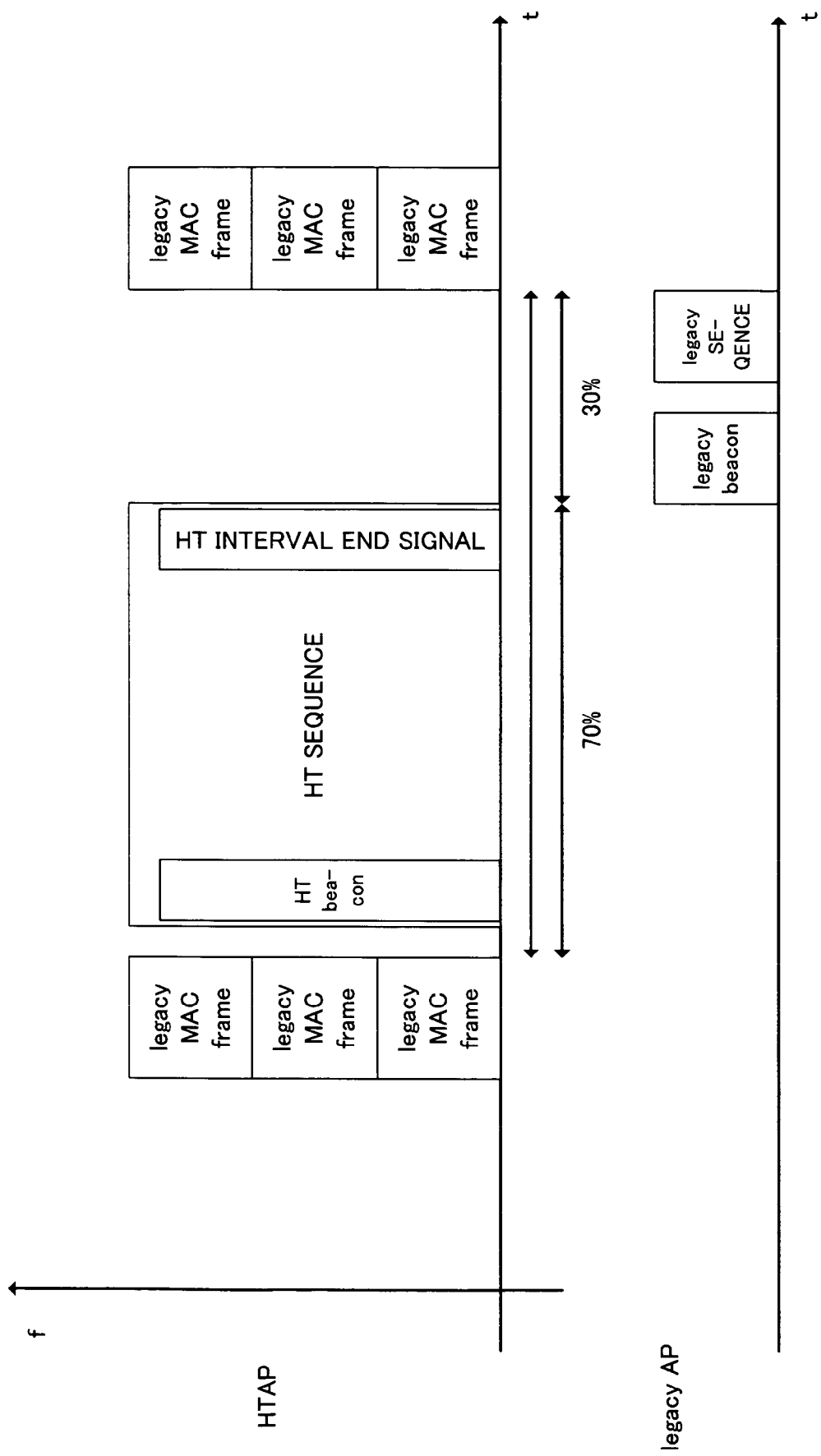
FIG. 27 is a diagram showing a configuration of data transmitted by an HTAP and a legacy AP.

Next, it is necessary for an HTSTA to know an HT sequence interval in which HT transmission is possible, therefore, a method for notifying the interval of the HT sequence from an HTAP to the HTSTA is described below. As shown in FIG. 26, an HT beacon in which information about the HT sequence interval is described is included in the HT sequence. On the other hand, as shown in FIG. 27, an HT beacon in which information about the HT sequence interval is described may be included in the HT sequence and an HT interval end signal may be included at the rear of the HT sequence. Due to this, it becomes possible for the HTSTA that receives the HT beacon to grasp the interval during which HT transmission is possible.

Figure 28:
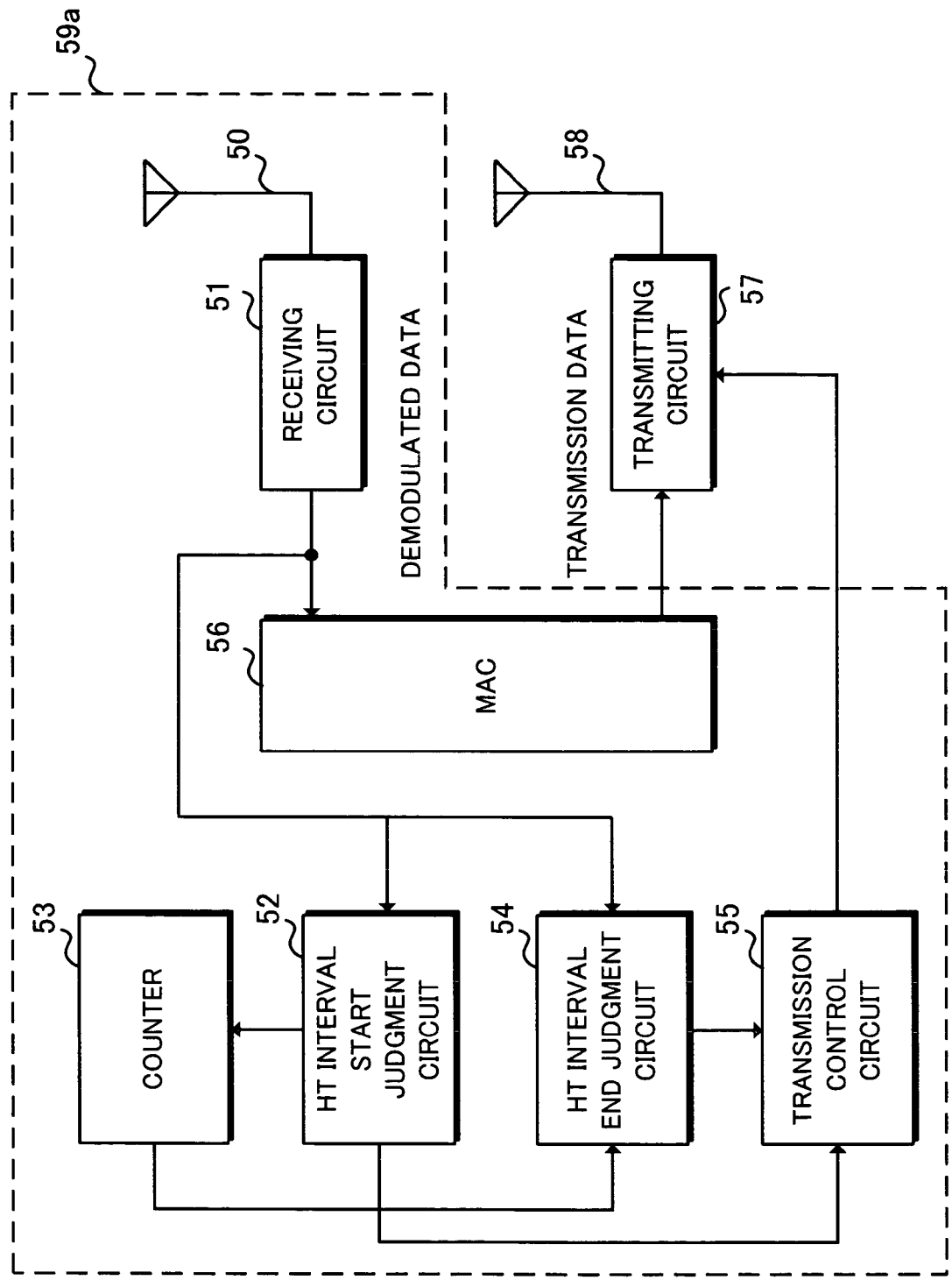
FIG. 28 is a block diagram of an HTSTA.

As shown in FIG. 26, in the case of the wireless LAN system in which the HT beacon describing information about the HT sequence interval is included in the HT sequence, the HTSTA employs such a configuration as shown in FIG. 28. In other words, a radio signal received by an antenna 50 is demodulated in a receiving circuit 51. An HT interval start judgment circuit 52 judges the start of the HT interval based on the HT beacon included in the demodulated data outputted from the receiving circuit 51. A counter circuit 53 starts a counter based on the output signal of the HT interval start judgment circuit 52. This counter counts the time elapsed from the start of the HT interval. An HT interval end judgment circuit 54 judges the end of the HT interval together with the output of the counter circuit 53 according to information about the HT interval included in the HT beacon. A transmission control circuit 55 controls a transmitting circuit 57 based on the output signal of the HT interval start judgment circuit 52 and the output signal of the HT interval end judgment circuit 54. An MAC circuit 56 defines the transmission/reception method, the format, etc., of a frame that is a transmission/reception unit of data for transmission data and reads out the transmission/reception method of the frame, the frame format, etc., from the received data. The transmitting circuit 57 undergoes the control of the transmission control circuit 55 and the MAC circuit 56, converts the transmission data into a radio signal, and transmits the signal through an antenna 58. Due to such a configuration, it becomes possible for the HTSTA to grasp the start and end of the HT sequence interval. However, receiving circuit 51 is assumed to be the one to adopt the same composition as receiving circuit 40$a$ shown in FIG. 8. Moreover, transmitting circuit 57 is assumed to be the one to adopt the same composition as transmission circuit 20$a$ shown in FIG. 3. Above-mentioned antenna 50, receiving circuit 51, HT interval start judgment circuit 52, counter circuit 53, HT interval end judgment circuit 54, transmission control circuit 55, and MAC circuit 56 compose receiver 59$a$.

Figure 29:
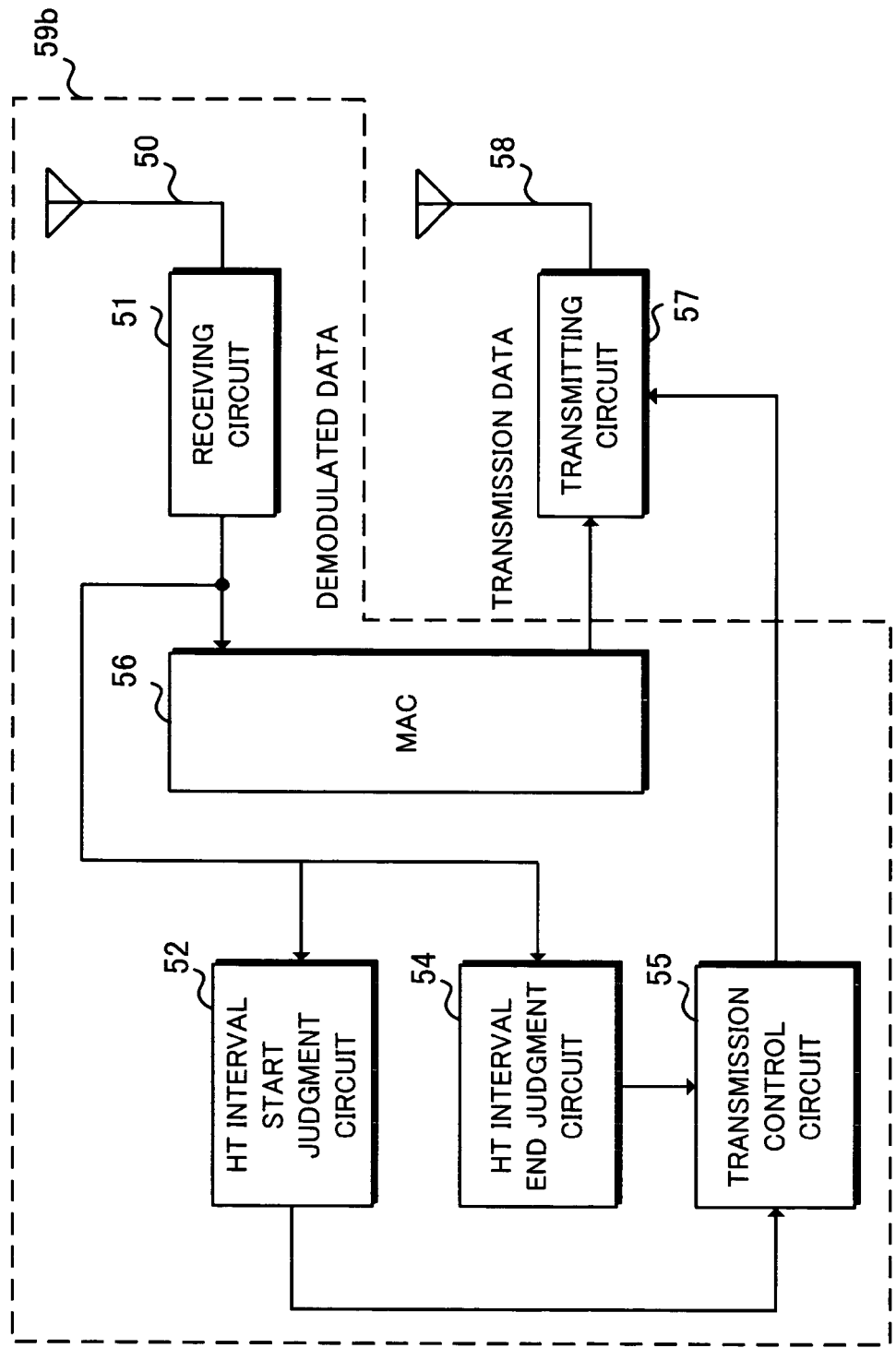
FIG. 29 is a block diagram of an HTSTA.

As shown in FIG. 27, in the case of the wireless LAN system in which the HT beacon describing information about the HT sequence interval is included in the HT sequence and the HT interval end signal is included at the rear of the HT sequence, the HTSTA employs such a configuration as shown in FIG. 29. Here, since both the signals indicating the start and the end of the HT sequence are transmitted, it is possible for the HTSTA to easily grasp the HT sequence interval. Therefore, the configuration is the same as that shown in FIG. 28, from which the counter circuit 53 is removed.

In FIG. 29, at the HTSTA, the HT interval start judgment circuit 52 judges the start of the HT interval based on the HT beacon included in the demodulated data outputted from the receiving circuit 51. The HT interval end judgment circuit 54 judges the end of the HT interval by receiving the HT interval end signal. The transmission control circuit 55 controls the transmitting circuit 57 based on the output signal of the HT interval start judgment circuit 52 and the output signal of the HT interval end judgment circuit 54. Due to this, it is possible for the HTSTA to grasp the start of the HT interval by the HT beacon included at the top of the HT sequence, grasp the end of the HT interval by the HT interval end signal included at the rear of the HT sequence, and know the interval during which HT transmission is possible. Above-mentioned antenna 50, receiving circuit 51, HT interval start judgment circuit 52, HT interval end judgment circuit 54, transmission control circuit 55, and MAC circuit 56 compose receiver 59b.

As described above, according to the wireless LAN system in the third embodiment, it becomes possible to reserve a period during which the legacy terminal performs transmission by changing the occupation period during which the radio medium is occupied. Therefore, while the HT terminal occupies 100% of the radio medium, the transmission by the legacy terminal is suppressed, a collision of packets is avoided, and the deterioration of throughput is prevented. On the other hand, while the HT terminal does not occupy the radio medium, since the legacy terminal can perform transmission, the coexistence of the HT terminal and the legacy terminal becomes possible. Moreover, since the HT beacon describing information about the HT sequence interval is included in the HT sequence, it is possible for the HTSTA to clearly grasp the start of the period during which transmission is performed. Moreover, since the HTAP transmits the HT interval end signal, it becomes possible for the HTSTA to clearly grasp the end of the period during which transmission is performed without measuring the elapsed time from the start of the period. Since the start and end of the above-mentioned period can be clearly grasped by the receiving side, it becomes possible to easily configure a system in which the occupation period during which the HTAP and HTSTA occupy a part of the period of the radio medium is changed.

Fourth Embodiment

Figure 30:
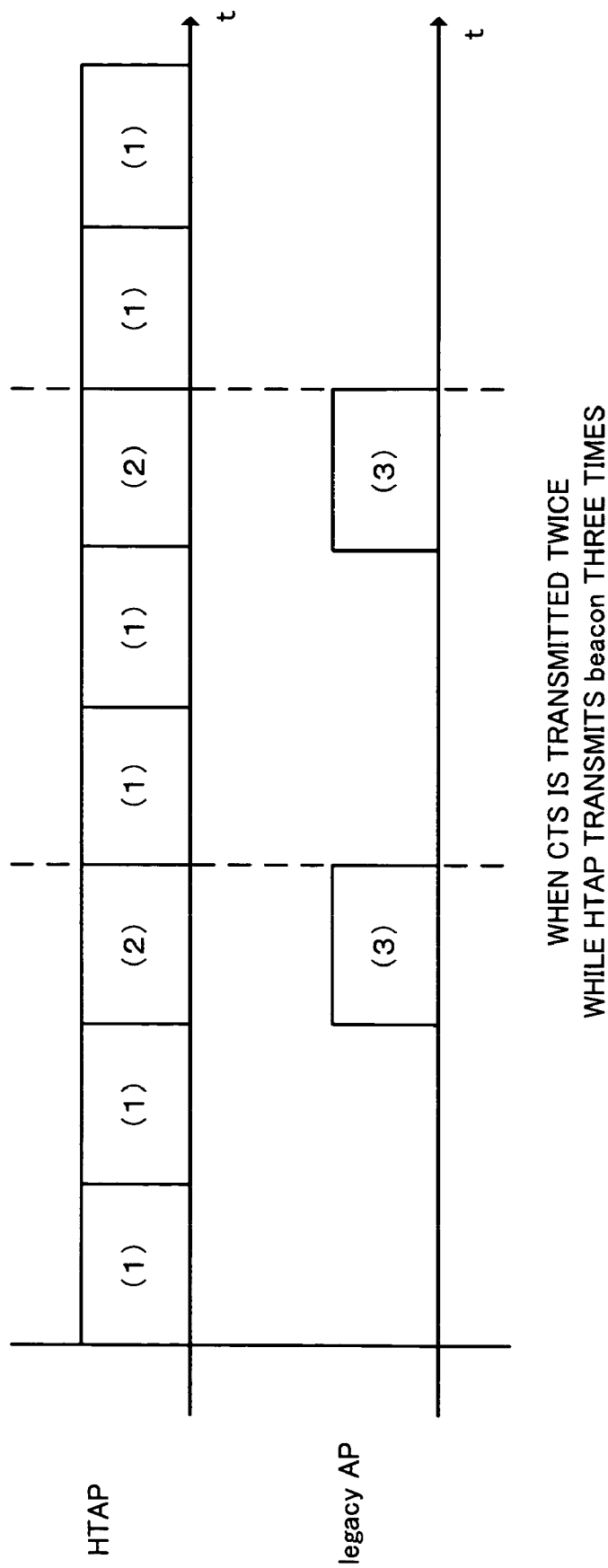
FIG. 30 is a diagram showing an interval in which an HTAP and a legacy AP can perform transmission.

In a wireless LAN system according to a fourth embodiment, an occupation signal for the occupation of the radio medium is transmitted intermittently in order to realize the coexistence of the HT terminal and the legacy terminal. The wording "to transmit intermittently" means to transmit or not to transmit an occupation signal at fixed time intervals. For example, in the case of the frame configuration shown in FIG. 13, while the legacy beacon is transmitted L times (L is a natural number), the legacy MAC frame is transmitted only m times (m is a natural number, equal to or less than L) and not transmitted otherwise. In the case where only the legacy MAC frame is transmitted as in the frame configuration shown in FIG. 19, if the legacy MAC frame is transmitted P times (P is a natural number), the legacy MAC frame is not transmitted in the next frame. Due to this, in the interval during which the legacy MAC frame is not transmitted, it becomes possible for the legacy terminal to transmit a signal. Therefore, it is possible to adjust the ratio of the communication time between the HT terminal and the legacy terminal, as shown in FIG. 30. In other words, if it is assumed in FIG. 30 that the interval during which the HTAP transmits the legacy MAC frame to occupy the radio medium is represented by (1) and the interval during which the HTAP does not transmit the legacy MAC frame nor occupy the radio medium is represented by (2), it becomes possible for the legacy terminal to perform transmission in the interval (3).

Figure 31:
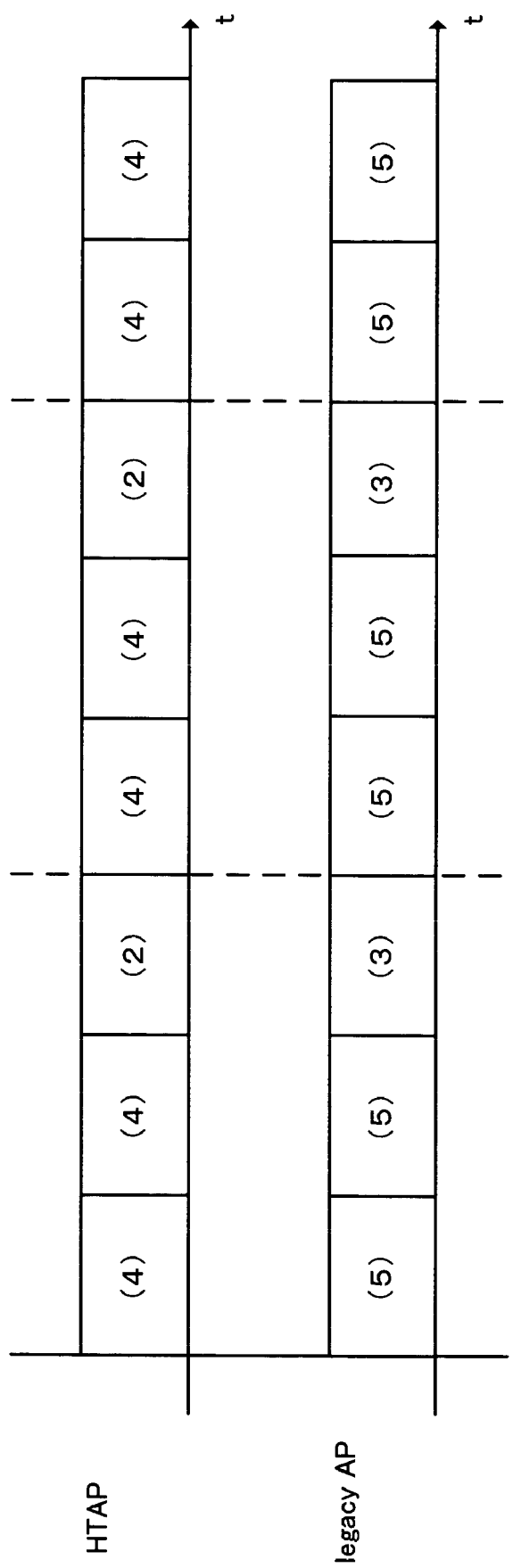
FIG. 31 is a diagram showing an interval in which an HTAP and a legacy AP can perform transmission.

Moreover, even when the HTAP transmits the legacy MAC frame to occupy the radio medium as shown in FIG. 31, if it is assumed that x % of the interval (4) is occupied, it is possible for the legacy terminal to perform transmission in the rest of, that is, (100-x %) of the interval (4) in the interval (5). In FIG. 31, since the HTAP does not transmit the legacy MAC frame nor occupy the radio medium in the interval (2), it becomes possible for the legacy terminal to perform transmission in the interval (3).

It is also possible to use the legacy CTS or the legacy CF-poll instead of the legacy MAC frame.

As described above, according to the wireless LAN system in the fourth embodiment, the occupation signal such as the legacy MAC frame is transmitted intermittently. Therefore, when the occupation signal is transmitted, the HT terminal occupies the radio medium, transmission is suppressed at the legacy terminal and a collision of packets is avoided, and the deterioration of throughput is prevented at the HT terminal. On the other hand, when the occupation signal is not transmitted, since the HT terminal does not occupy the radio medium, it becomes possible for the legacy terminal to perform transmission. Due to this, it becomes possible for the HT terminal and the legacy terminal to coexist.

Fifth Embodiment

In a wireless LAN system according to a fifth embodiment, in order to realize the coexistence of the HT terminal and the legacy terminal, the communication time reserved by the HT terminal is adjusted, and the coexistence is realized. In the fifth embodiment, for example, in the case of the frame configuration shown in FIG. 22 and FIG. 23, the number of times the HT sequence occupies x % of the interval from the end of the legacy MAC frame to the next legacy beacon is set to m times (m is a natural number, equal to or less than L) out of L times (L is a natural number) of transmission of the legacy beacon. Then, the HT sequence occupies y % (y % is equal to or less than 100%) of the interval from the end of the legacy MAC frame to the next legacy beacon in the rest of, that is, (L-m) times.

In the above explanation, a method is shown for switching the HT sequences in the two kinds of ratios (x % and y % of the interval from the end of the legacy MAC frame to the next beacon) during the L-time transmission of the legacy beacon, but the number of kinds of ratios is not limited to two but i kinds (i is a positive integer, equal to 2 or greater) of ratios are acceptable. Moreover, as shown in FIG. 24 and FIG. 25, it is also possible to adjust the interval from the end of the legacy MAC frame to the next legacy MAC frame in the above-mentioned ratios.

Due to this, the ratio of the communication time between the HT terminal and the legacy terminal is adjusted and it becomes possible to realize the coexistence of both.

Sixth Embodiment

In the first to fifth embodiments described above, the method is shown, in which the HTAP transmits the legacy CTS to set the NAV for the legacy terminal and suppress transmission, thereby the transmission time of the HT sequence is logically reserved.

However, when the HTSTA can receive the legacy CTS, it is necessary for the HTSTA to be capable of recognizing that the purpose of the legacy CTS is to reserve the time for the HT sequence.

Because of this, in a wireless LAN system according to a sixth embodiment, the HTAP notifies the HTSTA that the occupation of the medium by CTS is for the occupation for the HT sequence by setting the receiver address included in the legacy CTS transmitted in order to reserve the HT sequence to a specific value. The receiver address constitutes identification information.

On the other hand, the HTSTA may employ such a configuration as shown in FIG. 7 or FIG. 8. In other words, the HTSTA employs a configuration including the MAC circuit 36 or 48 as a recognition section for recognizing the receiver address, and the receiving circuit 30a or 40a as a reception section for demodulating a received signal and outputting the received data when the receiver address is recognized as a specific address, or stopping demodulation of the received signal when the receiver address is not recognized as the specific address.

Figure 32:
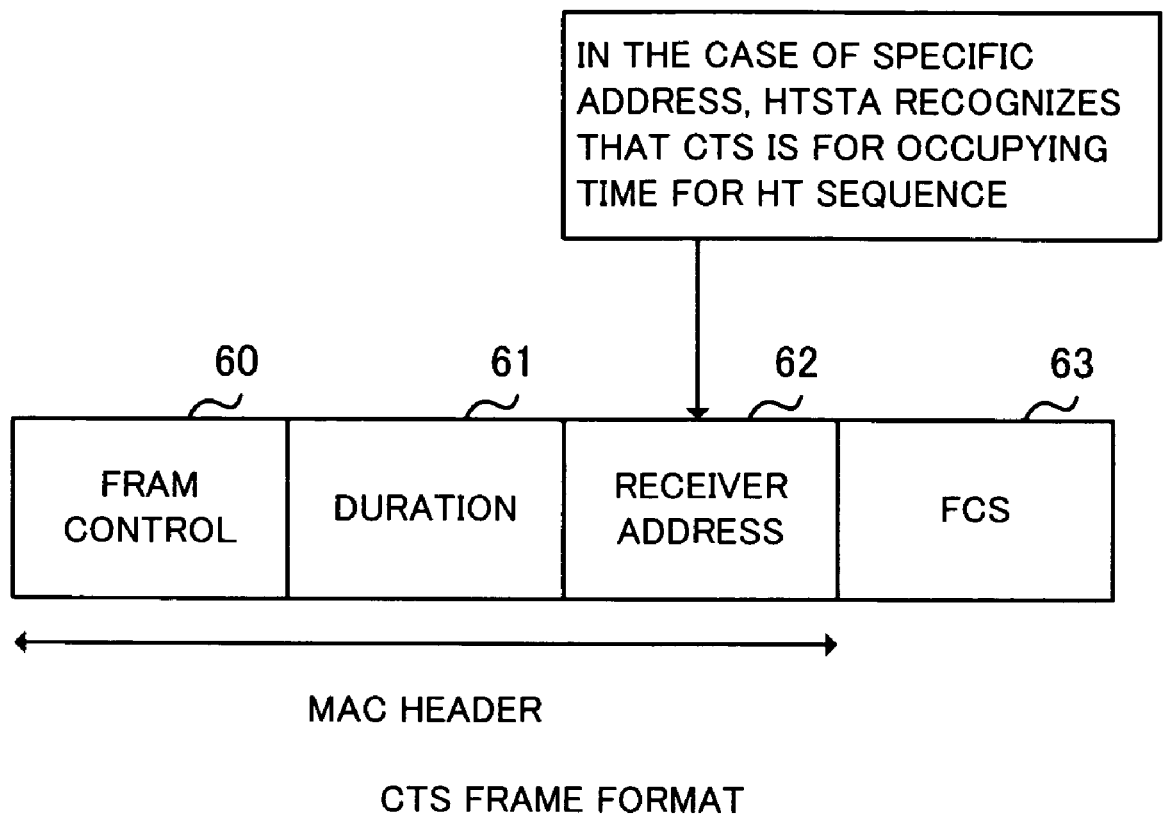
FIG. 32 is a diagram showing a CTS frame format.

FIG. 32 is a diagram showing a CTS frame format. As shown in FIG. 32, the CTS frame consists of a frame control section 60 as an MAC header, a duration section 61, a receiver address 62, and an FCS section 63. Here, when the receiver address 62 is a specific address, it is possible for the HTSTA to recognize that the received CTS is a CTS for occupying the time for the HT sequence. In other words, since there exists an address that is not used normally in the MAC address, it is possible to make the HTSTA recognize that the received CTS is for the occupation by the HT terminal by using the address.

Figure 33:
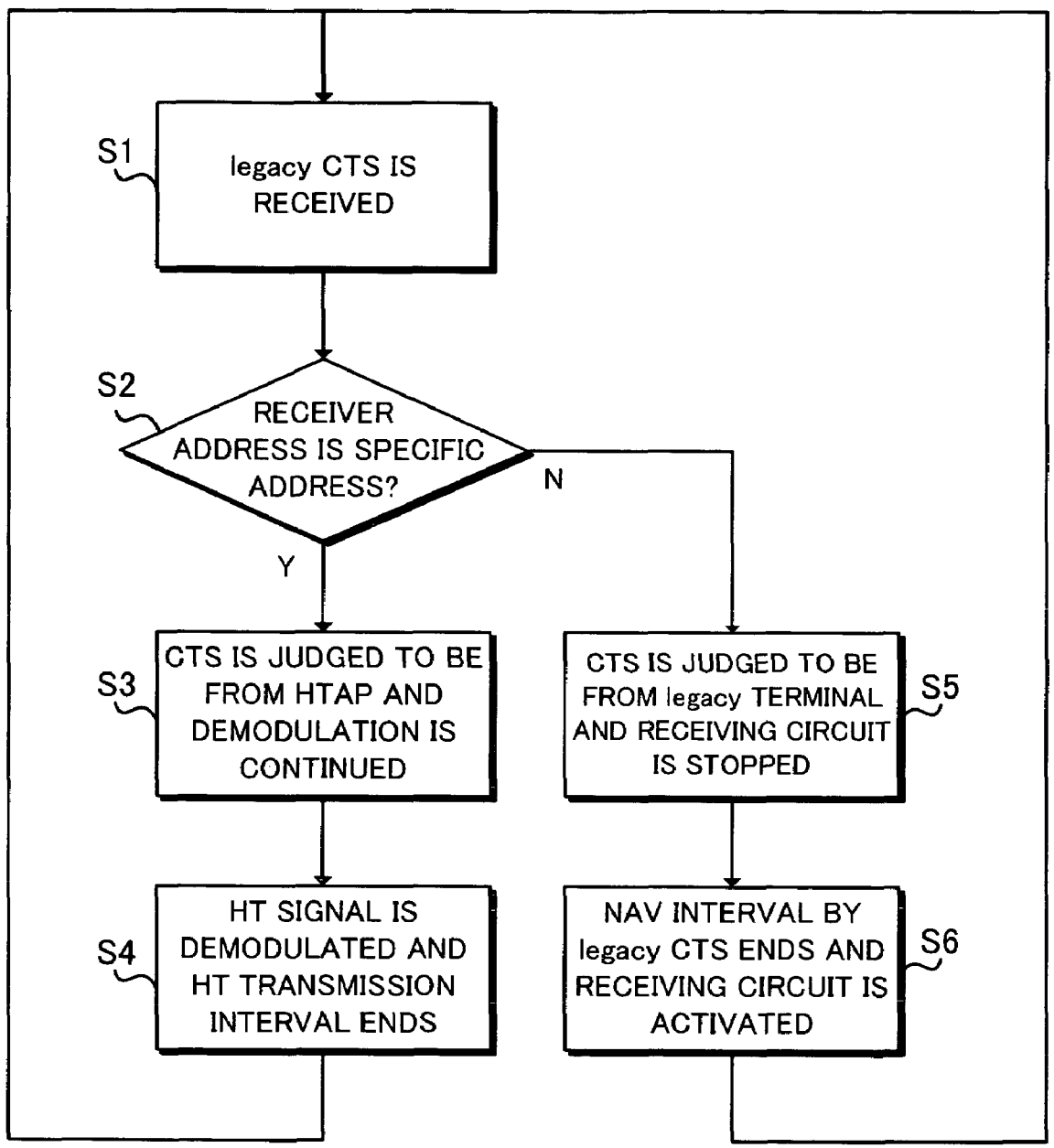
FIG. 33 is a flow chart showing operations when an HTSTA receives a legacy CTS.

Next, the operation when the HTSTA receives the legacy CTS is explained below using the flow chart shown in FIG. 33. When the HTSTA receives the legacy CTS (step S1), the MAC circuit 36 or 48 judges whether the receiver address included in the legacy CTS is a specific address (step S2). When the result is that the address is a specific address, it is judged that the legacy CTS is from the HTAP and preparation is started for demodulating the HT signal (step S3). Then, the HT signal is demodulated and when the HT interval ends (step S4), the procedure returns to step S1, in which the legacy CTS is waited for to be received again. On the other hand, if the receiver address included in the legacy CTS is not a specific address in step S2, it is judged that the CTS is from the legacy terminal and the receiving circuit 30a or 40a is stopped (step S5). Then, after the interval of the NAV set by the CTS elapses, the receiving circuit 30a or 40a is activated (step S6), the procedure returns to step S1, in which the legacy CTS is waited for to be received again.

As described above, according to the wireless LAN system in the sixth embodiment, since the legacy CTS at the HT terminal uses a specific value for the receiver address as identification information for recognizing to be a signal for occupying the radio medium, it is possible for the HT terminal (STA) to recognize that the CTS is transmitted in order to notify the legacy terminal of the occupation of the radio medium. Due to this, it is possible for the HTSTA to judge whether the data transmitted after the CTS is transmitted to the HTSTA. When the judgment result is that the data transmitted after the CTS is transmitted to the HTSTA, the data is demodulated, or when the result is that the data transmitted after the CTS is not transmitted to the HTSTA, the receiving operation is stopped. Due to this, unnecessary operations are not performed and saving power consumption becomes possible.

In the wireless LAN system according to the third to fifth embodiments, when a chance for transmission is given to the legacy terminal, it is not easy to perfectly avoid a collision of the HT signal and the legacy signal if the legacy terminal transmits a very long packet. However, when the packet that the legacy terminal transmits is short, it is possible to considerably reduce the possibility of the collision.

Seventh Embodiment

In the first to sixth embodiments described above, the use in a 5 GHz band is assumed as a specific example. That is, it is assumed that the legacy terminal uses the IEEE802.11a scheme (OFDM scheme). In contrast to this, in a seventh embodiment, a transmitter and a receiver of the HT terminal are explained on the assumption of the use in a 2.4 GHz band, that is, the legacy terminal uses the IEEE802.11 scheme (DSSS scheme).

Figure 34:
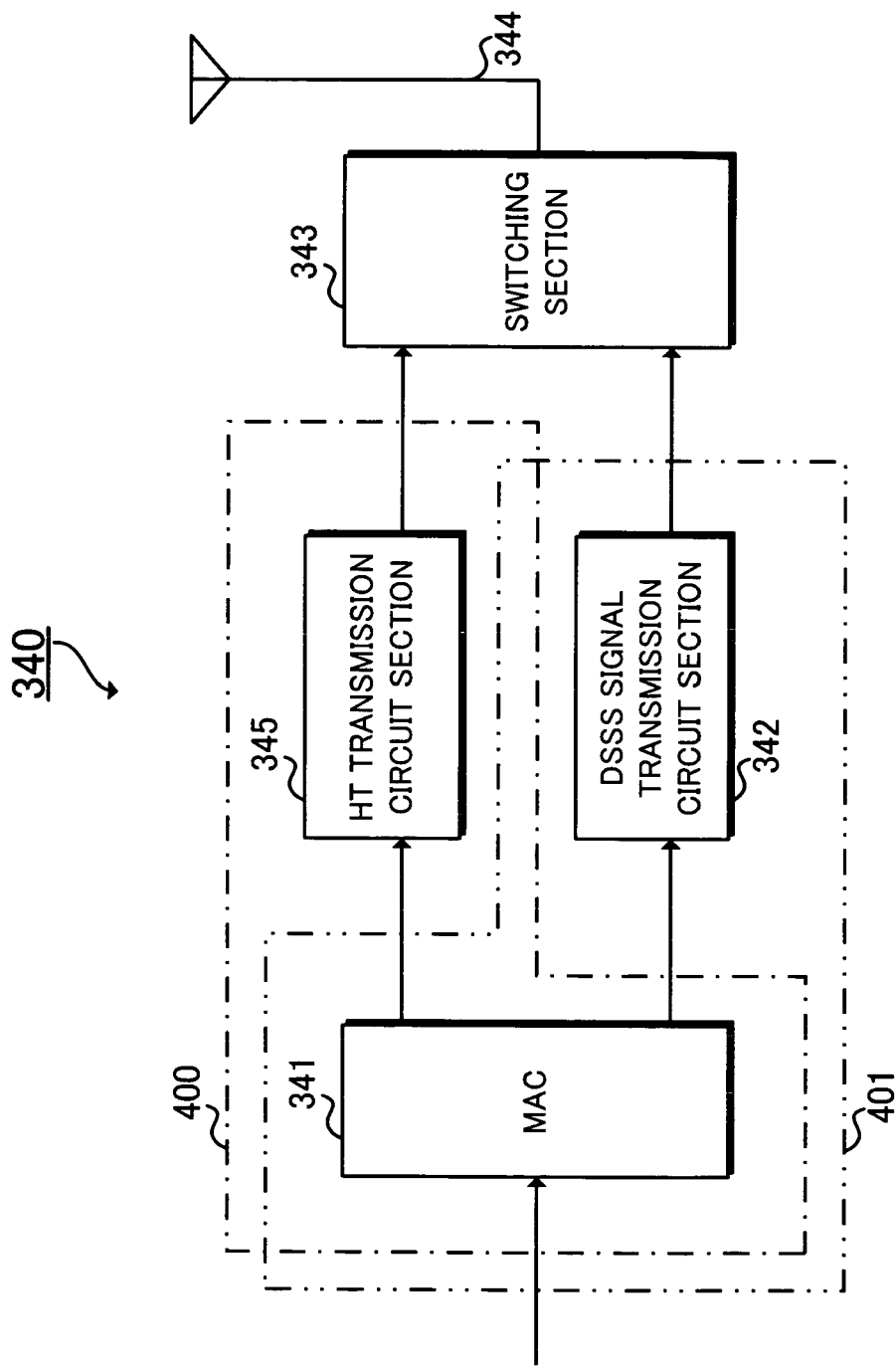
FIG. 34 is a block diagram showing a general configuration of a transmitter of an HT terminal used in a 2.4 GHz band.

FIG. 34 is a block diagram showing a general configuration of a transmitter of an HT terminal used in a 2.4 GHz band. With this transmitter 340, transmission data are inputted to an MAC circuit 341 and the MAC circuit 341 outputs transmission signal data to a DSSS signal transmitting circuit section 342 when transmitting a signal compatible with the legacy terminal, and a radio signal is transmitted through a switching section 343 and an antenna 344.

On the other hand, when communication is performed with another HT terminal using a frequency band wider than that of the legacy terminal, the MAC circuit 341 outputs the transmission signal data to an HT transmitting circuit section 345 and a radio signal is transmitted through the switching section 343 and the antenna 344.

It is assumed that the HT transmitting circuit section 345 shown in FIG. 34 employs the same configuration as that of the transmitting circuit 20a shown in FIG. 3.

In the following explanation, the part constituted of the HT transmitting circuit section 345 and the MAC circuit 341 is defined as a transmission section 400. The part constituted of the DSSS signal transmitting circuit section 342 and the MAC circuit 341 is defined as an occupation signal generation section 401. In other words, it is assumed that a signal compatible with the legacy terminal is transmitted by outputting transmission signal data from the MAC circuit 341 to the DSSS signal transmitting circuit 342 included in the occupation signal generation section 401, and a signal compatible with the HT terminal is transmitted by outputting transmission signal data from the MAC circuit 341 to the HT transmitting circuit 345 included in the transmission section 400.

Figure 35:
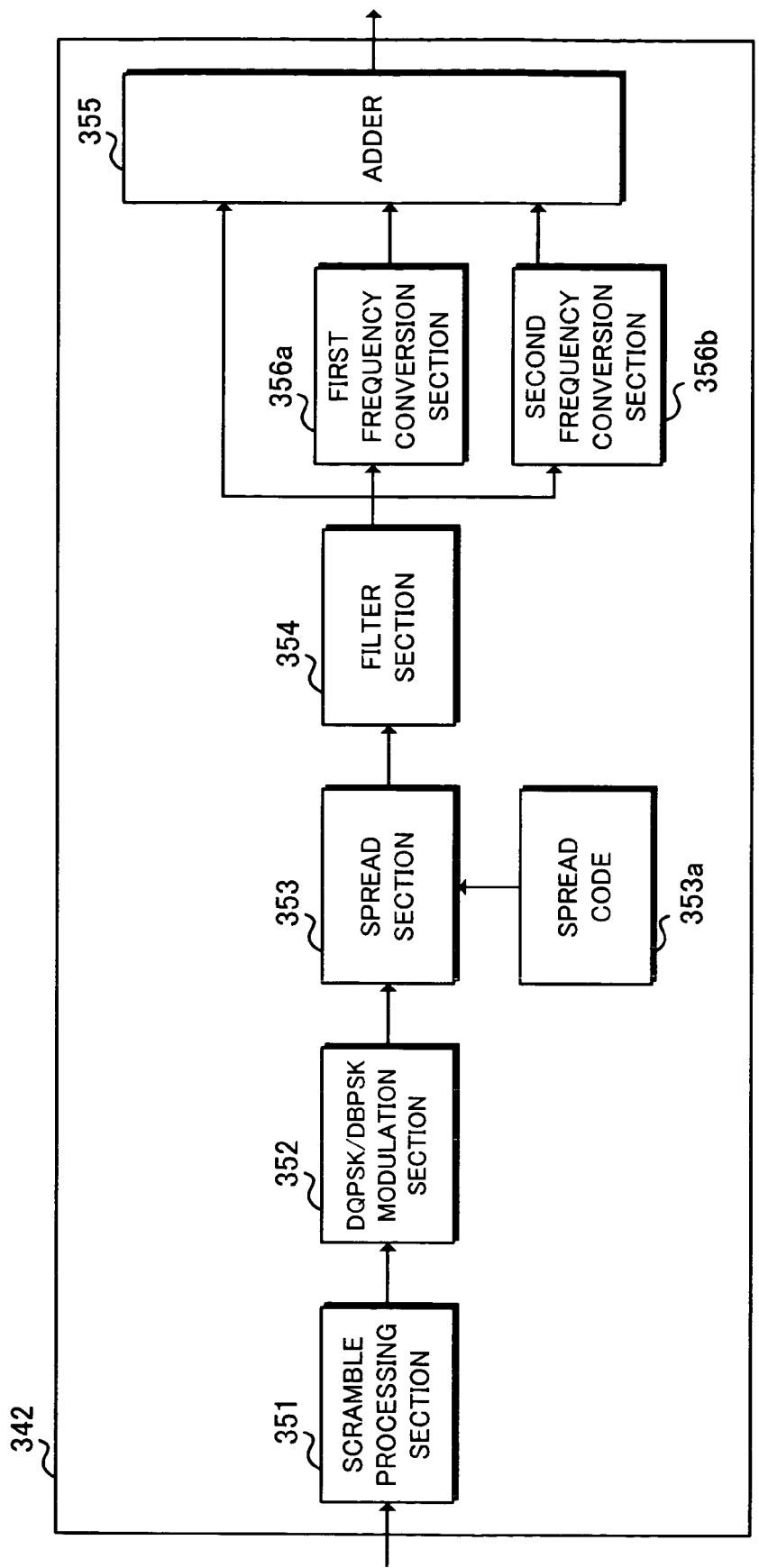
FIG. 35 is a block diagram showing a detailed configuration of a DSSS signal transmitting circuit section.

FIG. 35 is a block diagram showing a detailed configuration of the DSSS signal transmitting circuit section 342 in FIG. 34. The transmission signal data outputted from the MAC circuit 341 shown in FIG. 34 undergoes a scramble process (put into a random state by a specific pattern) in a scramble processing section 351 shown in FIG. 35 and then the data is modulation-processed into binary data in a DQPSK/DBPSK modulation section 352. After signal spreading is performed for the modulation-processed data using a spread code 353a in a spread section 353, the band is limited to 22 MHz in a filter section 354. The data outputted from the filter section 354 is inputted to an adder 355, a first frequency conversion section 356a, and a second frequency conversion section 356b, respectively. The first frequency conversion section 356a outputs the data the center frequency of which has been shifted by 20 MHz to the adder 355 and the second frequency conversion section 356b outputs the data the center frequency of which has been shifted by 40 MHz to the adder 355. The adder 355 adds up the data inputted from the filter section 354, the data inputted from the first frequency conversion section 356a, and the data inputted from the second frequency conversion section 356b. Due to this, a radio signal can be generated, in which three DSSS signals are arranged at 20 MHz intervals when viewed in the direction of frequency.

Figure 36:
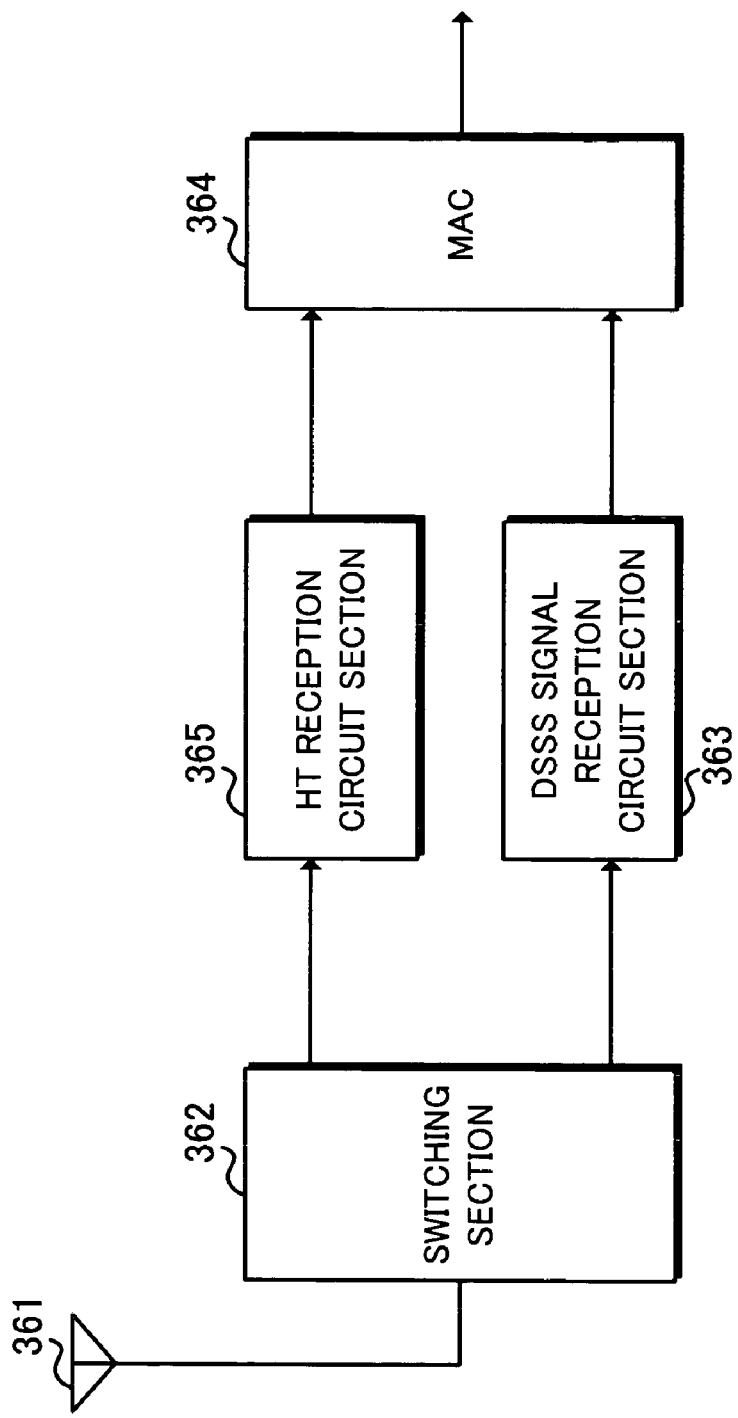
FIG. 36 is a block diagram showing a general configuration of a receiver of the HT terminal used in a 2.4 GHz band.

FIG. 36 is a block diagram showing a general configuration of a receiver of an HT terminal used in a 2.4 GHz band. A radio signal is received by an antenna 361 and when the signal is compatible with the legacy terminal, a switching section 362 outputs the signal to a DSSS signal reception circuit section 363 in which the DSSS signal is demodulated, and then the demodulated signal data is outputted to an MAC circuit 364.

On the other hand, when communication is performed with the HT terminal using a frequency band wider than that of the legacy terminal, the signal is demodulated by an HT reception circuit section 365 and the demodulated signal data is outputted to the MAC circuit 364.

It is assumed that the HT reception circuit section 365 employs the same configuration as that of the receiving circuit 40a shown in FIG. 8.

Figure 37:
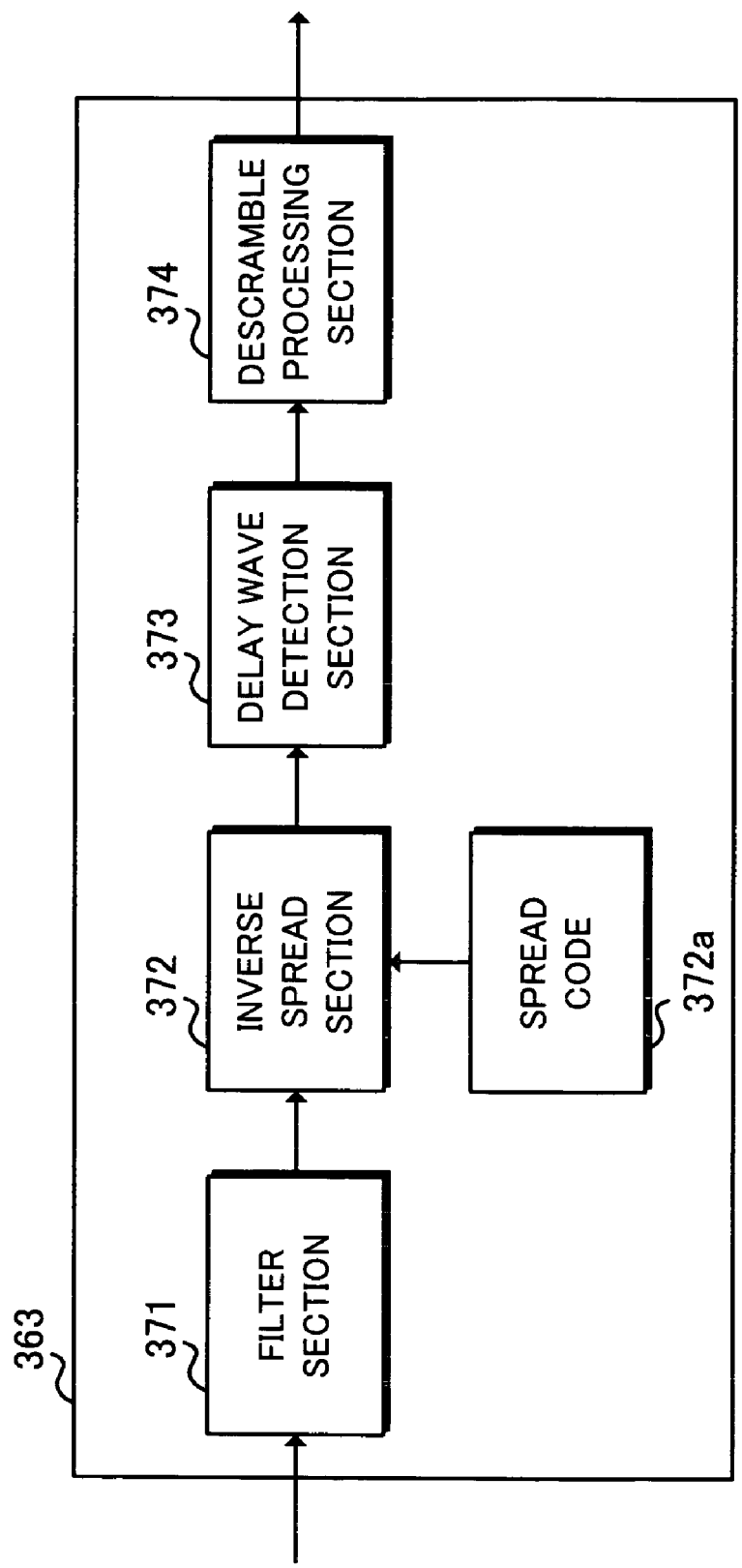
FIG. 37 is a block diagram showing a detailed configuration of a DSSS signal reception circuit section 363.

FIG. 37 is a block diagram showing a detailed configuration of the DSSS signal reception circuit section 363 in FIG. 36. From among the radio signals outputted from the antenna 361 shown in FIG. 36, only the signals in the 22 MHz band required by a filter section 371 shown in FIG. 37 are extracted and an inverse spreading process is performed for the signals by applying a spread code 372a by an inverse spread section 372. The output from the inverse spread section 372 is demodulated into binary data by a delay wave detection section 373 and undergoes a descramble process (the random state by the specific pattern on the transmitting side is released) in a descramble processing section 374, and the obtained reception signal data are outputted to the MAC circuit 364 shown in FIG. 36.

Figure 38:
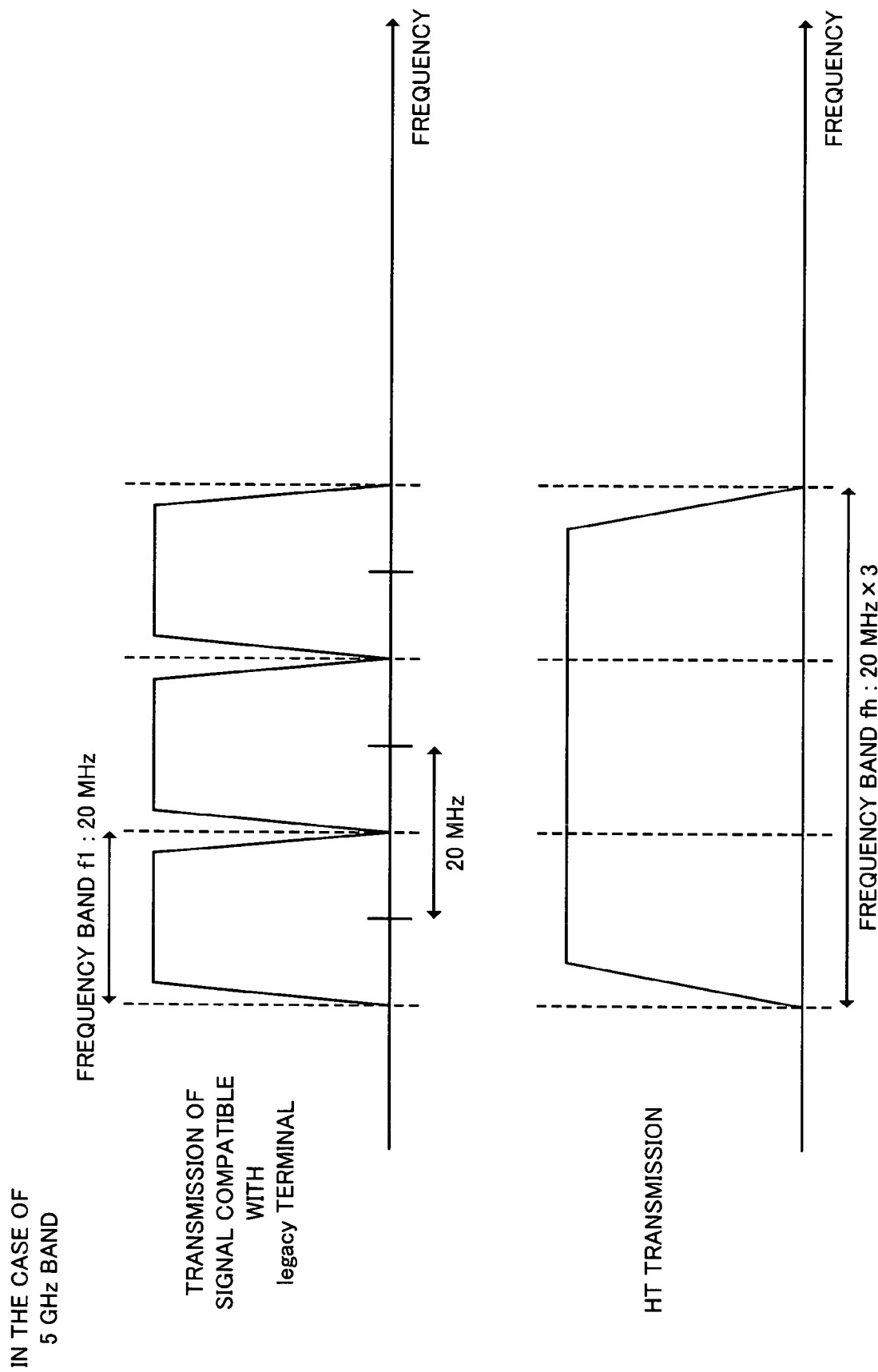
FIG. 38 is a diagram showing a frequency band width used by an HT terminal and a frequency band width used when a signal compatible with a legacy terminal is transmitted in a 5 GHz band.

The "frequency band width" in the seventh embodiment can be thought as follows. That is, in a 5 GHz band, the frequency band width used by the HT terminal is n times (n=3 in the diagram) that of the legacy terminal as shown in FIG. 38. In contrast to this, in a 2.4 GHz band, while the frequency band width used by the HT terminal is n times 20 MHz, the frequency band width used by the legacy terminal is 22 MHz, as shown in FIG. 39, therefore, it is not possible to define that the frequency band width used by the HT terminal is n times the frequency band used by the legacy terminal.

Figure 39:
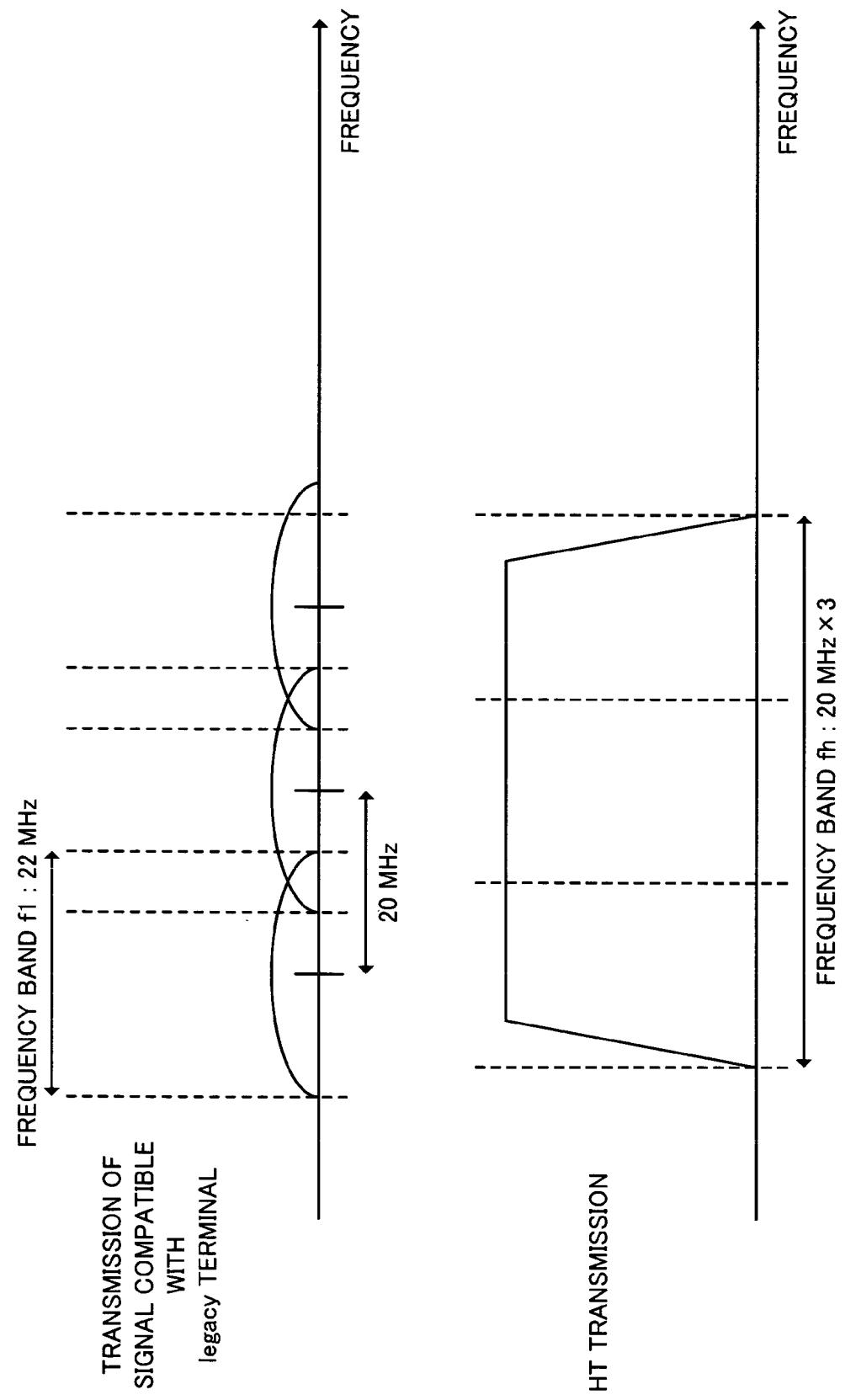
FIG. 39 is a diagram showing a frequency band width used by an HT terminal and a frequency band width used when a signal compatible with a legacy terminal is transmitted in a 2.4 GHz band.

However, it can be said that FIG. 38 and FIG. 39 are identical to each other in that the occupation signal is a "signal compatible with the legacy terminal in the use of every frequency in a frequency band fh used by the HT terminal."

Therefore, in a 2.4 GHz band also, the same effect as that shown in the first to sixth embodiments can be obtained by using an occupation signal compatible with the legacy terminal shown in FIG. 39.

EXPLANATION OF REFERENCE NUMERALS

20 . . . HTAP transmitter
20a . . . transmitting circuit
24 . . . switching device
25 . . . symbol repeating circuit
30 . . . receiver
30a . . . receiving circuit
36 . . . MAC circuit
40 . . . receiver
40a . . . receiving circuit
45 . . . thinning circuit
46 . . . demodulator
48 . . . MAC circuit
50 . . . antenna
51 . . . receiving circuit
52 . . . HT interval start judgment circuit
53 . . . counter circuit
54 . . . HT interval end judgment circuit
55 . . . transmission control circuit
59a . . . receiver
59b . . . receiver
300 . . . transmission section
301 . . . occupation signal generation section
340 . . . transmitter
356a . . . first frequency conversion section
356b . . . second frequency conversion section
355 . . . adder
400 . . . transmission section
401 . . . occupation signal generation section

What is claimed is:

1. A communication system including a transmitter and a receiver, where the transmitter is applied to a second radio communication system using a second frequency band wider than a first frequency band used in a first radio communication system and the receiver is applied to the second wireless communication system using a second frequency band wider than a first frequency band used in a first wireless communication system, comprising:

an occupation signal generation section for generating an occupation signal compatible with said first radio communication system and notifying said first radio communication system that said second radio communication system occupies a radio medium;

a transmission section for performing communication in said second radio communication system after transmitting said occupation signal using every frequency in said second frequency band, wherein said transmission section transmits a start signal for notifying that the period during which communication is performed in said second wireless communication system starts; and a start judgment section for judging the start of the period during which said second wireless communication system occupies the radio medium based on said start signal received from the transmitter.

2. The transmitter according to claim 1, wherein:

said occupation signal generation section adds, information for specifying the period during which said second radio communication system occupies the radio medium perfectly, to said occupation signal; and said transmission section performs communication in said second radio communication system by occupying the radio medium during said period.

3. The transmitter according to claim 1, wherein:

said occupation signal generation section adds, information that said second radio communication system occupies a part of the period of the radio medium, to said occupation signal; and said transmission section performs communication in said second radio communication system by occupying the radio medium during said part of the period based on said information.

4. The transmitter according to claim 1, wherein said second frequency band has a band width n times (n is a natural number) that of said first frequency band.

5. The transmitter according to claim 4, wherein said occupation signal generation section comprises a symbol repeating section for repeatedly outputting transmission data corresponding to an occupation signal n times (n is a natural number) in predetermined symbol units.

6. The transmitter according to claim 1, wherein said occupation signal generation section generates said occupation signal intermittently.

7. The transmitter according to claim 1, wherein said transmission section transmits at least, out of a start signal for notifying that a period during which communication is performed in said second radio communication system starts and an end signal for notifying that a period during which communication is performed in said second radio communication system ends, said start signal.

8. The transmitter according to claim 1, wherein said occupation signal generation section adds, identification information by which said second radio communication system recognizes said occupation signal, to said occupation signal.

9. The transmitter according to claim 1, wherein:
said occupation signal generation section comprising:
at least one frequency conversion section for converting the center frequency of an input signal into a predetermined frequency and outputting a frequency-converted signal; and
an addition section for adding up said input signal and the signal outputted from said frequency conversion section.

10. The receiver according to claim 3, further comprising:
a thinning circuit for cutting out and outputting one n-th of an occupation signal received from the transmitter; and
a demodulation section for demodulating a signal inputted from said thinning circuit and outputting the received data.

11. The receiver according to claim 7, further comprising:
a measurement section for measuring an elapsed time from the start of said period;
an end judgment section for judging the end of said period based on the elapsed time from the start of said period and said start signal; and
a control section for outputting a signal for notifying the result of the judgment of the start and end of said period.

12. The receiver according to claim 7, further comprising:
an end judgment section for judging the end of said period based on said end signal received from the transmitter; and
a control section for outputting a signal for notifying the result of the judgment of the start and end of said period.

13. The receiver according to claim 8, further comprising:
a recognition section for recognizing said identification information based on said occupation signal received from the transmitter; and
a reception section for demodulating the received signal and outputting received data when said identification information is recognized, or stopping the receiving operation when said identification information is not recognized.

14. A wireless LAN system, comprising an access point further comprising the transmitter and a station further comprising the receiver according to claim 10.

15. A wireless LAN system, comprising an access point further comprising the transmitter according to claim 1 and a station further comprising the receiver.

16. The receiver according to claim 1, further comprising:
a measurement section for measuring an elapsed time from the start of said period;
an end judgment section for judging an end of said period based on the elapsed time from the start of said period and said start signal; and
a control section for outputting a signal for notifying the result of the judgment of the start and end of said period.

17. The transmitter according to claim 1, wherein said transmission section transmits a start signal for notifying that the period during which communication is performed in said second wireless communication system starts and an end signal for notifying that the period during which communication is performed in said second wireless communication system ends.

18. The receiver according to claim 17, further comprising:
an end judgment section for judging an end of said period based on an end signal received from the transmitter; and
a control section for outputting a signal for notifying the result of the judgment of the start and end of said period.

19. A communication system including a transmitter and a receiver, where the transmitter is applied to a second radio communication system using a second frequency band wider than a first frequency band used in a first radio communication system and the receiver is applied to the second wireless communication system using a second frequency band wider than a first frequency band used in a first wireless communication system, comprising:
an occupation signal generation section for generating an occupation signal compatible with said first radio communication system and notifying said first radio communication system that said second radio communication system occupies a radio medium; and
a transmission section for performing communication in said second radio communication system after transmitting said occupation signal using every frequency in said second frequency band, wherein said transmission section transmits at least, out of a start signal for notifying that a period during which communication is performed in said second radio communication system starts and an end signal for notifying that a period during which communication is performed in said second radio communication system ends, said start signal; and
a start judgment section for judging the start of the period during which said second wireless communication system occupies the radio medium based on said start signal received from the transmitter.

20. A communication method comprising:
using a signal to notify a first wireless communication system that a second wireless communication system occupies a radio medium; wherein the second wireless communication system uses a second frequency band wider than a first frequency band used by the first wireless communication system; and
performing communication in said second wireless communication system after transmitting the signal; and
transmitting a start signal for notifying that the period during which communication is performed in said second wireless communication system starts,
wherein a receiving process applied to the second wireless communication system using a second frequency band wider than a first frequency band used in a first wireless communication system, comprising:
judging the start of the period during which said second wireless communication system occupies the medium based on said start signal received from the transmitting;
measuring the elapsed time from the start of said period;
judging the end of said period based on the elapsed time from the start of said period and said start signal; and
outputting a signal for notifying the result of the judgment of the start and end of said period.

21. A communication method, comprising:
using a signal to notify a first wireless communication system that a second wireless communication system occupies a radio medium; wherein the second wireless communication system uses a second frequency band wider than a first frequency band used by the first wireless communication system;
performing communication in said second wireless communication system after transmitting the signal; and
transmitting a start signal for notifying that the period during which communication is performed in said second wireless communication system stats and an end signal for notifying that the period during which communication is performed in said second wireless communication system ends, wherein a receiving process applied to the second wireless communication system using a second frequency band wider than a first frequency band used in a first wireless communication system, comprising:

judging the start of the period during which said second wireless communication system occupies the medium based on said start signal received from the transmitting;

judging the end of said period based on said end signal received from the transmitting; and outputting a signal for notifying the result of the judgment of the start and end of said period.

22. A receiver applied to a second radio communication system uses a second frequency band wider than a first frequency band used in a first radio communication system, comprising:

a receiving section receiving a start signal for notifying that a period during which communication is started in said second wireless communication system, where the start signal received by the receiving station is subjected to demodulation and/or decoding;

a start judgment section for judging a start of the period during which said second radio communication system occupies the radio medium based on said received start signal;

a measurement section for measuring an elapsed time from the start of said period;

an end judgment section for judging an end of said period based on the elapsed time based on the start of said period and said start signal; and a control section for outputting a signal for notifying a result of the judgment of the start and end of said period.

23. A receiver applied to a second radio communication system using a second frequency band wider than a first frequency band used in a first radio communication system, comprising:

a receiving section receiving a start signal for notifying that a period during which communication is started in said second wireless communication system and an end signal for notifying that a period during which communication is ended in said second wireless communication system, where the start signal and the end signal received by the receiving station is subjected to demodulation and/or decoding;

a start judgment section for judging a start of the period during which said second radio communication system occupies the radio medium based on said received start signal;

an end judgment section for judging an end of said period based on said end signal received; and a control section for outputting a signal for notifying a result of the judgment of the start and end of said period.

24. A communication method where a receiving process applied to a second wireless communication system using a second frequency band wider than a first frequency band used in a first wireless communication system, comprising:

receiving a start signal for notifying that a period during which communication is started in said second wireless communication system;

demodulating and/or decoding the start signal;

judging the start of the period during which said second radio communication system occupies the radio medium based on said received start signal;

measuring an elapsed time from the start of said period;

judging an end of said period based on the elapsed time based on the start of said period and said start signal; and outputting a signal for notifying a result of the judgment of the start and end of said period.

25. A communication method where a receiving process applied to a second wireless communication system using a second frequency band wider than a first frequency band used in a first wireless communication system, comprising:

receiving a start signal for notifying that a period during which communication is started in said second wireless communication system and an end signal for notifying that a period during which communication is ended in said second wireless communication system;

demodulating and/or decoding the start signal and the end signal;

judging the start of the period during which said second radio communication system occupies the radio medium based on said received start signal;

judging the end of said period based on said end signal received; and outputting a signal for notifying a result of the judgment of the start and end of said period.

26. A transmitter comprising:

an interval start judgment circuit for judging a start of an interval based on a received notification signal which is a start signal for notifying that the period during which communication is performed in said second radio communication system using a second frequency band wider than a first frequency band used in a first radio communication system starts;

a counter circuit which starts a counter based on an output signal of the interval start judgment circuit, the counter counting a time elapsed from the start of the interval;

an interval end judgment circuit for judging an end of the interval in combination with the output of the counter circuit according to information about the interval included in the received notification signal;

a transmission control circuit for controlling a transmitting circuit based on the output signal of the interval start judgment circuit and the output signal of the interval end judgment circuit.

27. A transmission method comprising:

receiving a notification signal which is a start signal for notifying that the period during which communication is performed in said second radio communication system using a second frequency band wider than a first frequency band used in a first radio communication system starts;

judging a start of an interval based on the notification signal and providing an output start signal based on the judging of the start of the interval;

start counting based on the output signal and counting a time elapsed from the start of the interval and outputting a counting output;

judging an end of the interval in combination with the counting output according to information about the interval included in the notification signal and providing an output end signal based on the judging of the end of the interval;

controlling a transmission based on the output start signal and the output end signal.

* * * * *